(12) United States Patent
Sugar et al.

(10) Patent No.: US 7,116,943 B2
(45) Date of Patent: Oct. 3, 2006

(54) SYSTEM AND METHOD FOR CLASSIFYING SIGNALS OCCURING IN A FREQUENCY BAND

(75) Inventors: Gary L. Sugar, Rockville, MD (US);
Neil R. Diener, Rockville, MD (US);
Karl A. Miller, Frederick, MD (US)

(73) Assignee: Cognio, Inc., Germantown, MD (US)

( * ) Notice: Subject to any disclaimer, the term of this patent is extended or adjusted under 35 U.S.C. 154(b) by 592 days.

(21) Appl. No.: 10/420,362

(22) Filed: Apr. 22, 2003

(65) Prior Publication Data

US 2003/0224741 A1    Dec. 4, 2003

Related U.S. Application Data

(63) Continuation-in-part of application No. 10/246,364, filed on Sep. 18, 2002, now Pat. No. 6,850,735.

(60) Provisional application No. 60/320,008, filed on Mar. 14, 2003, provisional application No. 60/453,385, filed on Mar. 10, 2003, provisional application No. 60/319,714, filed on Nov. 20, 2002, provisional application No. 60/319,542, filed on Sep. 11, 2002, provisional application No. 60/319,435, filed on Jul. 30, 2002, provisional application No. 60/380,890, filed on May 16, 2002, provisional application No. 60/380,891, filed on May 16, 2002, provisional application No. 60/374,363, filed on Apr. 22, 2002, provisional application No. 60/374,365, filed on Apr. 22, 2002.

(51) Int. Cl.
*H04B 17/00* (2006.01)

(52) U.S. Cl. .................. 455/67.11; 455/226.1

(58) Field of Classification Search .. 455/67.11–67.16, 455/226.1, 214, 336, 115.1; 375/340
See application file for complete search history.

(56) References Cited

U.S. PATENT DOCUMENTS 3,609,553 A    9/1971    Frazier et al. ................ 325/67

(Continued)

FOREIGN PATENT DOCUMENTS

CA    2260336    8/2000

(Continued)

OTHER PUBLICATIONS

Agilent Publication, "Agilent 89400 Series Vector Signal Analyzer Product Overview," 2000.

(Continued)

*Primary Examiner*—Simon Nguyen
(74) *Attorney, Agent, or Firm*—Edell, Shapiro & Finnan, LLC

(57) ABSTRACT

A system and method for classifying signals occurring in a frequency band. One or more characteristics of one or more signals in the frequency band are detected using any suitable technology, such as a device that can generate characteristics of signal pulses detected in the frequency band. Data pertaining to the signal pulses is accumulated over time. The accumulated signal data is compared against reference data associated with known signals to classify the one or more signals in the frequency band based on the comparison. The accumulated data may include one or more characteristics selected from the group consisting of: pulse center frequency, pulse bandwidth, pulse duration, time between pulses and number of different active pulses, and wherein the reference data associated with each of a plurality of known signals comprises one or more characteristics selected from the group consisting of: pulse center frequency, pulse bandwidth, pulse duration and time between pulses. The accumulated signal data is compared against the reference data, and depending on the degree of match with reference data, a signal can be classified. Additional levels of signal classification processing may be performed.

46 Claims, 21 Drawing Sheets

U.S. PATENT DOCUMENTS

| | | | |
|---|---|---|---|
| 3,812,291 A | 5/1974 | Brodes et al. | 704/253 |
| 4,166,980 A | 9/1979 | Apostolos et al. | 325/363 |
| 4,227,255 A | 10/1980 | Carrick et al. | 455/226 |
| 4,271,523 A | 6/1981 | Gable | |
| 4,501,020 A | 2/1985 | Wakeman | 455/226 |
| 4,597,107 A | 6/1986 | Ready et al. | 455/226 |
| 4,845,707 A | 7/1989 | Isaacson et al. | 370/480 |
| 4,947,338 A | 8/1990 | Vistica | 364/485 |
| 4,979,211 A | 12/1990 | Benvenuto et al. | |
| 5,005,210 A | 4/1991 | Ferrell | 455/115 |
| 5,144,642 A | 9/1992 | Weinberg et al. | 375/10 |
| 5,210,820 A | 5/1993 | Kenyon | 395/2 |
| 5,353,346 A | 10/1994 | Cox et al. | 379/384 |
| 5,432,862 A | 7/1995 | Hirsch | 382/207 |
| 5,608,727 A | 3/1997 | Perreault et al. | 370/462 |
| 5,651,030 A | 7/1997 | Wong et al. | 375/316 |
| 5,687,163 A | 11/1997 | Fox et al. | 370/207 |
| 5,832,038 A * | 11/1998 | Carsello | 375/316 |
| 5,905,949 A | 5/1999 | Hawkes et al. | 455/410 |
| 5,912,922 A | 6/1999 | Koszarsky et al. | 375/224 |
| 6,084,919 A | 7/2000 | Kleider et al. | 375/285 |
| 6,105,015 A * | 8/2000 | Nguyen et al. | 706/26 |
| 6,198,779 B1 * | 3/2001 | Taubenheim et al. | 375/316 |
| 6,226,680 B1 | 5/2001 | Boucher et al. | 709/230 |
| 6,240,282 B1 * | 5/2001 | Kleider et al. | 455/226.1 |
| 6,240,372 B1 | 5/2001 | Gross et al. | 702/71 |
| 6,385,434 B1 | 5/2002 | Chuprun et al. | 455/11.1 |
| 6,463,294 B1 | 10/2002 | Holma et al. | |
| 6,466,614 B1 * | 10/2002 | Smith | 375/224 |
| 6,519,541 B1 | 2/2003 | Bitton | 702/76 |
| 6,570,991 B1 * | 5/2003 | Scheirer et al. | 381/110 |
| 6,629,151 B1 | 9/2003 | Bahl | 709/250 |
| 6,697,013 B1 | 2/2004 | McFarland et al. | |
| 6,708,146 B1 * | 3/2004 | Sewall et al. | 704/217 |
| 6,714,605 B1 | 3/2004 | Sugar et al. | 375/340 |
| 6,718,297 B1 * | 4/2004 | Pride et al. | 704/206 |
| 6,850,735 B1 * | 2/2005 | Sugar et al. | 455/67.11 |
| 6,978,145 B1 * | 12/2005 | Takaba et al. | 455/553.1 |
| 2001/0019543 A1 | 9/2001 | Mueckenheim et al. | |
| 2002/0080951 A1 * | 6/2002 | Tanrikulu | 379/350 |
| 2002/0086641 A1 | 7/2002 | Howard | 455/67.1 |
| 2002/0137485 A1 | 9/2002 | Nilsson et al. | 455/184.1 |
| 2002/0142744 A1 | 10/2002 | Okanoue et al. | 455/226.1 |
| 2002/0154614 A1 | 10/2002 | Jagger et al. | 370/332 |
| 2002/0155811 A1 | 10/2002 | Prismantas et al. | 455/63 |
| 2002/0173272 A1 | 11/2002 | Liang et al. | 455/63 |
| 2003/0040277 A1 | 2/2003 | Deats | 455/63 |
| 2003/0050012 A1 | 3/2003 | Black et al. | 455/62 |
| 2003/0123420 A1 | 7/2003 | Sherlock | 370/338 |
| 2004/0023674 A1 | 2/2004 | Miller | 455/462 |
| 2004/0219885 A1 | 11/2004 | Sugar et al. | 455/67.11 |
| 2005/0032479 A1 | 2/2005 | Miller et al. | 455/67.11 |
| 2005/0075863 A1 * | 4/2005 | Jiang et al. | 704/205 |

FOREIGN PATENT DOCUMENTS

| | | |
|---|---|---|
| CA | 2298316 | 8/2000 |
| JP | 2000-022712 | 1/2000 |

OTHER PUBLICATIONS

Agilent Publication, "Agilent Technologies: 2G & 3G Solutions-Accelerating Progress," 2002.

Agilent Publication, "Agilent Technologies: Powerful Solutions To Complex Measurement Problems; Burst, Transient and Modulated Signal Analysis," 2000.

Agilent Publication, "Agilent PN 89400-8 Using Vector Modulation Analysis In The Integration, Troubleshooting And Design Of Digital RF Communications Systems," 2000 (and earlier).

Agilent Publication, "Agilent PN 89400-10 Time-Capture Capabilities Of The Agilent 89400 Series Vector Signal Analyzers," 2000 (and earlier).

Agilent Publication, "Agilent 89440A-1 Frequency And Time-Selective Power Measurements With The Agilent 89410A and 89440A," 2001 (and earlier).

Canadian Communications Research Center, "Spectrum Explorer Project Of Canadian Communications Research Center," 1998 (and later).

Stanford Research Systems, "Stanford Research Systems SR785 Two Channel Dynamic Signal Analyzer," 1998.

Carlemalm, Catharina, "Suppression Of Multiple Narrowband Interferers In A Spread-Spectrum Communication System," Aug. 2000, IEEE Journal on Selected Areas in Communications, Special Issue on Broadband Communications, vol. 18.

Lo, Victor Yeeman, "Enhanced Spectral Analysis Tool (SAT) For Radio Frequency Interference Analysis And Spectrum Management," Milcom, 1998.

Tektronix, "Real-Time Spectrum Analysis Tools Aid Transition To Third-Generation Wireless Technology," 1999.

Patenaude, Francois et al., "Spectrum Surveillance: System Architecture," CRC-TN-97-001, Canadian Communications Research Centre, Apr. 15, 1997.

Mobilian Corporation, "WI-FI™ (802.11b) and BLUETOOTH™: an Examination of Coexistence Approaches," Mobilian Corporation, 2001.

RSMS Publication, "Radio Spectrum Measurement System (RSMS) Program-Functional Measurements," Jan. 29, 2001.

Schreyogg, Christoph et al., "Robust Classification Of Modulation Types Using Spectral Features Applied to HMM," 1997, 5 pages.

Tektronix, "Validation Testing Of Bluetooth Wireless LAN Systems," Tektronix Application Note, 2001.

Lallo, Pauli, "Signal Classification By Discrete Fourier Transform", Milcom Conference Proceedings, 1999.

Quint et al., "Emitter Detection And Tracking Algorithm For A Wide Band Multichannel Direction-Finding System In The HF Band," Milcom Conference Procedings, 1999.

Dubuc et al., "An Automatic Modulation Recognition Algorithm For Spectrum Monitoring Applications," ICC '99, Jun. 19, 1999.

Shull et al., "Modulation Classification By Wavelet Decomposition Entropy Analysis1," ASME Press, vol. 10, Nov. 15-20, 2000.

Medav, Dr. Hans-Joachim Kolb, "Signal Processing and Neural Networks in Surveillance and Radio Monitoring," Medav, 1993, 20 pgs.

Medav, "Medav OC-6040, PC-Based 4-Channel Analyzer And Demodulator For Narrowband COMINT Signals With Automatic Signal Recognition," publication date unknown, 8 pgs.

BBN Technologies, "Using Signal Processing to Analyze Wireless Data Traffic," May 22, 2002, BBN Technical Memorandum No. 1321, prepared for DARPA.

Medav, Dr. Hans-Joachim Kolb "Short Time Spectral Analysis of Audio Signals on a PC," unknown publication date, 6 pgs.

Aglient Technologies, "Verifying Bluetooth™ Baseband Signals Using Mixed-Signal Oscilloscopes," 2001, Application Note 1333-3.

Medav, "Astrid: Analysis System for Telecom Signals, Recognition, Interception and Demodulation of HF/VHF/UHF Radio Signals from 0 to 2 GHz," 2000, 8 pgs.

Noone, Gregory P. "A Neural Approach to Automatic Pulse Repetition Interval Modulation Recognition," 1999, Procedings of Information Decision and Control.

Nolan et al., "Modulation Scheme Recognition Techniques for Software Radio on a General Purpose Platform," unknown publication date, Networks and Telecommunications Research Group, Trinity College.

Medav, "Astrid++: Analysis, Monitoring, Recording and Multi-Channel Direction Finding of Wideband Radio Signals," 2000.

Taira et al., "Automatic Classification of Analogue Modulation Signals by Statistical Parameters," 1999, Milcom Conference Procedings.

Bart Rice et al., "Tutorial -C: Automatic Signal Classification," 1998, EUSIPCO Conference.

Oscor, "Oscor 5000 (Omni-Spectral Correlator)," unknown publication date.

Logicon Company Literature (Northrup Grumman), "Logicon Specific Emitter Identification," unknown publication date.

Boudreau et al., "A Fast Automatic Modulation Recognition Algorithm And Its Implementation In A Spectrum Monitoring Application," Oct. 2000, Milcom.

Ketterer et al., "Classification of Modulation Modes Using Time-Frequency Methods," 1999, IC.

Nolan et al., "Modulation Scheme Classification for 4G Software Radio Wireless Networks," unknown publication date.

PCT Search Report in International Application No. PCT/US03/13572, 6 pgs.

\* cited by examiner

FIG. 8
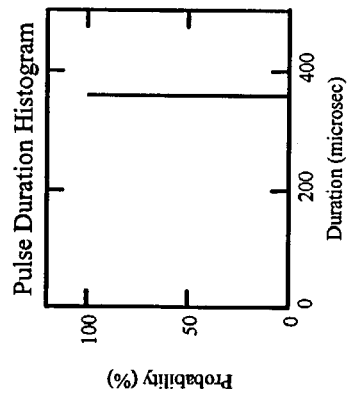
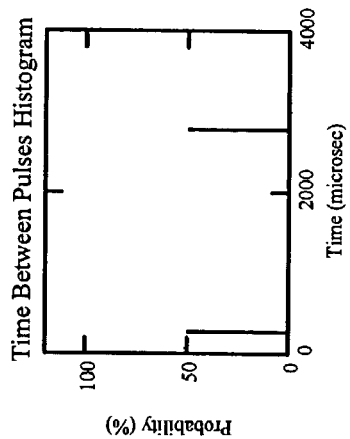
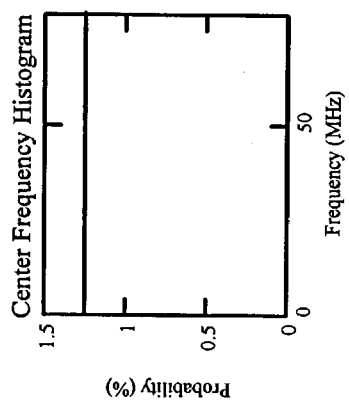
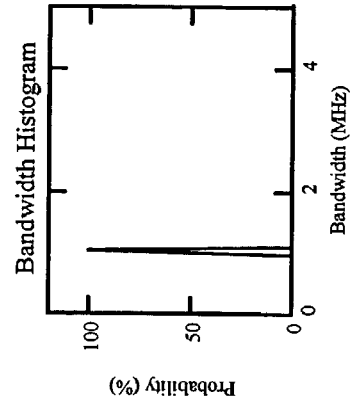

FIG. 10
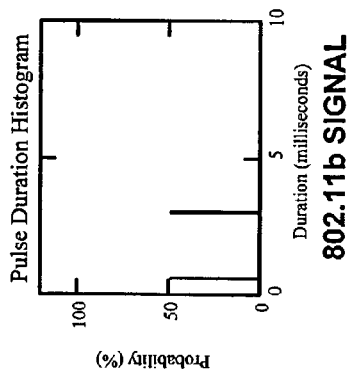
Pulse Duration Histogram
802.11b SIGNAL
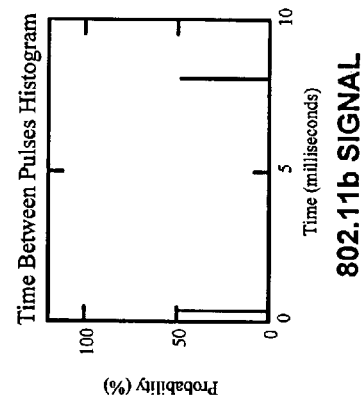
Time Between Pulses Histogram
802.11b SIGNAL
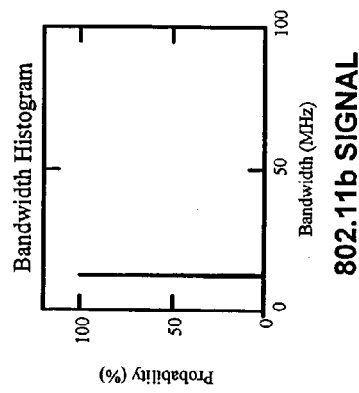
Bandwidth Histogram
802.11b SIGNAL FIG. 22
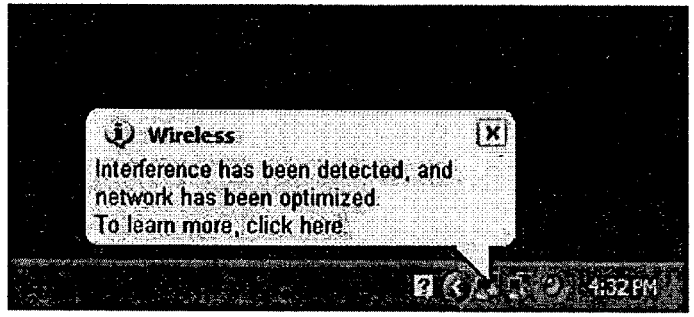
FIG. 23
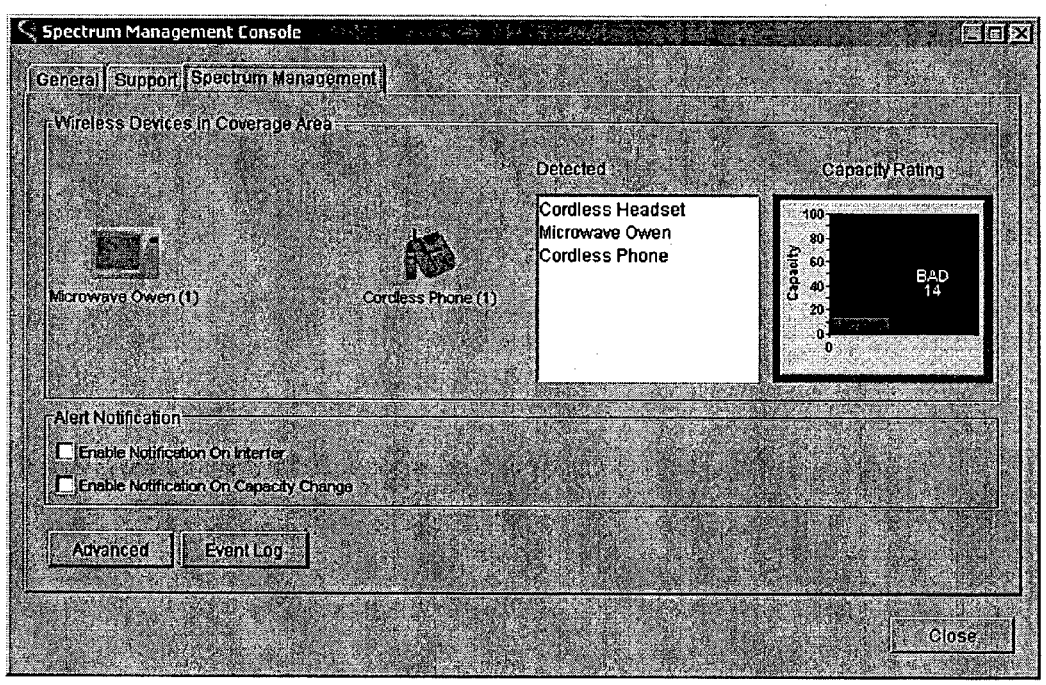
FIG. 24

SYSTEM AND METHOD FOR CLASSIFYING SIGNALS OCCURING IN A FREQUENCY BAND

This application claims priority to each of the following U.S. Provisional Applications, all of which are incorporated herein by reference:

Application No. 60/374,365, filed Apr. 22, 2002.
Application No. 60/374,363, filed Apr. 22, 2002.
Application No. 60/380,891, filed May 16, 2002.
Application No. 60/380,890, filed May 16, 2002.
Application No. 60/319,435, filed Jul. 30, 2002.
Application No. 60/319,542, filed Sep. 11, 2002.
Application No. 60/319,714, filed Nov. 20, 2002.
Application No. 60/453,385, filed Mar. 10, 2003.
Application No. 60/320,008, filed Mar. 14, 2003.

This application is a continuation-in-part of U.S. application Ser. No. 10/246,364, filed Sep. 18, 2002, now U.S. Pat. No. 6,850,735, the entirety of which is incorporated herein by reference.

BACKGROUND OF THE INVENTION

The present invention is directed to radio communication devices, and more particularly to technology used in a radio communication device to classify or identify signals in a radio frequency band.

In certain radio communication environments, it would be desirable to know whether and what types of other signals or devices are active. For example, an unlicensed radio frequency band is, by its nature, free to be used by any device that emits signals within certain power levels in that part of the allocated spectrum. It is possible that many devices may share the unlicensed frequency band at the same time, potentially causing interference with each other. Under these circumstances, it would be useful to identify or classify signals detected in the frequency band in order to know, for example, whether a device should take certain actions to avoid interfering with other devices operating in the frequency band.

SUMMARY OF THE INVENTION

Briefly, a system and method are provided for classifying signals occurring in a frequency band. One or more characteristics of one or more signals in the frequency band are detected using any suitable technology, such as a device that can generate characteristics of signal pulses detected in the frequency band, wherein the signal is associated with the presence of energy having a spectral (center frequency, frequency bandwidth, etc.) characteristics and timing (pulse time duration, time between pulses, etc.) characteristics. Data pertaining to the signal pulses is accumulated over time. The accumulated signal data is compared against reference data associated with known signals to classify the one or more signals in the frequency band based on the comparison. The accumulated data may include one or more characteristics selected from the group consisting of: pulse center frequency, pulse bandwidth, pulse duration, time between pulses and number of different active pulses, and wherein the reference data associated with each of a plurality of known signals comprises one or more characteristics selected from the group consisting of: pulse center frequency, pulse bandwidth, pulse duration and time between pulses. The accumulated signal data is compared against the reference data, and depending on the degree of match with reference data, a signal can be classified. The reference data may include pulse timing signatures for known signals that are compared against the accumulated data. Further, raw samples of the signals can be taken and examined to classify the signal. Further still, classification may involve iterating through a plurality of different signal characteristics to detect signals that meet one or more of the plurality of different signal characteristics.

The above and other objects and advantages will become readily apparent when reference is made to the following description taken in conjunction with the accompanying drawings.

BRIEF DESCRIPTION OF THE DRAWINGS

FIGS. 8–11 illustrate histograms of signal pulse characteristics of several exemplary signals that may occur in an unlicensed radio frequency band.

FIGS. 18–26 are graphical diagrams showing information that can be displayed by a user interface application as part of the spectrum management system shown in FIG. 16.

DETAILED DESCRIPTION OF THE DRAWINGS

Figure 1:
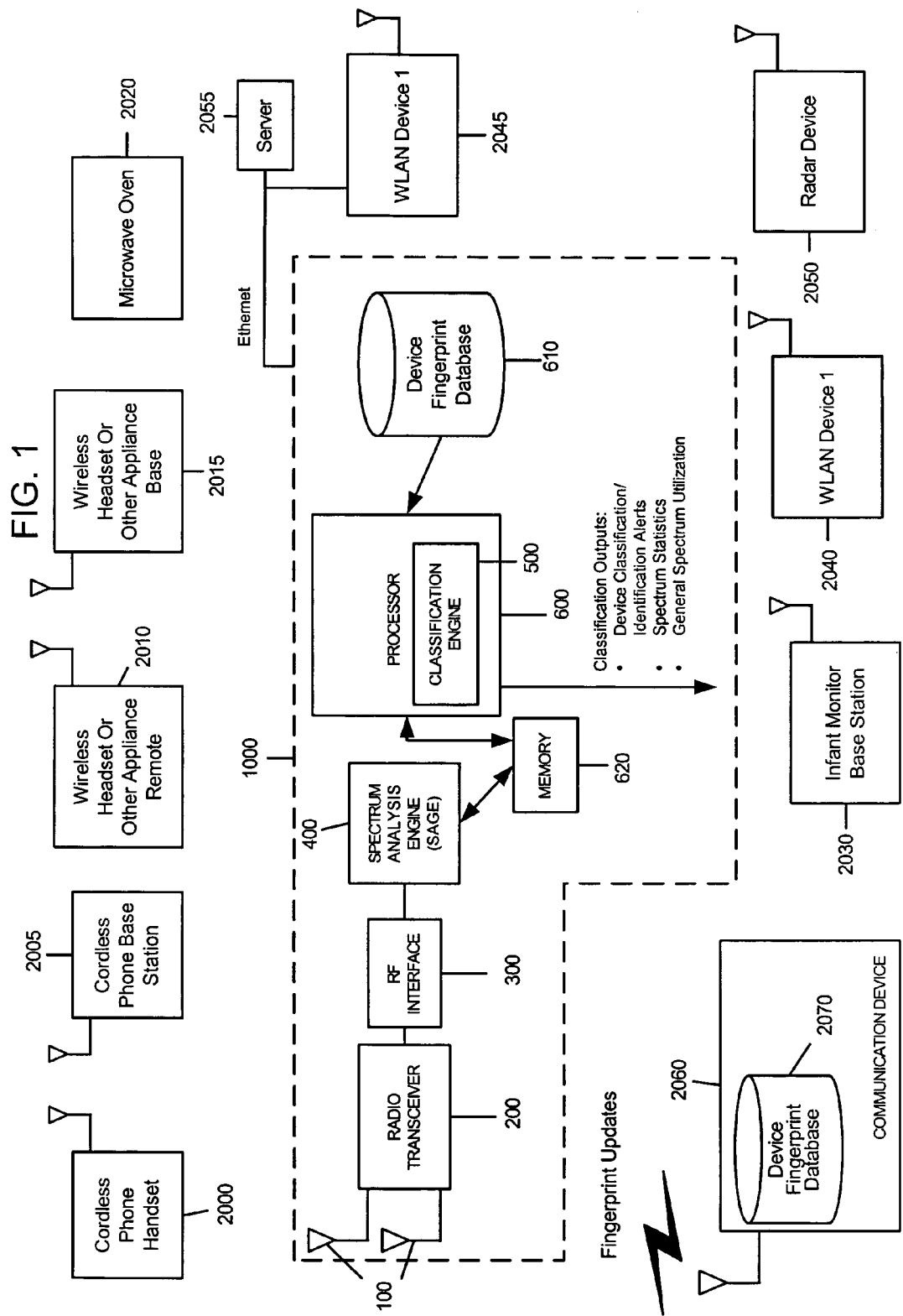
FIG. 1 is a block diagram showing a general environment for a signal classification system and method.

FIG. 1 shows a general environment for a signal classification system and method. A wireless communication device 1000 operates in an environment, such as an unlicensed radio frequency band, where signals of multiples types may be simultaneously occurring. Examples of other devices sharing the unlicensed frequency band with communication device 1000 are, for example, a cordless phone handset 2000 and cordless phone base station 2005, a wireless headset or other appliance remote 2010 and its base station 2015 (such as a device using the Bluetooth™ protocol or a device using the HomeRF™ protocol), a microwave oven 2020, an infant (video and/or audio) monitor base station 2030, a first wireless local area network (WLAN) device 2040 (such as an access point), a second WLAN device 2045 (such as a station) and a radar device 2050. Additional WLAN devices (e.g., stations) may be operating in the frequency band. Device 1000 may be any type of communication device, such as a WLAN device for example. Device 1000 may be in communication, or capable of communicating, with one or both WLAN devices 2040 and 2045. WLAN device 2045 may be a WLAN AP that is connected to a server 2055 via a wired LAN, e.g., Ethernet. Likewise, the device 1000 may be capable of connecting to the server 2055.

The communication device 1000 has a radio transceiver 200 coupled to one or more antennas 100. An RF interface 300 is coupled to the radio transceiver 200. A spectrum analysis engine (SAGE) 400 is coupled to the radio transceiver 200. The SAGE 400 is hardware peripheral that generates real-time spectrum activity information. The output of the SAGE 400 is the raw information used in the classification process. The SAGE 400 will be generally described hereinafter with reference to FIG. 4. It should be understood that any device capable of detecting signals in the frequency band and supplying raw information about those signals can be used in a classification process as described herein.

Though not specifically shown, the SAGE 400 may reside in a baseband section of a communication device in a VLSI implementation. A processor 600 executes a classification software program, called the classification engine 500, stored in a processor readable memory 620. Information used by the classification engine 500 to classify signals may be stored locally in a device fingerprint database 610 (also referred to as a profile or reference database). The concept of a fingerprint will be described hereinafter. In addition, new and updated device fingerprints may be downloaded to the communication device 1000 from another communication device 2060 that stores a more comprehensive and updated database 2070 of fingerprint definitions. The processor 600 executing the classification engine 500 may be an on-chip processor in the baseband section, or may be a host processor external to the baseband section, but in the communication device 1000 itself. Alternatively, the classification engine 500 may be executed on another device entirely separate from communication device 1000, in which case communication device 1000 would transmit spectrum information generated by the SAGE 400 via a wireless or wired link to the other device, such as to the server 2055 where the classification engine would be executed. For example, the classification engine could be executed on a server computer that communicates by wire or wirelessly to communication device 1000. Alternatively, if the communication device 1000 is a WLAN station, it may transmit the raw classification information to WLAN device 2045 which may be an access point with greater processing power and capable of overseeing communications in the WLAN. Data output by the SAGE 400 is stored in a memory 620 that the processor 600 accesses when performing the classification operations. The memory 620 may contain the fingerprint database 610 as well.

The communication device 1000 samples the RF spectrum in which it is operating via the radio transceiver 200. The radio transceiver 200 may downconvert the entire frequency band of interest for a given time interval or a portion of it at a given time interval. In addition, the radio transceiver 200 may scan to different portions of the frequency band to ultimately gather information about the entire frequency band. The SAGE 400 receives and processes the RF information from the radio transceiver 200 to output first level spectrum information, described hereinafter. The classification engine 500 processes the first level spectrum information with the use of device fingerprints to output information characterizing the activity in the RF spectrum and which classifieds/identifies devices operating in the spectrum. When a signal is "classified," data that describes the spectral parameters of the signal are determined sufficient to know generally what type of signal it is. The parameters may include the bandwidth, center frequency, frequency hopping rate (if it hops), pulse duration, time between pulses, etc. A signal that is classified can also be "identified" such as by the brand of the chipset that transmits its signal, or perhaps so specific as to identify the brand and model of the device that transmits the signal.

Figure 2:
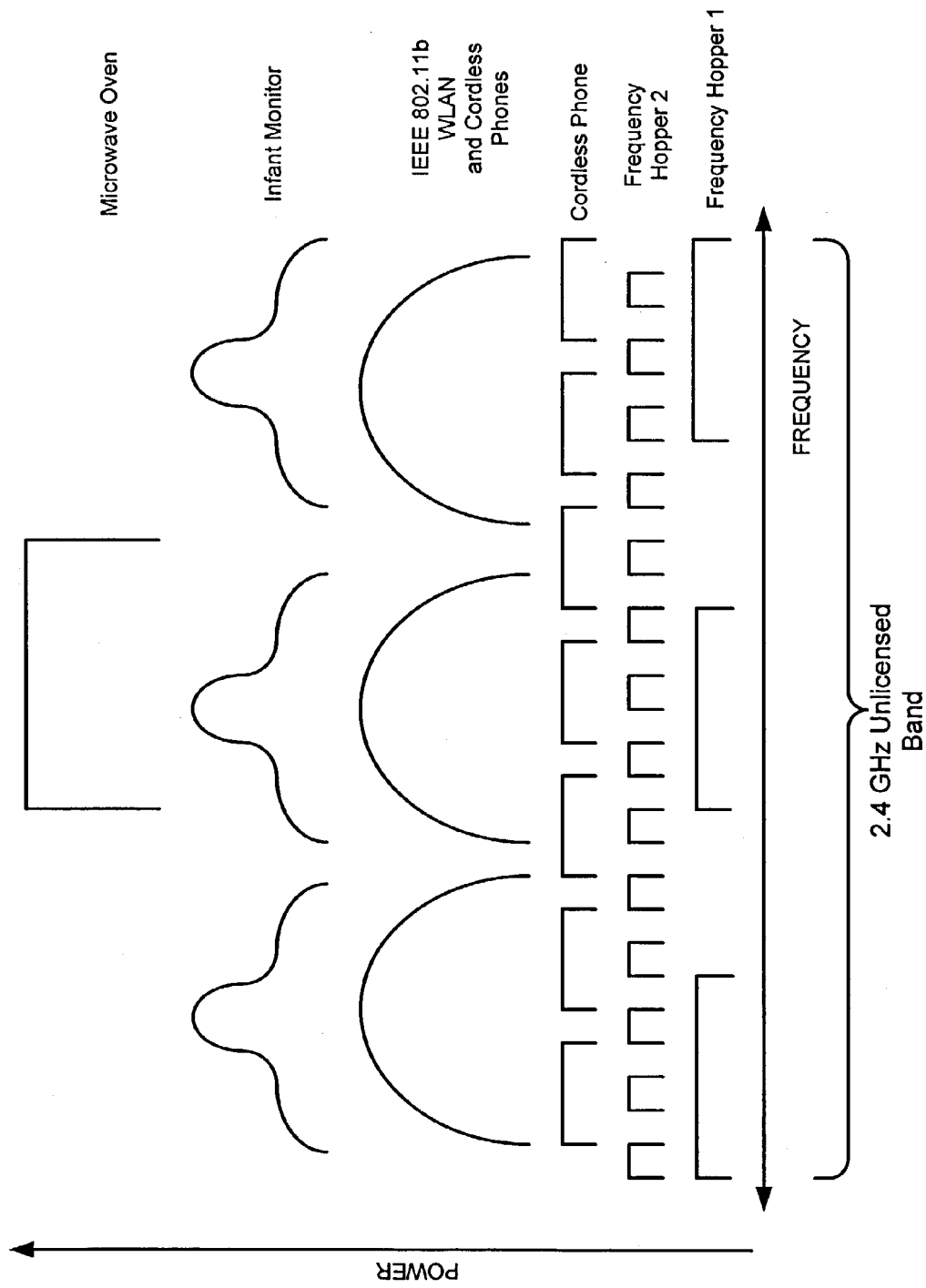
FIGS. 2 and 3 illustrate examples of the types of signals that may be simultaneously present in two exemplary radio frequency bands.
Figure 3:
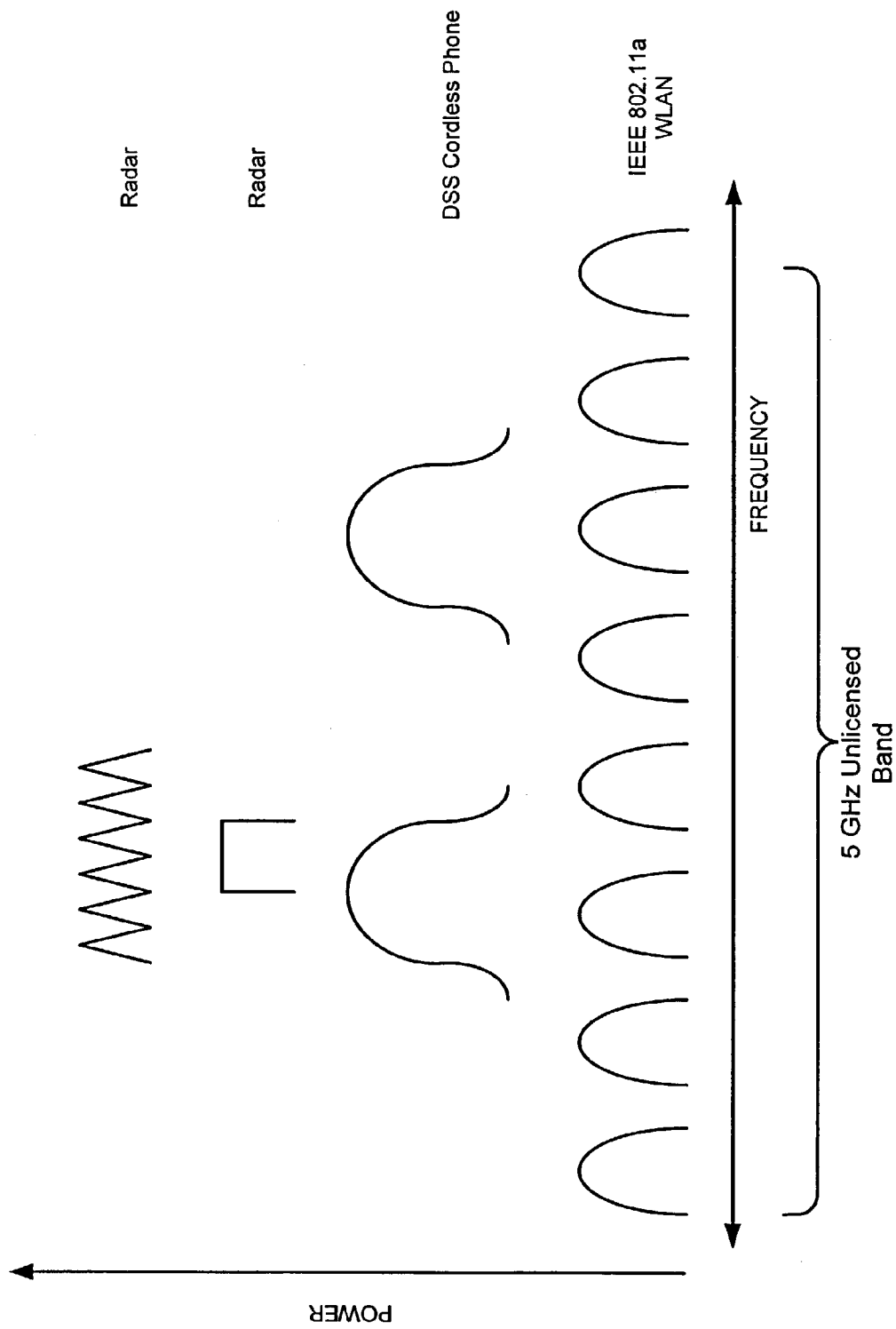

FIGS. 2 and 3 illustrate some examples of the spectral usage of two unlicensed frequency bands in the United States. FIG. 2 shows the spectral profiles of exemplary devices that operate in the 2.4 GHz unlicensed frequency band such as frequency hopper devices, cordless phones, IEEE 802.11b WLAN communication devices, infant monitor devices and microwave ovens. A frequency hopping device will occupy a predictable or random frequency sub-band at any given time, and therefore, over time, may span the entire frequency band. A cordless phone, of the non-frequency hopping variety, may occupy one of several frequency sub-bands (channels) at any given time. An IEEE 802.11b device will occupy one of several channels in the 2.4 GHz band at any given time, and an infant monitor is similar. A microwave oven will emit a burst of energy that may span a significant portion of the unlicensed band.

FIG. 3 shows a similar set of circumstances for the 5 GHz unlicensed bands. There are actually three unlicensed frequency bands at 5 GHz in the United States. Two of these are contiguous (and are meant to be represented by the diagram in FIG. 3) and the third is not contiguous with the other two (which for simplicity is not considered in FIG. 3). In the 5 GHz unlicensed bands, currently there are IEEE 802.11a WLAN devices operating in one of 8 different frequency sub-bands (channels), direct sequence spread spectrum (DSS) cordless phones, and various radar devices. At the time of this writing, the 5 GHz unlicensed band is relatively new, and not as widely used. However, as history has proven with the 2.4 GHz unlicensed band, greater use of the 5 GHz band is fully expected.

In an unlicensed band, it is inevitable that two or more of these devices will be transmitting at the same time. There is, therefore, a high likelihood that they will interfere with each other. When interference occurs, a signal from one device to another may not be received properly, causing the sending device to retransmit (and therefore reduce throughput), or possibly entirely destroying the communication link between two communication devices. Therefore, being able to classify or identify signals is an important prerequisite to intelligently managing the use of a shared frequency band. Once a signal type is known, actions in other devices operating in the frequency band can be tailored appropriately.

Figure 4:
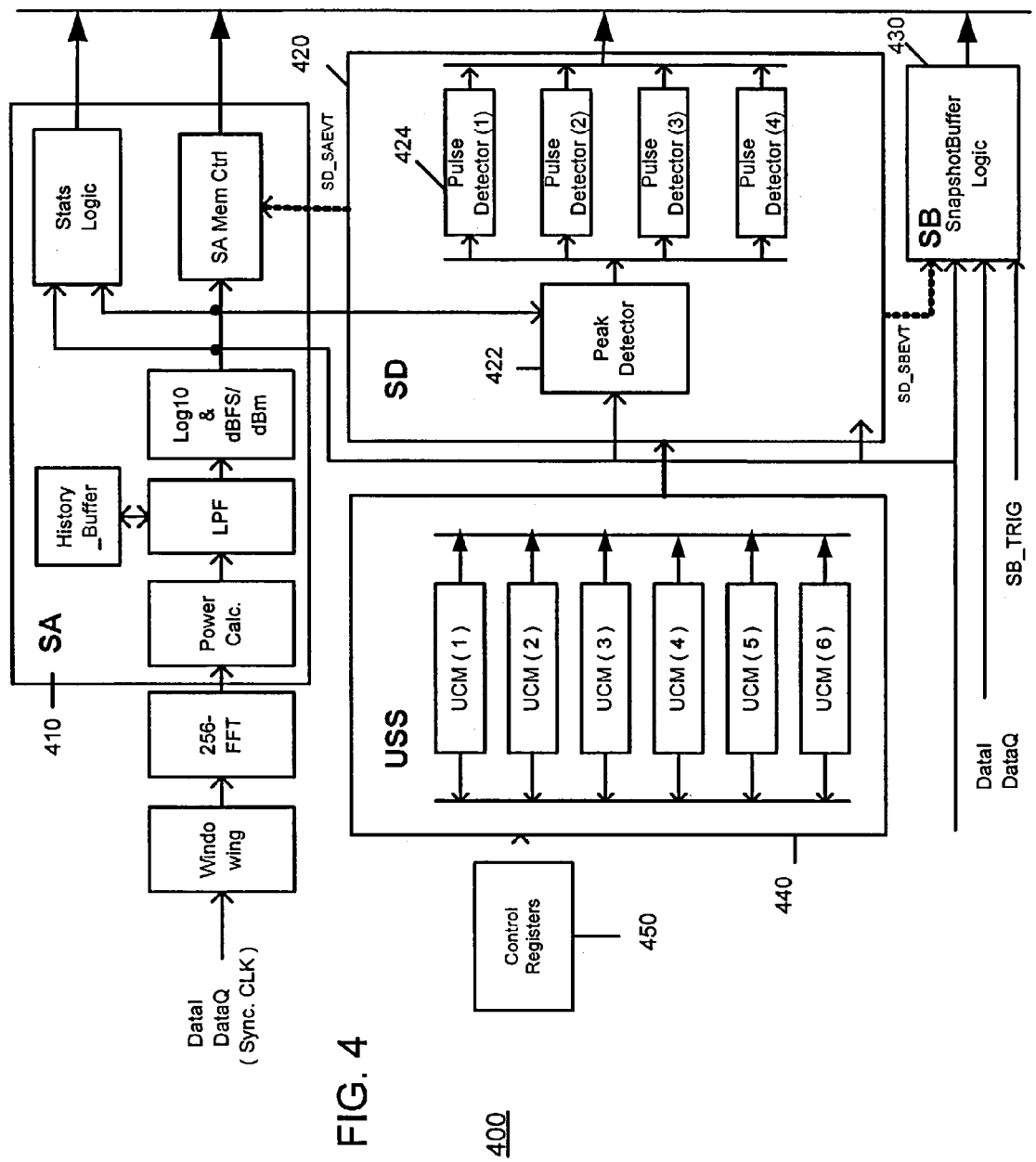
FIG. 4 is a block diagram of an exemplary spectrum analysis device that generates data useful as input to a signal classification process.

With reference to FIG. 4, the SAGE 400 comprises a spectrum analyzer 410, a signal detector 420, a snapshot buffer 430 and a universal signal synchronizer 440. The outputs of these components are coupled to the memory 620, which may be a dual port RAM. The processor 600 accesses the output of the SAGE 400 via the memory 620 and controls the SAGE 400 by writing configuration information to the control registers 450 that configures operation of the SAGE components. More details on the SAGE 400 are disclosed in co-pending commonly assigned application referred to above.

As described in that application, the SA 410 generates data representing a real-time spectrogram of a bandwidth of RF spectrum, such as, for example, up to 100 MHz using a Fast Fourier Transform (FFT) process. As such, the SA 410 may be used to monitor all activity in a frequency band, such as the 2.4 GHz or 5 GHz bands. As shown in FIG. 4, the data path leading into the SA 410 comprises an automatic gain control block (AGC) block, a windowing block, a NFFT=256-point complex FFT block, and a spectrum correction block. The windowing and FFT blocks may support sampling rates as high as 120 Msps (complex). The windowing block performs pre-FFT windowing on the I and Q data using either a Hanning or rectangular window. The FFT block provides (I and Q) FFT data for each of 256 frequency bins that span the bandwidth of frequency band of interest. For each FFT sampling time interval, the FFT block outputs M (such as 10) bits of data for each FFT frequency bin, for example, 256 bins. The spectrum correction algorithm corrects side tone suppression and DC offset.

Internal to the SA 410 are a lowpass filter (LPF), a linear-to-log converter, a decimator and a statistics block. The LPF performs a unity-gain, single-pole lowpass filtering operation on the power values of the signal at each FFT frequency. Using $P_{fft}(k)$ to denote the power value of signal at FFT frequency f(k), the lowpass filter output $P_{lpf}(k)$ is updated once per FFT period as follows: $P_{lpf}(k,t)=\alpha_1 \cdot P_{lpf}(k,t)+(1-\alpha_1) \cdot P_{lpf}(k,t-1)$, $1 \leq k \leq 256$, where $\alpha_1$ is a parameter specifying the LPF bandwidth. The linear-to-log block at the output of the FFT computes the decibel value $P_{dB}(k)=10*\log(|P_{lpf\_td}(k)|)$ for each FFT value $P_{lpf\_td}(k)$ (in dBFS, i.e., dB from full-scale on the ADC); the decibel value is subsequently converted to an absolute power level (in dBm) by subtracting the receiver gain control from the dBFS value. The stats block accumulates and stores the following statistics in the stats buffer of the memory 620: duty cycle vs. frequency during a period of time; average power vs. frequency during a period of time; maximum (max) power vs. frequency during a period of time; and number of peaks during a period of time. The stats block gives the basic information about other signals surrounding a device operating a SAGE 400. Duty cycle is a running count of the number of times the power at a FFT frequency bin exceeds a power threshold. Maximum power at a particular FFT frequency bin is tracked over time. The peaks histogram tracks the number of peaks detected over time intervals.

The signal detector 420 comprises a peak detector 422 and one or more configurable pulse detectors 424 coupled to the peak detector. The processor 600 (or another processor coupled to the processor 600, not shown, or another application program) configures the one or more pulse detectors to detect signal pulses that fall within specified ranges of bandwidth, power, center frequency, duration, etc., to detect signal pulses of certain types of signals.

More specifically, the peak detector 422 detects a peak as a set of FFT points in contiguous FFT frequency bins, each above a configured minimum power level. Once per FFT interval, the peak detector 422 outputs data describing those frequency bins that had a FFT value above a peak threshold and which frequency bin of a contiguous set of frequency bins has a maximum value for that set. In addition, the peak detector 422 passes a power vs. frequency bin data field for each FFT interval. This can be represented by the pseudo code (where k is the frequency bin index):

$$PDB_{diff}(k) = PDB(k) - SD\_PEAKTH;$$

$$\text{If}(PDB_{diff}(k) = 0)$$

$$PDB_{peak}(k) = PDB(k);$$

$$PEAKEN(k) = 1;$$

Else $$PDB_{peak}(k) = 0;$$

$$PEAKEN(k) = 0;$$

End

The peak detector 422 outputs the bandwidth, center frequency and power for each detected peak.

A pulse detector 424 calculates relative thresholds based on configuration information, and checks whether a peak exceeds the relative thresholds. If a peak exceeds the relative threshold, it defines the peak as a pulse candidate. Once a pulse candidate is found, the pulse detector compares the identified pulse candidate with a pulse definition such as ranges for power, center frequency, bandwidth and duration (defined by the pulse detector configuration information). After matching a pulse candidate with a defined pulse associated with the configuration information, the pulse detector declares that a pulse has been detected and outputs pulse event data (power, center frequency, bandwidth, duration and start time) associated with the detected pulse If a pulse detector detects a pulse that meets the configured criteria, it outputs signal pulse event data for that pulse, including one or more of center frequency, bandwidth, duration, time between pulses and power. The spectrum analyzer 410 outputs duty cycle statistics such as the percentage of time of energy at each frequency in a frequency band and the average power and maximum power at each frequency (for example, at each of the 256 FFT frequency bins processed by the spectrum analyzer 410). A pulse detector 424 in the signal detector 420 can also be configured by the processor 600 to trigger the snapshot buffer to store raw analog-to-digital (ADC) samples of the received signal when a pulse of a particular type is detected. Other devices or processes may be used to generate raw spectrum information useful by a signal classification process.

Consequently, the first level spectrum information may include one or more of:
1. Signal pulse data (called pulse events): a list of pulse center frequencies, bandwidths, power, duration and time between pulses, for pulses detected by each of the pulse detectors.
2. Duty cycle statistics.
3. Average power and maximum power at each frequency.
4. Raw analog-to-digital samples of the received signal.

Figure 5:
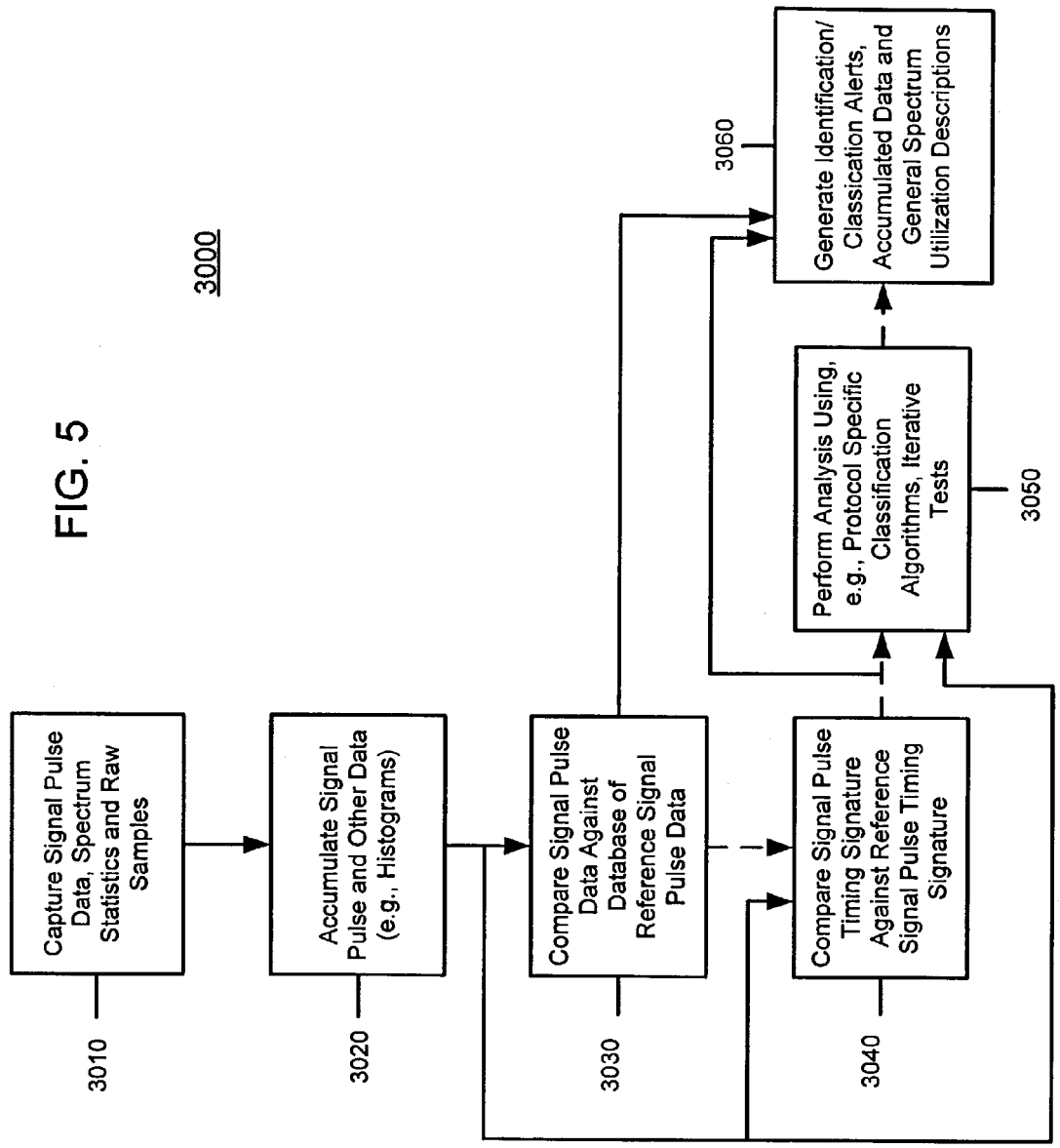
FIG. 5 is a flow chart depicting the various steps of the signal classification process.

With reference to the flow chart of FIG. 5, the signal classification process 3000 executed by the classification engine 500 will be generally described. In step 3010, the classification engine captures raw spectrum information, such as signal pulse data, duty cycle and other spectrum statistics, and raw snapshot samples (if any). In step 3020, the classification engine 500 (or a separate process referred to hereinafter in conjunction with FIG. 16 as the measurement engine) accumulates signal pulse and other data from the raw spectrum information. The accumulated data may take the form of histograms, examples of which will be described hereinafter. Accumulated signal pulse data may cover relatively short intervals of time which is suitable for classifying some types of signals, and in other cases, may cover relatively longer intervals of time.

Steps 3030 through 3050 depict the various ways that the accumulated signal pulse data may be processed to classify a signal. The classification engine 500 uses device fingerprint definitions from a fingerprint database to compare with accumulated signal pulse data. A fingerprint definition includes signal descriptive or other information that is used to identify a device or a class of devices from the signal pulse data. A fingerprint definition may include:

1. Characteristics of a signal pulse: center frequency, pulse duration, bandwidth, time between pulses, etc.
2. Pulse timing signature template: definition of recurring pulse patterns, commonly related to a particular communication protocol or standard.
3. Iterative test definitions: iteratively search for specific signal characteristics.
4. Custom algorithms: specific algorithms which examine statistics and pulses looking for a specific device. These are usually communication protocol-specific programs.
5. "Expert" system analysis: more "intelligent" program to process historical statistics and pulse events over longer periods of time.
6. Techniques for analyzing snapshot samples for a specific preamble/codeword pattern.

In step 3030, the classification engine 500 compares the accumulated signal pulse data with reference data of known signals in the fingerprint database 610 and tries to classify the pulse(s). In step 3040, pulse timing signatures are for signal classification. Pulse timing signatures templates of known signals are compared against pulse timing signatures derived from the accumulated signal pulse events. Examples of how pulse timing signatures are used is described in more detail hereinafter in conjunction with FIG. 13.

In step 3050, additional algorithms or iterative tests can be performed that are designed to classify otherwise hard to match pulse types. For example, in some cases, fingerprinting may be enhanced by detecting the leading sync-word of a pulse. Raw ADC samples of the frequency spectrum are analyzed for matches with sync-word formats or patterns in the fingerprint database. An algorithm running on a standard microprocessor can classify most sync-words expected to be detected in the unlicensed frequency band.

In step 3060, an identification/classification alert is generated for each signal that either classifies the signal or specifically identifies it. In addition, the power, duty cycle and center frequency (channel) information for each detected and/or identified pulse (referred to as general spectrum utilization descriptions) is output, as well as information generated by the spectrum analyzer (SA statistics) and the signal detector in the SAGE 400. An identification/classification alert may contain center frequency information (when relevant), a signal identification/classification (described above), a probability indicator, as a well as power and duty cycle information for the signal. The signal identification/classification information may indicate whether the signal is a microwave oven, frequency hopping signal (Bluetooth™ SCO or Bluetooth™ ACL, for example), cordless telephone, IEEE 802.11 signal, IEEE 802.15.3 device, or one of various radar types.

The order of the steps for the flowchart shown in FIG. 5 is not meant to be restrictive. Any one or a combination of steps 3030, 3040 and 3050 may be performed (in any order in the case of a combination) before step 3060. For example, in some cases, it may be desirable to execute specific classification algorithms on signal pulse data first or early in the sequence of signal classification events.

Information used to build or compile a fingerprint definition is obtained from one or more of the following sources:

1. Industry standards or protocols, such as IEEE 802.11, Bluetooth™, IEEE 802.15.3, HomeRF™, etc.
2. Public filings with the U.S. Federal Communications Commission (FCC).
3. Public information from research publications.
4. Lab tests using a spectrum analyzer, duty cycle analyzer and/or vector analyzer.
5. Operations of spectrum analysis engine (e.g., SAGE 400 in FIG. 4) to obtain pulse event duty cycle and spectrum analyzer output information representative of various signals. See FIG. 14 and the accompanying description hereinafter.

Figure 6:
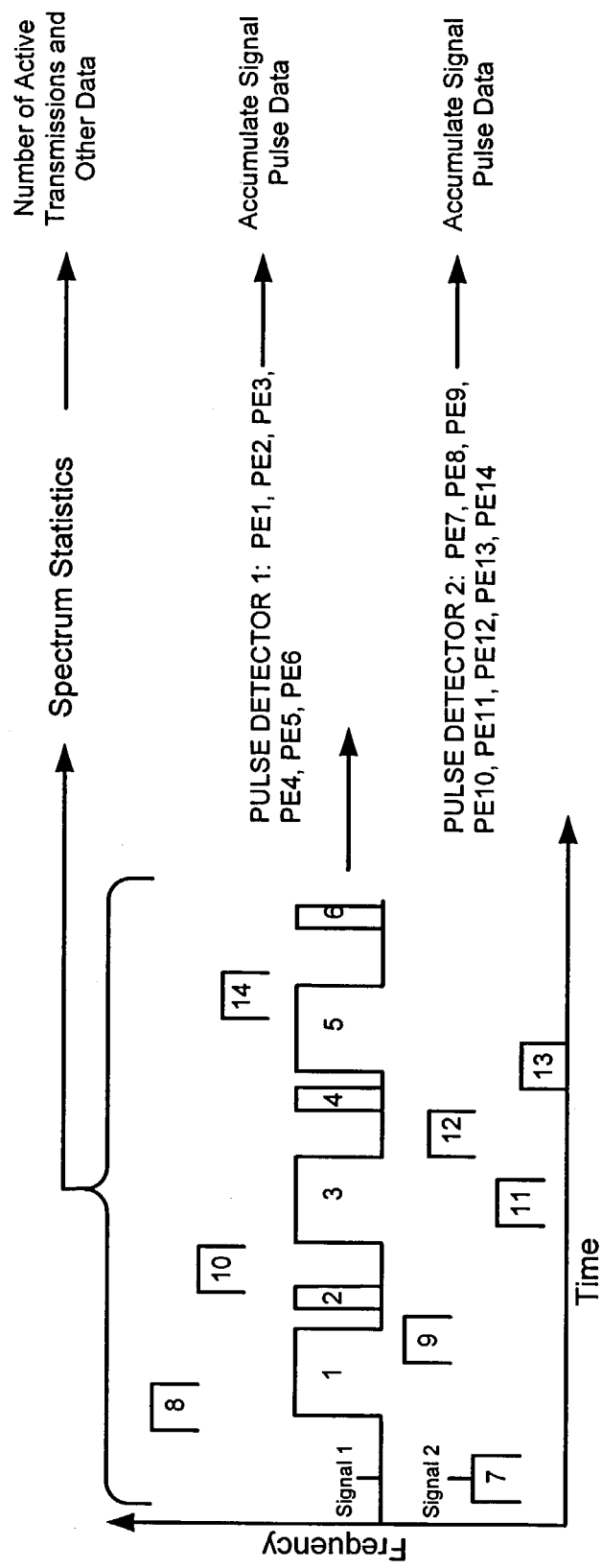
FIG. 6 is a graphical diagram illustrating exemplary signals that may occur in a frequency band and how data related to those signals is accumulated for input into the signal classification process.

FIG. 6 illustrates exemplary signal pulses of signals that may be present in the frequency band. There is IEEE 802.11b signal activity that consists of pulses 1–6. Pulses 1, 3 and 5 are the forward channel 802.11b transmissions and pulses 2, 4 and 6 are acknowledgement signals. There is also a frequency hopping signal, such as a Bluetooth™ SCO signal comprising pulses 7–14. The timing, strength and duration of the signals are not shown at precise scale. Pulse event information (pulse data) is generated for signal pulses 1–6, for example, by a pulse detector configured appropriately. Pulse event information is generated for signal pulses 7–14 by another pulse detector configured appropriately. The signal pulse data is accumulated over time for the two types of signals. The signal pulse data may be accumulated into various histograms to be described in conjunction with FIG. 7. In addition, spectrum analysis information may be derived from the signal activity in the frequency band, and this information can be used to generate, for example, the number of different transmissions that appear to be present in the frequency band at a given time period by counting the number of power values (above a threshold) at different frequencies in the band during the same time interval.

Examples of the pulse event data that is generated for exemplary pulses shown in FIG. 6 are provided below.

| Pulse 1 | |
|---|---|
| SDID: | 1 (identifying pulse detector 1) |
| Pulse Bandwidth: | 11 MHz |
| Center Frequency: | 37 MHz |
| Pulse Duration: | 1.1 msec |
| Power: | −75 dBm |
| Pulse 2 | |
| SDID: | 1 |
| Pulse Bandwidth: | 11 MHz |
| Center Frequency: | 37 MHz |
| Pulse Duration: | 200 microsec |
| Power: | −60 dBm |
| Pulse 3 | |
| SDID: | 1 |
| Pulse Bandwidth: | 12 MHz |
| Center Frequency: | 37 MHz |
| Pulse Duration: | 1.1 msec |
| Power: | −75 dBm |
| Pulse 4 | |
| SDID: | 1 |
| Pulse Bandwidth: | 11 MHz |
| Center Frequency: | 37 MHz |
| Pulse Duration: | 200 microsec |
| Power: | −60 dBm |

-continued

Pulse 5

| | |
|---|---|
| SDID: | 1 |
| Pulse Bandwidth: | 13 MHz |
| Center Frequency: | 37 MHz |
| Pulse Duration: | 18 msec |
| Power: | −75 dBm |

Pulse 6

| | |
|---|---|
| SDID: | 1 |
| Pulse Bandwidth: | 11 MHz |
| Center Frequency: | 37 MHz |
| Pulse Duration: | 200 microsec |
| Power: | −60 dBm |

Though not listed above, also included in the information for each pulse is the start time of a pulse, thereby enabling computation of the time between consecutive pulses detected by a pulse detector.

The pulse event data for pulses 7–14 are very similar, with the exception of the center frequency. For example, pulses 7–14 may have a pulse bandwidth of 1 MHz, a pulse duration of 350 microsec, whereas the center frequency will vary across nearly all of the 2400 MHz to 2483 MHz frequency band. The SDID for pulses 7–14 is 2, since pulse detector 2 is configured to detect these types of pulses, for example.

Figure 7:
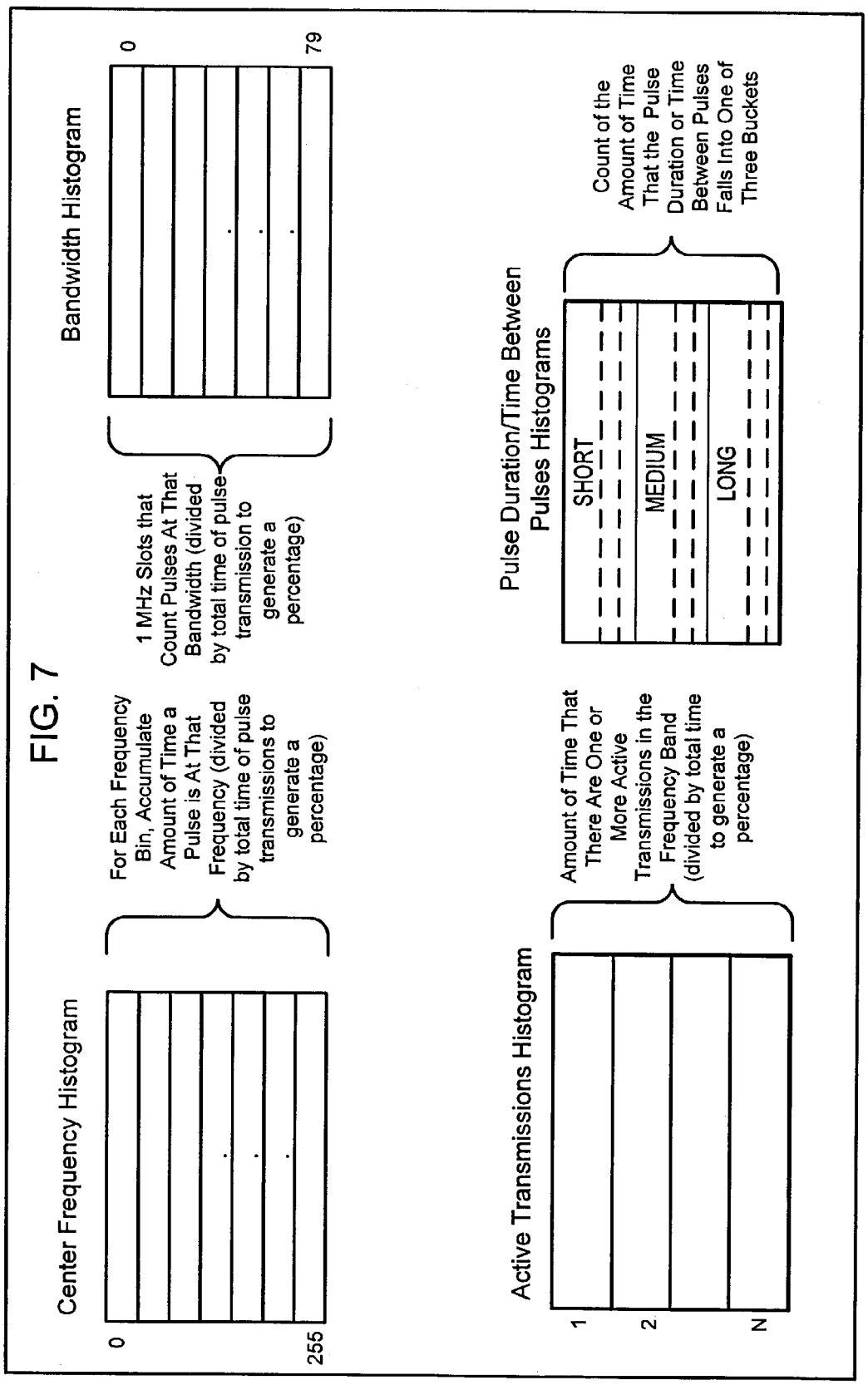
FIG. 7 illustrates examples of accumulated signal pulse data used by the signal classification process.

Turning to FIG. 7, examples of the types of accumulated signal pulse data will be described. These examples of accumulated signal pulse data are histograms of pulse characteristics, but it should be understood that other ways to accumulate different types of signal pulse data may also be suitable. There is a center frequency histogram that tracks the percentage of time a given center frequency is observed for a signal pulse. For example, for a 256 FFT, there are 256 frequency bins that accumulate the amount of time (or number of events) that pulses occur at a particular frequency/frequencies. After a certain amount of time, each accumulated time in a frequency bin is divided by a total amount of time that the pulses were being transmitted, to generate a percentage at each frequency bin or frequency bins. Each frequency bin may be represented by a byte that ranges from 0 to 100 and represents the percent of time at that center frequency.

Similarly, there is a bandwidth histogram that tracks a given bandwidth observed for signal pulses. For example, if the entire bandwidth of the frequency band is 80 MHz, then there may be 80 1 MHz slots that are used to count the amount of time a pulse is at a particular bandwidth. Again, after a certain amount of time, each bandwidth count is divided by a total amount of time that the pulses were being transmitted in order generate a percentage value. For example, each byte bwPercent[N] represents the percentage of pulses having a bandwidth of N.

The pulse duration and time between pulses (also called pulse gap) observed for a signal pulse may be tracked with separate histograms that have generally the same form as shown in FIG. 7. There may be three categories of pulse duration and time between pulses: short, medium and long, partitioned by appropriate thresholds. The categories can be broken down as follows:

| Bin Size Type | Bin Start Range (microsec) | Individual Bin Size (microsec) | Number of Bins in Range | First Bin in Range (microsec) | Last Bin in Range (microsec) |
|---|---|---|---|---|---|
| Short | 0 to 190 | 10 | 20 | 0 to 9 | 190 to 199 |
| Medium | 200 to 1499 | 50 | 26 | 200 to 249 | 1450 to 1499 |
| Long | 1500 to 14500 | 500 | 27 | 1500 to 1999 | All times greater than 14500 |

Each of the bins represents the percentage of occurrences of gaps or durations within the range of that bin. The percentage values range from 0 to 100, with accuracy with ½ percentage point. For example, an unsigned value from 0 to 200 can be used to represent the 0 to 100 percentage value.

Another data that can be generated and used for signal classification and other purposes is data that tracks the number of different simultaneous transmissions in the frequency band during a period of time. The active transmission histogram is an example of such data. It shows the percentage or time that one to 4 or more different signal transmissions were in progress during a sampling interval, based on the number of different pulses tracked by the 4 pulse detectors. It should be understood that 4 is only an example of the number of different pulses that could be simultaneously tracked. This type of data is very useful in determining when two or more signals of the same or different type are simultaneously active in the frequency band.

The reference signal pulse data against which the accumulated signal pulse data is compared, is similar in structure to the accumulated signal pulse data. The active transmission data is useful to classify signals that are simultaneously occurring in the frequency band; it is not generally part of the reference data for a particular signal type, but is useful intelligence to process the signal data.

FIGS. 8–11 are pictorial diagrams that represent accumulated signal pulse data in the form of histograms of individual pulse characteristics of known signals. These diagrams are merely representative of the underlying reference histogram data, and are not meant to represent how the data is stored and processed. FIG. 8 shows histograms for a frequency hopping signal device, such as a Bluetooth™ synchronous (SCO) packet. The center frequency histogram for this type of signal indicates that the center frequency may be anywhere in the frequency band with equal likelihood. The pulse duration histogram indicates that this signal is consistently approximately 400 microsec long. (This may fall into a short bin of pulse duration as explained above in conjunction with FIG. 7, if the pulse duration is represented that way.) The bandwidth histogram for this signal indicates that it is always approximately 1 MHz wide. Finally, the time between pulses histogram indicates that half the time, the pulse gap is very short, and the other half of the time, the pulse gap is approximately 3000 microsec. In order to match accumulated signal pulse data to a signal of this type, the match criteria (referred to hereinafter in conjunction with FIG. 12) may be quite rigid with respect to the pulse duration, bandwidth and time between pulses histograms.

Figure 9:
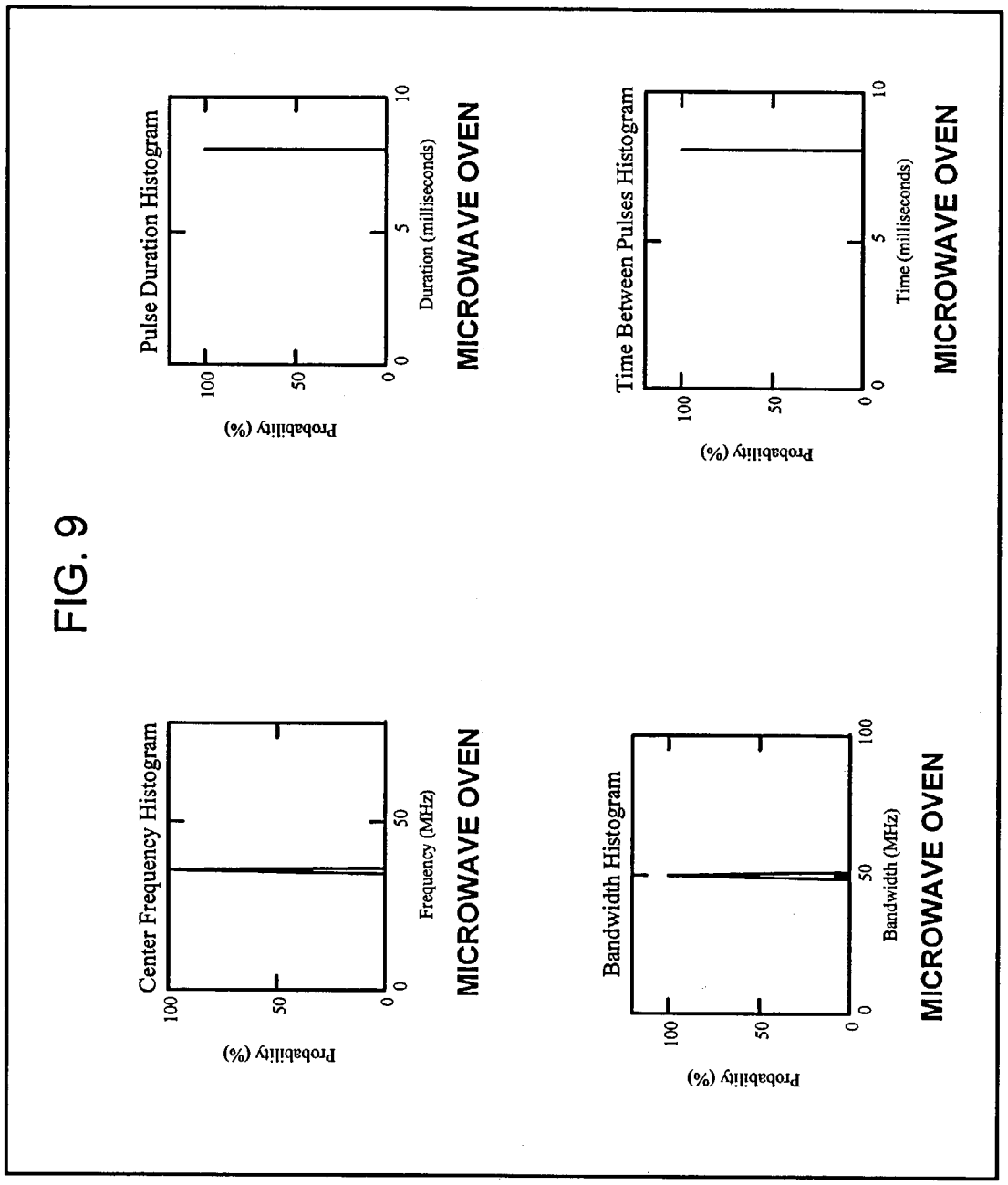

FIG. 9 shows histogram data for a microwave oven. The center frequency histogram for this type of signal may indicate that it is always at approximately one frequency, such as 40 MHz (in the 80 MHz wide 2.4 GHz unlicensed band). However, microwave ovens are also known to occur across wider portions of the frequency band. The pulse duration histogram indicates that it is always approximately 8 msec long. The bandwidth histogram may indicate that the microwave oven pulse is always approximately 50 MHz wide, but it can be wider. Finally, the time between pulses histogram indicates that it is always approximately 8 msec.

FIG. 10 shows histogram data for an IEEE 802.11b signal. Because an IEEE 802.11b signal could occur at any of several frequency channels in the frequency band, the center frequency histogram is not by itself very useful (unless prior knowledge is gained from general spectrum activity information that suggests there is 802.11 activity at a particular frequency channel). However, the bandwidth, pulse duration and time between pulses are useful, if not for classifying an 802.11 signal, then at least for a guide to suggest application of other signal classification techniques, such as a classification program or algorithm, described hereinafter.

Figure 11:
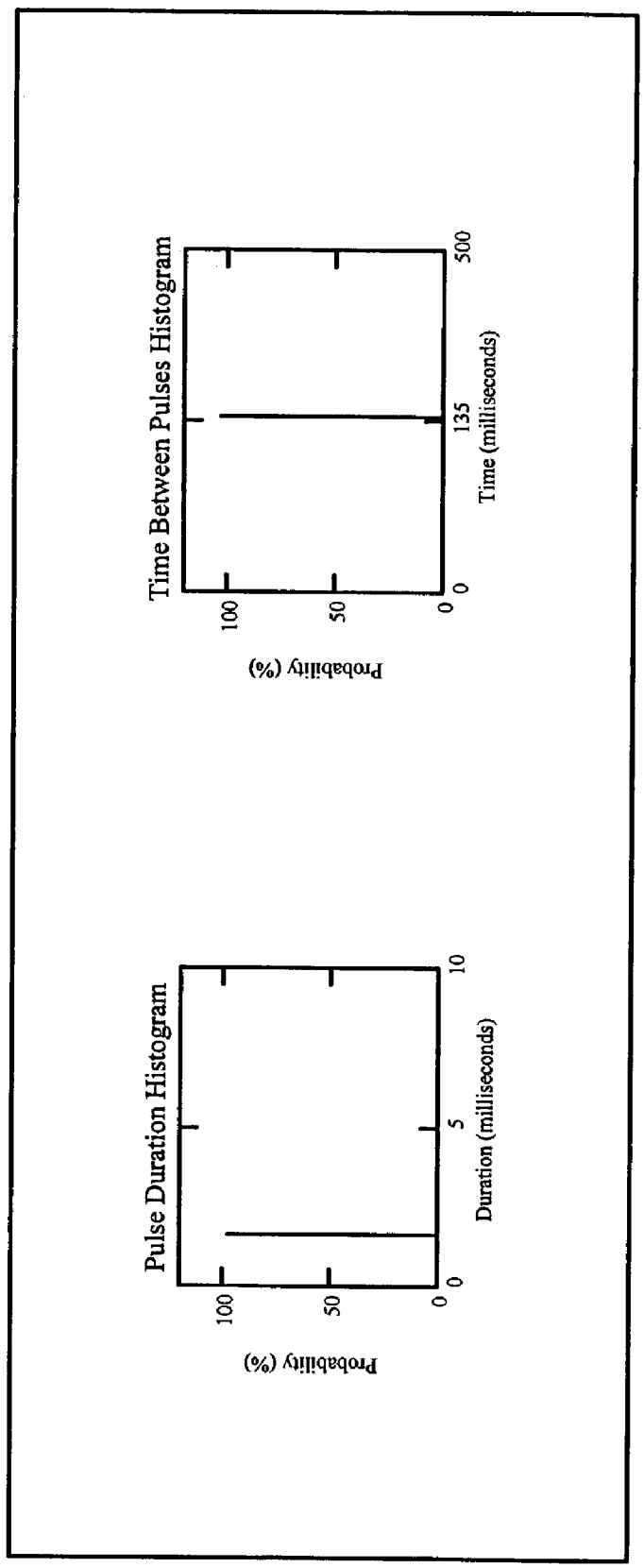

FIG. 11 shows histogram data for one type of a radar signal. This type of signal may have a pulse duration of approximately 2 msec and a time between pulses of 135 msec. For example, most radar devices emit a pulse for a single pulse duration and repeat at the same time duration between pulses. Thus, the pulse duration histogram and the time between pulses histogram are very useful in identifying a signal as radar.

Figure 12:
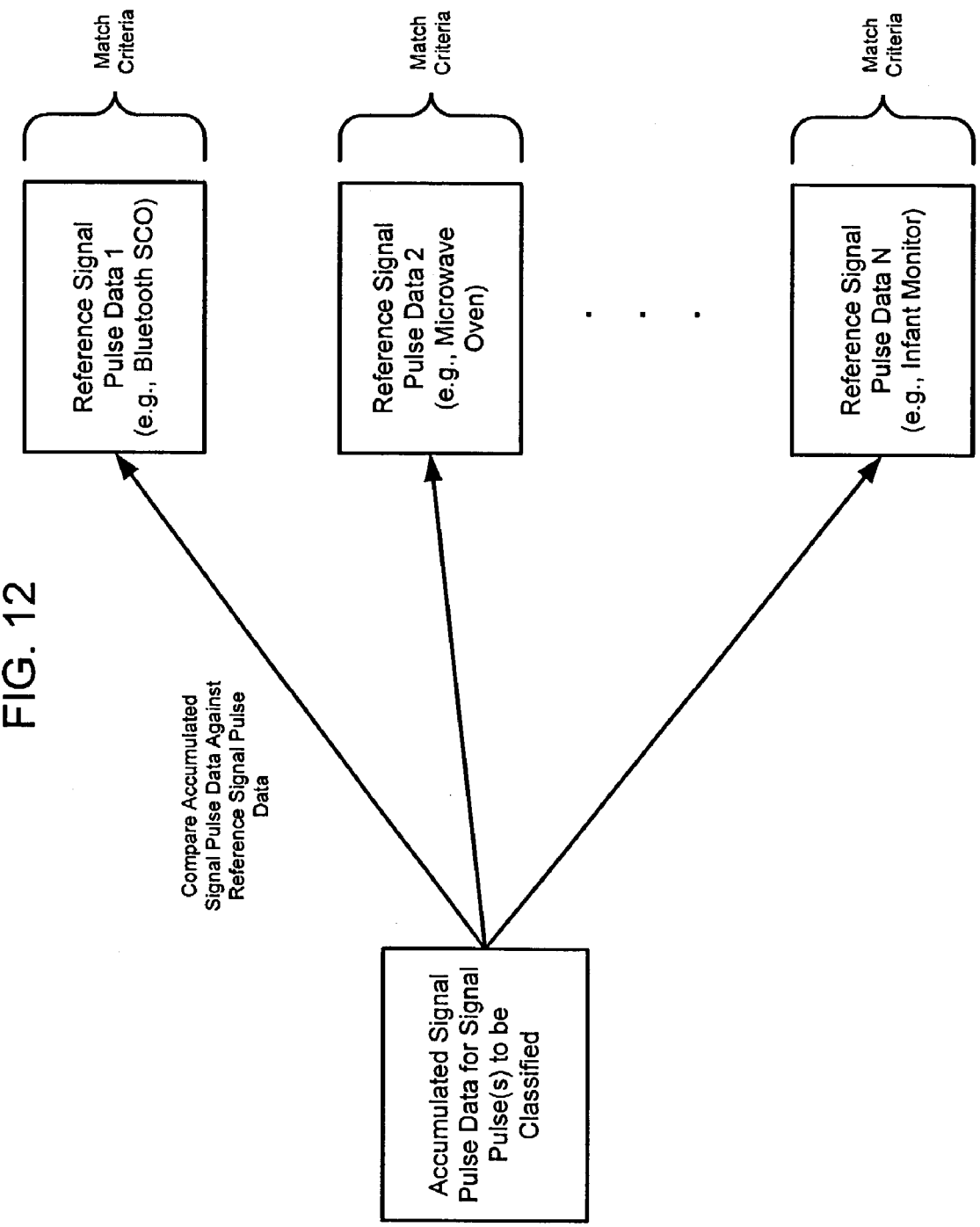
FIG. 12 is a diagram depicting how accumulated signal pulse data is compared with reference signal pulse data of known signals.

FIG. 12 depicts what is occurring during the comparison step 3030 in the flowchart of FIG. 5. The accumulated signal pulse data (e.g., histograms) for the signals to be classified are compared against reference or profile signal pulse data for known signals. Each histogram of the accumulated signal pulse data is compared against a like-kind histogram of the reference signal pulse data. The degree of match between the accumulated signal pulse data and the reference signal pulse data may be adjustable and for certain reference signal pulses, a very close match on certain pulse data must be found, as compared to other signal pulse data. To this end, each reference data set may have its own match criteria that must be satisfied in order to ultimately declare a match. For example, when comparing accumulated signal pulse data with reference data for a Bluetooth™ SCO signal, there must be very precise matches between the pulse duration, bandwidth and time between pulses histograms in order to declare a match. A scoring system may be used, where a numeric value is assigned to the comparison results between each signal characteristic. For certain signal types, if the total numeric value (e.g., total score) is at least as great as a certain value, then a match may be declared. An additional constraint may also require that certain signal characteristics must have a minimum degree of match.

Figure 13:
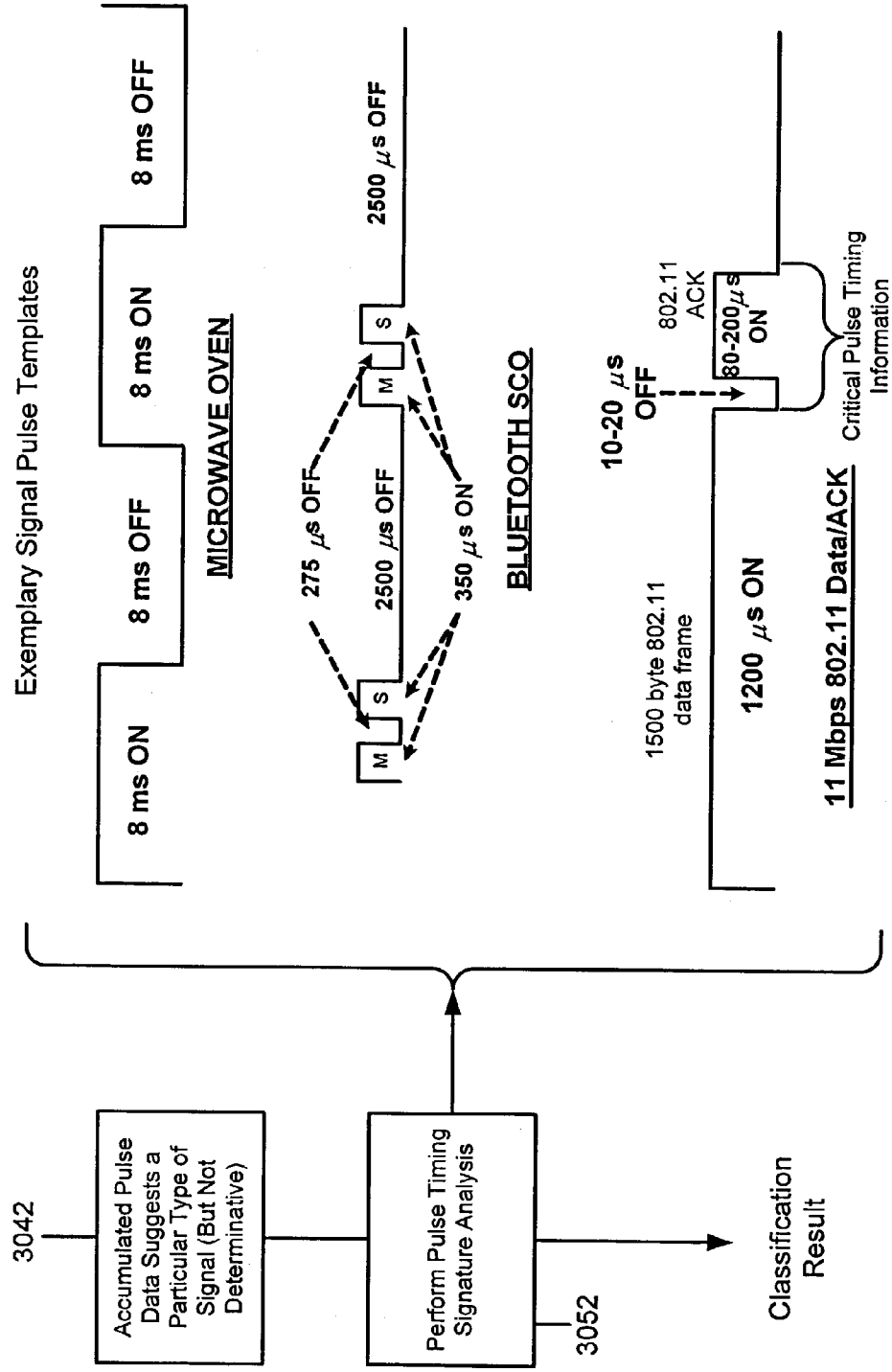
FIG. 13 is a diagram depicting how signal pulse timing signatures templates of known signals are compared against signal pulse data of unknown signals for purposes of signal classification.

Pulse time signatures can provide a distinctive representation of a device or class of devices. They are useful to classify signals that have very rigorous timing attributes. FIG. 13 depicts a process whereby in step 3042, the accumulated pulse data for a particular pulse may suggest that it is of a particular type, but it is not necessarily determinative. For example, suggestive characteristics of an 802.11 signal is the presence of a signal pulse with a very short duration, no more than 200 microsec and a time between pulses of no more than 20 microsec. However, the additional data (center frequency and bandwidth) is not sufficient to confirm that it is an 802.11 signal. Therefore, in step 3052, pulse timing signature analysis (i.e., pattern) is performed on the pulse data. For example, the pulse timing analysis for an 802.11 signal is focused on identifying two signal pulses on the same center frequency separated from each other by no more than 20 microsec, and where the second signal pulse (an 802.11 ACK pulse) is no more than 200 microsec. The duration of the first pulse for an 802.11 signal is not particularly relevant to this analysis.

A similar analysis may be performed on the pulse data against pulse signature information for a Bluetooth™ SCO signal in which activity consists of two bursts of energy (pulses) very close in time. Energy associated with a first pulse may occur at one frequency in the band, and energy associated with a second pulse may occur at another frequency in the band, separated from the first pulse by a time interval that recurs on a consistent basis. In fact, the Bluetooth™ SCO signal shown in FIG. 13 is representative of many unlicensed band devices that employ a frequency hopping sequence and involve a transmission by a first device (e.g., a "master" shown as "M" in FIG. 13) followed a precise period of time later by a transmission by a second device (e.g., a "slave" shown as "S" in FIG. 13). The time period between the leading edge or trailing edge of the first pulse and the leading edge of the second pulse is commonly very consistent. Both pulses may be relatively short in duration. In addition, the time period between the leading edge of the second pulse and the leading edge of the next first pulse may be very consistent. A Bluetooth™ ACL transmission is quasi-periodic in the sense that sometimes it looks periodic and has timing signatures similar to Bluetooth™ SCO transmissions, and sometimes it does not.

Pulse timing signatures of known signals are compared against the accumulated data (typically over relatively short periods of time) to determine if there is a match within certain predetermined and adjustable tolerances. The visual paradigm is as if sliding a pulse timing template of a known signal along the accumulated pulse data of an unknown signal to determine if there is a sufficient match.

The pulse timing signature analysis for a frequency hopping signal is slightly different if the spectrum information is derived from sampling of only a portion of the frequency band, rather than the entire band that the signal may hop in. For example, while a frequency hopping signal is just as likely to occur anywhere in a frequency band, such as the 2.4 GHz band, if data for only a 20 MHz portion of the band were provided as input to the classification process, then the signal pulse data would show a relatively smaller percentage of pulses from the frequency hopping signal. The pulse timing signature analysis would be adjusted accordingly.

Classifying a pulse using timing signature templates is particularly useful when more than one device is transmitting in the frequency band. Pulse timing signature information for a signal can be represented by data describing the characteristics of a pulse, such as pulse duration, time between pulses, etc. This information can then compared against similar pulse timing signature information to determine whether there is a match.

Another way to iteratively search for different signal characteristics is to iteratively operate the pulse detectors in the SAGE with different parameters, with the goal of eventually detecting signal pulses that match the configured parameters of a pulse detector. The matching signal pulse characteristics are accumulated over time, and then run through the signal classification processes.

When several signals are being classified simultaneously, it may be useful to loosen the match requirements initially when processing data, and then once signals have been classified with a minimum confidence level, the match requirements can be tightened to ensure, over time, that the initial signal classifications holds over time.

Figure 14:
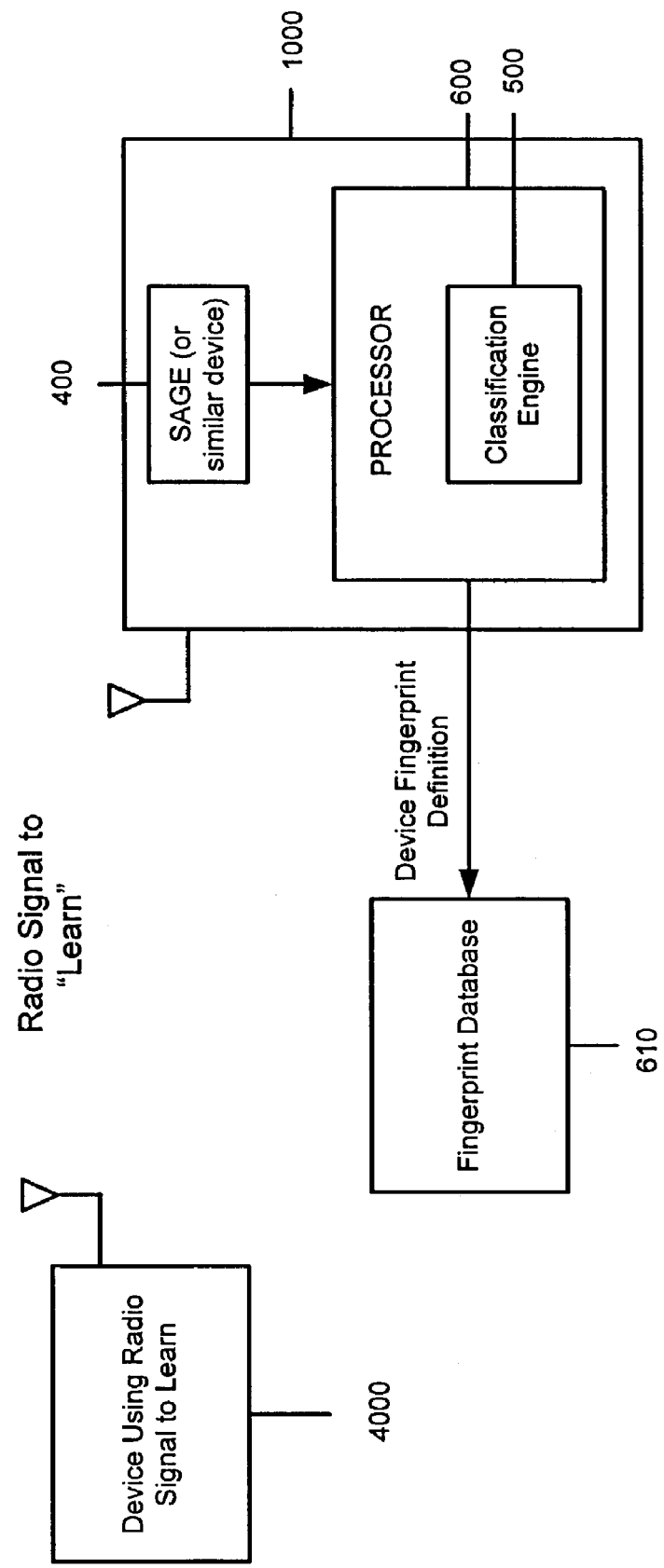
FIG. 14 is a block diagram showing how reference data for new signals can be generated for use in a signal classification process.

FIG. 14 illustrates an environment that is useful to learn the distinctive profile of a device and create a fingerprint definition. A device 4000 that transmits a radio signal to learn is turned on in an environment where a communication device 1000 having the SAGE 400 (or other device capable of providing similar output as the SAGE 400) resides. The communication device 1000 operates the SAGE 400 to generate signal pulse data, spectrum analysis statistics, etc., from the signal that it receives from the device 4000. This SAGE output may be processed by processor 600 executing the classification engine 500. The processor 600 may be part of the communication device 1000 using the SAGE 400, or may be located in another device remote from communication device 1000, such as in a server computer, for example. If located remotely, the SAGE outputs are transmitted wirelessly or by wire to processor 600. The classification engine 500 processes the SAGE outputs generated based on the transmission in the frequency band by the device 4000, accumulates signal pulse data (e.g., builds histograms) similar to the ones described above and uses those histograms as the appropriate set of fingerprint definitions to classify/identify the device 4000 and update the fingerprint database 610. Alternatively, the accumulated data can be used to design specific classification algorithms, pulse timing signature templates, etc., to classify/identify signals of the device 4000.

Figure 15:
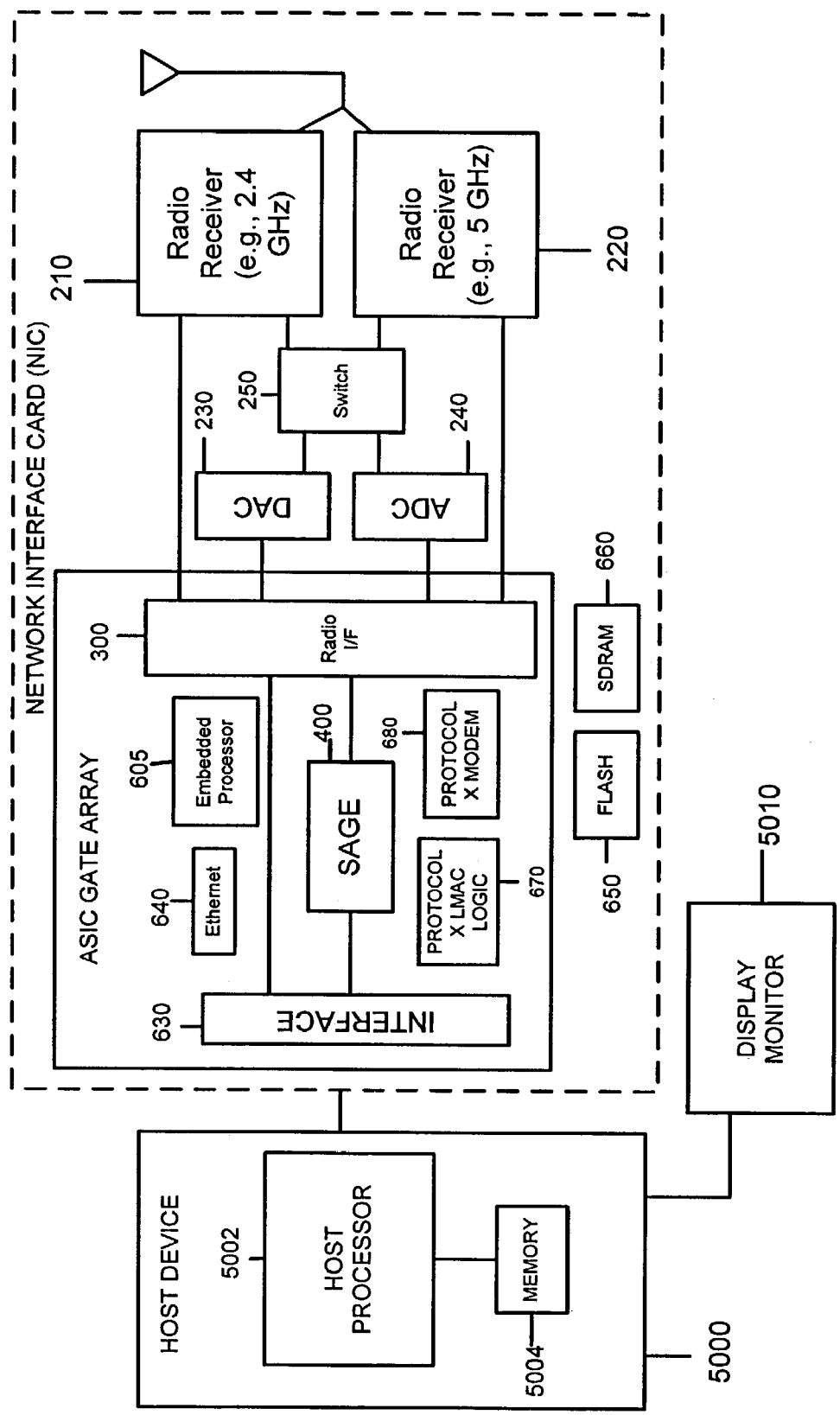
FIG. 15 is a block diagram showing a spectrum sensor for obtaining the raw data used for signal classification and/or performing the signal classification process.

FIG. 15 illustrates an exemplary block diagram of a device, called a spectrum sensor, which may be used to obtain the data used as input by the classification process and/or may perform the classification process itself. The spectrum sensor is a device that receives signals in the frequency band of interest. In this sense, the spectrum sensor is a spectrum monitor of a sort. The spectrum sensor comprises at least one radio receiver capable of downconverting signals in the frequency band of interest, either in a wideband mode or scanning narrowband mode. It is possible, as shown in FIG. 15, that the spectrum sensor comprises one or more radio receivers 210 and 220 (dedicated to different unlicensed bands) or a single dual band radio receiver. There is an ADC 240 that converts the output of the radio receiver to digital signals that is then coupled to the SAGE 400. A DAC 230 may be useful to supply control signals to the radio receiver via a switch 250.

An interface 630, such as a Cardbus, universal serial bus (USB), mini-PCI, etc., interfaces the output of the SAGE 400 to a host device 5000. There may be an optional embedded processor 605 to perform local processing, an Ethernet block 640 to interface to a wired network, FLASH memory 650 and SDRAM 660. There are also an optional lower MAC (LMAC) logic block 670 associated with a particular communication protocol or standard ("protocol X") and a modem 680 associated with protocol X. Protocol X may be any communication protocol that operates in the frequency band, such as an IEEE 802.11x protocol. Multiple protocols may be supported by the device. Many of the blocks may be integrated into a gate array ASIC. The larger block around the radio(s) and other components is meant to indicate that the spectrum sensor device may be implemented in a NIC form factor for PCI or mini-PCI deployment. Alternatively, many of these components may be implemented directly on a processor/CPU motherboard. The embedded processor 605 may execute software programs to perform one or more of the processes described hereinafter, including the classification engine.

The host device 5000 may be a computer (e.g., PC) having a processor 5002 and memory 5004 to process the spectrum activity information supplied by the spectrum sensor via a wired network connection, USB connection, or even a wireless connection (such as an 802.11x wireless network connection). The memory 5004 may store software to enable the host processor 5002 to execute processes based on the output of the SAGE 400 (including the classification engine), as further described hereinafter. A display monitor 5010 may be coupled to the host device 5000. The host device 5000 may be a desktop or notebook personal computer or personal digital assistant, or any other computer device local to or remote from the spectrum sensor. The memory 5004 in the host device may also store driver software for the host device, such as drivers for operating systems such as Windows operating systems (Windows® XP, Windows® CE, etc.). Either the embedded processor 620 or the host processor 5002 may perform the signal classification processes described herein.

Still another variation is to implement the functions of the SAGE 400 in software on the host processor 5002. The output of an ADC of any one or more device(s) operating in the frequency band (particularly those devices having a wideband capable radio receiver) can be supplied to a host processor where the SAGE and other functions described herein are performed entirely in software, such as the classification engine, etc. For example, the output of the ADC 240 may be coupled across any one of the interfaces shown in FIG. 15 to the host processor 5002.

Figure 16:
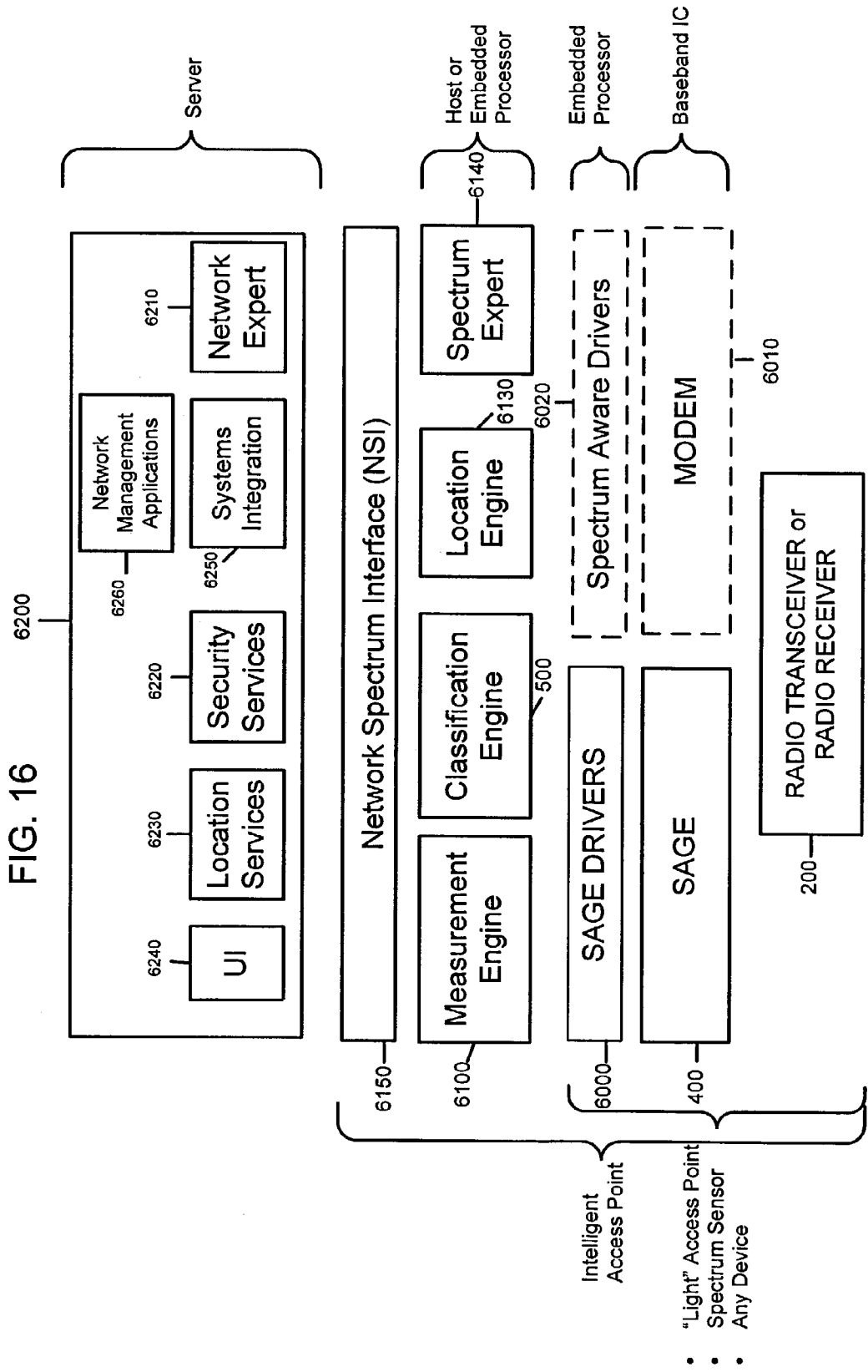
FIG. 16 is a block diagram showing use of the signal classification process in a spectrum management system that manages activity in a frequency band.

FIG. 16 is diagram illustrating how the classification engine 500 may be part of a larger spectrum management system. The SAGE 400 in cooperation with the radio 200 generates spectrum activity information that is used by one or more software programs. SAGE drivers 6000 are used by the one or more software applications to configure and access information from the SAGE 400. Examples of software the software programs that may use information from the SAGE 400 including a measurement engine 6100, the classification engine 500, a location engine 6130 and a spectrum expert 6140. These processes maybe executed by an embedded processor or host processor (see FIG. 15). At still a higher level above these software programs may be higher level application services 6200, such as a network expert 6210, security services 6220, location services 6230 and user interfaces 6240. There may also be a network integration application that integrates the spectrum management functions into a network management system that manages several wired and wireless networks. A network spectrum interface (NSI) 6150 serves as an application programming interface between the higher level application services 6200 and the processes on the other side of the NSI 6150. Controls generated by the spectrum expert 6140, network expert 6210 or other applications are coupled to a device through the spectrum aware drivers 6020, which in turn may control the baseband signal processing (e.g., modem) 6010 and/or the radio 200.

The measurement engine 6100 collects and aggregates output from the SAGE 400 and normalizes the data into meaningful data units for further processing. Specifically, the measurement engine 6100 accumulates statistics for time intervals of output data from the SAGE 400 to track, with respect to each of a plurality of frequency bins that span the frequency band, average power, maximum power and duty cycle. In addition, the measurement engine 6100 accumulates pulse events for signal pulses output by the SAGE 400 that fit the configured criteria. Each pulse event may include data for power level, center frequency, bandwidth, start time, duration and termination time. The measurement engine 5100 may build the histograms of signal pulse data that is useful for signal classification, referred to above. Finally, the measurement engine 6100 accumulates raw received signal data (from the snapshot buffer of the SAGE 400) useful for location measurement in response to commands from higher levels in the architecture. The measurement engine 6100 may maintain short-term storage of spectrum activity information. Furthermore, the measurement engine 6100 may aggregate statistics related to performance of a wireless network operating in the radio frequency band, such as an IEEE 802.11 WLAN. In response to requests from other software programs or systems (via the network spectrum interface described hereinafter), the measurement engine 6100 responds with one or more of several types of data generated by processing the data output by the SAGE 400.

The classification engine 500 may compare data supplied to it by the measurement engine 6100 against a database of information of known signals or signal type, as described at length above. The signal classification database may be updated for new devices that use the frequency band. The output of the classification engine 5120 includes classifiers of signals detected in the frequency band. As described above, a classification output may specify the signal type, for example, "cordless phone", "frequency hopper device", "frequency hopper cordless phone", "microwave oven", "802.11x WLAN device", etc. In addition, the classification engine may output information describing one or more of the center frequency, bandwidth, power, pulse duration, etc. of the classified signal, which is easily obtained directly from the signal detector output of the SAGE. This may particularly useful for a classified signal that is determined to interfere with operation of other devices in the frequency band.

The location engine 6130 computes the physical location of devices operating in the frequency band. One example of a location measurement technique involves using snapshot buffer data collected by the measurement engine 5100 to perform time difference of arrival measurements at known locations of a signal transmitted by the device to be located and another reference signal to determine a location of a variety of devices (such as interferers) operating in the region of the frequency band. Sometimes simply moving an interferer to a different location can resolve transmission problems that another device or network of devices may be experiencing. The location engine 6130 may coordinate measurements obtained from multiple locations in the network. An example of a location engine is disclosed in commonly assigned co-pending U.S. Application No. 60/319,737, filed Nov. 27, 2002, entitled "System and Method for Locating Wireless Devices in an Unsynchronized Wireless Network," the entirety of which is incorporated herein by reference.

Many other techniques to determine the location of wireless radio communication devices are known in the art and may be used as well. When an interference condition in the frequency band is detected, the spectrum expert 6140 may command the location engine 6130 to locate the source of the interferer. The output of the location engine 6130 may include position information, power level, device type and/or device (MAC) address. In addition, the security application 6220 may command the location engine 6130 to locate a rogue device that may present a possible security problem.

The spectrum expert 6140 is a process that optimizes operation of devices operating in the frequency band, given knowledge about the activity in the frequency band obtained by the measurement and classification engines. For example, the spectrum expert 6140 processes data from the SAGE 400 and optionally statistics from a particular wireless network operating in the frequency band, such as an IEEE 802.11x network, in order to make recommendations to adjust parameters of a device, or to automatically perform those adjustments in a device. The spectrum expert 6140 may be a software program that is executed, for example, by a network management station. Parameters that can be adjusted (manually or automatically) based on output of the spectrum expert 6140 include frequency channel, transmit power, fragmentation threshold, RTS/CTS, transmit data rate, CCA threshold, interference avoidance, etc. Example of interference mitigation techniques are described in commonly assigned and co-pending U.S. application Ser. No. 10/248,434, filed Jan. 20, 2003, and entitled "Systems and Methods for Interference Mitigation with Respect to Periodic Interferers in Short-Range Wireless Applications," the entirety of which is incorporated herein by reference. The spectrum expert 6140 may operate on triggers for alert conditions in the frequency band, such as detection of a signal that interferes with the operation of a device or network of devices operating in the frequency band, to automatically report an alert, and/or adjust a parameter in a device in response thereto. For example, the spectrum expert 6140 may operate to control or suggest controls for a single WLAN AP.

The NSI 6150 may be transport independent (e.g., supports Sockets, SNMP, RMON, etc.) and parses spectrum information into sub-sections for session and radio control, measurement, events (classification), location and protocol specific enhanced statistics and controls. End user on-demand commands to check the spectrum knowledge or activity information at a particular device may be received from an application residing above the NSI 6150 and translated into a request for a particular process below the NSI 6150 to supply the requested information.

The higher level application services 6200 may include software and systems that perform broader analysis of activity in a frequency band, such as the network expert 6210 that, for example, manages multiple WLANs, a WLAN associated with one or more wireless LANs, etc. These applications may call upon the services of any one or more of the software processes shown on the other side of the NSI 6150. For example, there may also be security services 6220, location services 6230, user interfaces 6240, and systems integrations 6250 to integrate the lower level processes with other applications, such as a network management application 6260. The network management application 6260 may be executed by a network management station (e.g., server 2055) that is located in a central monitoring or control center (telephone service provider, cable Internet service provider, etc.) coupled to the sensor devices, APs, etc., as well as the devices which it controls (e.g., APs) via a wide area network (WAN) connection, e.g., the Internet, a dedicated high speed wired connection, or other longer distance wired or wireless connection.

Spectrum Activity Information and Accessing it Using the NSI

The measurement engine 6100, classification engine 500, location engine 6130 and spectrum expert 6140 generate information that maybe used by software programs or systems that access it through the NSI. The software or systems above the NSI may access the data generated by the software residing below the NSI using session control messages. The NSI 6150 may be embodied by instructions stored on a computer/processor readable medium and executed by the processor (server 1055 or network management station 1090) that executes the one or more application program or systems. For example, this processor would execute instructions for an NSI "client" function that generates the request and configurations for spectrum analysis functions and receives the resulting data for the application program. The processor(s) that execute(s) the measurement engine, classification engine, location engine and/or spectrum expert will execute instructions stored on an associated computer/processor readable medium (shown in FIGS. 1 and 12) to execute an NSI "server" function that responds to requests from the NSI client to generate configuration parameters and initiate spectrum analysis functions by the measurement engine, classification engine, location engine and/or spectrum expert to perform the requested spectrum analysis function and return the resulting data. The measurement engine may in turn generate controls for the SAGE drivers 6000 to configure the SAGE 400 and/or radio 200.

It should be further understood that the classification engine, location engine and spectrum expert can be viewed as a client to the measurement engine and would generate requests to, and receive data from, the measurement engine similar to the manner in which an application program would interact with the measurement engine. Further still, the spectrum expert can be viewed as a client to the classification engine and location engine and request analysis services of those engines.

The NSI 6150 may be transport independent (e.g., supports Sockets, SNMP, RMON, etc.) and may be designed for implementation in a wired or wireless format, such as by TCP/IP traffic from an 802.11 AP to a PC which is running software designed to accept the traffic for further analysis and processing. The TCP/IP traffic (or traffic using some other network protocol) could also be carried by a PCI bus inside a laptop PC, provided the PC has built-in 802.11 technology, or an 802.11 NIC. If the source of the spectrum information data stream is a TCP/IP connection, the application program would implement a socket, and access the correct port, to read the data stream. A sample of typical code for this purpose is shown below. (The sample is in Java, and shows client-side code.) Once the port connection to the data stream is established, the use of the data stream is determined by the network management software itself.

```
! Open Socket and Port (Remember to first assign the correct
value
! for the 802.11 device PortNumber)
Socket MyClient;
try {
        MyClient = new Socket("Machine name", PortNumber);
}
catch (IOException e) {
    System.out.println(e);
}
! Create input stream to get data from NSI
DataInputStream input;
try {
    input = new DataInputStream(MyClient.getInputStream( ));
}
catch (IOException e) {
    System.out.println(e);
}
! Create DataOutputStream to send control commands and
! configuration data to MSI
DataOutputStream output;
try {
    output = new DataOutputStream(MyClient.getOutputStream( ));
}
catch (IOException e) {
    System.out.println(e);
}
```

The class DataInputStream has methods such as read. The class DataOutputStream allows one to write Java primitive data types; one of its methods is writeBytes. These methods can be used to read data from, and write data to, the NSI 6150.

If the transport of the data stream occurs over other low-level media, other methods are used to access the data stream. For example, if the data is carried over a PC's PCI bus, a PCI device driver will typically provide access to the data.

The information provided by the NSI to an application program corresponds to data generated by the measurement engine 6100 (through the SAGE), classification engine 500, location engine 6130, and/or the spectrum expert 6140.

In acting as the API, the NSI has a first group of messages that identify (and initiate) the spectrum analysis function (also called a service or test) to be performed and provide configuration information for the function. These are called session control messages and are sent by the application program to the NSI. There is a second group of messages, called informational messages, that are sent by the NSI (after the requested spectrum analysis functions are performed) to the application program containing the test data of interest.

Most of the spectrum analysis functions (i.e., tests) have various configuration parameters, which are sent via session control messages, and which determine specific details of the test. For example, in monitoring the spectrum, session control messages tell the NSI how wide the bandwidth should be (narrowband or wideband), and the center frequency of the bandwidth being monitored. In many cases, detailed test configuration parameters for a spectrum analysis function can be omitted from the session control messages. In those cases, the NSI uses default settings.

Examples of spectrum analysis functions that the measurement engine 6100 (in conjunction with the services of the SAGE 400) may perform, and the resulting data that is returned, include:

Spectrum Analyzer Power vs. Frequency Data. This data describes the total power in the spectrum as a function of frequency, over a given bandwidth.

Spectrum Analyzer Statistics Data. This data provides a statistical analysis of the data in RF power vs. frequency measurements.

Pulse Event Data—This data describes characteristics on individual RF pulses detected by the SAGE 400. The characteristics for (and thus the types of pulses) detected by the SAGE 400 can be configured.

Pulse Histogram Data. This data describes the distribution of pulses per unit of time, in terms of the percentage of pulses distributed among different frequencies, energy levels, and bandwidths.

Snapshot Data. This data contain portions of raw digital data of the RF spectrum captured by the snapshot buffer of the SAGE 400. The data can help identify the location of devices, and can also be used to extract identifier information which can determine the brand of certain devices operating in the frequency band, for example. Snapshot data may also be useful for signal classification.

The classification engine 500 may perform spectrum analysis functions to determine and classify the types of signals occurring in the frequency band, and together with optional recommendation or descriptive information that may be provided by the classification engine 500 or the spectrum expert 6140, the resulting data that is returned are called spectrum event data, which describe specific events, such as detecting a particular signal type as going active or inactive in the frequency band. The spectrum expert 6140, as well as the network expert 6210 and other applications or processes may use the output of the classification engine 500.

There are numerous ways to format the NSI messages to provide the desired API functionality in connection with the spectrum analysis functions. The following are examples of message formats that are provided for the sake of completeness, but it should be understood that other API message formats may be used to provide the same type of interface between an application program and spectrum analysis functions pertaining to activity in a frequency band where signals of multiple types may be simultaneously occurring.

A common message header may be used by both session control messages and information messages. The common header, called the sm1StdHdr_t header, comes at the very beginning of all messages and provides certain general identifying information for the message. An example of the general format of the common header is explained in the table below.

| Sub-Field | Description and Notes |
| --- | --- |
| msgLen | 'msgLen' is the length of the message in bytes. |
| msgType | 'msgType' is an integer which indicates whether this is a Start Test message, a data message, etc. 'sessType' is an integer which indicates the type of test, such as a pulse test, or a spectrum analyzer test. |
| sessType | |
| configToken | This value is set by the user (the requesting application program also called the Network Management Software) when a test is set up. The purpose is to help the requesting application program distinguish incoming data based on different test configurations. |
| timestampSecs | Use of the time stamp is message dependent. |
| Src | 'src' and 'dest' fields are intended to facilitate multiplexing of session routing across common transport connections, where needed. |
| Dest | |

Informational messages are started with two headers: the common header (sm1StdHdr_t), followed by the Info Header (sm1InfoHdr_t). The sm1InfoHdr_t header provides specific identifying parameters for information messages:

| Sub-Field Name | Description and Notes |
| --- | --- |
| transactionSeq | Sequence for this message. This starts at 1, and is incremented for each succeeding message. The increment reflects the number of data samples (transactionCnt) in the previous messages. For some types of messages the number of data points, and hence the transactionCnt, is fixed at '1'; for these message types successive messages always have their transactionSeq incremented by '1'. |
| transactionCnt | 'transactionCnt' generally indicates the number of entries in a message, where entries are discrete units of data. Its use is message dependent. For example, for Power vs. Frequency spectrum messages, this value indicates the number of sequential "snapshots" of the RF spectrum in the message. (Each snapshot is encapsulated in a specific sequence of bytes. If the transactionCnt has a value of 10, then the message contains 10 successive snapshots of the RF spectrum; there are ten matching byte patterns which follow, each of which reports on one snapshot of the RF spectrum.) |

A summary of all the messages that may be sent via the NSI is contained in the table below. The numeric values in the table below correspond to the values that are used in the msgType sub-field of the sm1StdHrd_t field.

| msgType Name | msgType Value | Direction | Meaning |
| --- | --- | --- | --- |
| SESS_START_REQ | 40 | User → NSI | Start a service, or copying a service. |
| SESS_STARTED_RSP | 41 | NSI → User | Test started. |
| SESS_PENDING_RSP | 42 | NSI → User | Session will start when the service is freed up from another user. |
| SESS_REJECT_RSP | 43 | NSI → User | Session could not be started. |
| SESS_STOP_REQ | 44 | User → NSI | Request to stop the service. |
| SESS_STOPPED_RSP | 45 | NSI → User | Service stopped, either in response to user request or due to problems. |
| SM_MSG_L1_INFO | 46 | NSI → User | Informational message containing test data. |
| SESS_QUERY_REQ | 47 | User → NSI | Requests the current test configuration. |
| SESS_QUERY_RSP | 48 | NSI → User | Current test configuration. |
| SESS_POLL_REQ | 49 | User → NSI | Requests a poll, or flushing, of pulse histogram test data. |
| SESS_POLL_RSP | 50 | NSI → User | Pulse histogram test data. |
| SESS_RECONFIG_REQ | 51 | User → NSI | Reconfigure a test session. |
| SESS_RECONFIG_RSP | 52 | NSI → User | Response to reconfiguration request. |
| SESS_VENDOR_REQ | 52 | User → NSI | Vendor-defined request. |
| SESS_VENDOR_RSP | 53 | NSI → User | Vendor-defined response. |

Examples of informational messages, which as suggested above, are NSI formatted versions of the output of the measurement engine 6100 and classification engine 500, and optionally the spectrum expert 6140, are described.

Spectrum Analyzer Power vs. Frequency Data

The SAGE 400 will analyze a frequency band centered at a frequency which may be controlled. Moreover, the bandwidth of the frequency band analyzed may be controlled. For example, a portion, such as 20 MHz (narrowband mode), of an entire frequency band may be analyzed, or substantially an entire frequency band may be analyzed, such as 100 MHz (wideband mode). The selected frequency band, is divided into a plurality of frequency "bins" (e.g., 256 bins), or adjacent frequency sub-bands. For each bin, and for each sample time interval, a report is made from the output of the SAGE 400 on the power detected within that bin as measured in dBm. The measurement engine 6100 supplies the configuration parameters to the SAGE drivers 6000 and accumulates the output of the SAGE 400 (FIG. 1).

Figure 18:
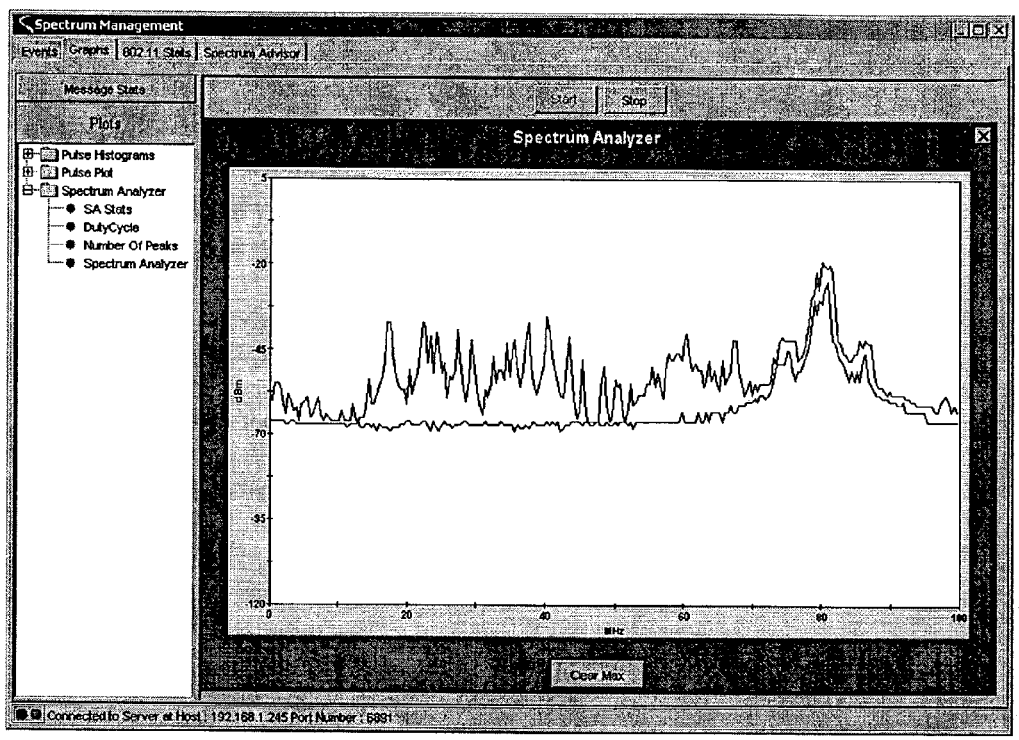

FIG. 18 (also described further hereinafter) illustrates a graph that may be created from power measurements taken at a given time interval. In the illustration, the vertical bars do not represent the distinct frequency bins. Of the two jagged lines shown in FIG. 18, the lower line represents a direct graph of the data in a single snapshot of the spectrum at a given instant in time. It corresponds to the data in one, single sapfListEntries field, described below. However, a spectrum analysis message may contain multiple sapListEntries fields; each such field corresponding to a single snapshot of the spectrum. The upper jagged line was constructed by a software application. It represents the peak values seen in the RF spectrum over the entire testing period to the present instant.

An example of the structure of the spectrum analyzer power vs. frequency data is as follows.

| Primary Field Names | Description and Notes |
|---|---|
| sm1StdHdr_t | Standard header. |
| sm1InfoHdr_t | The second standard header. |
| sm1SapfMsgHdr_t | Describes the frequency band being analyzed, providing both the center frequency and the width of the each of the 256 bins. |
| sapfListEntries | This fields contains the primary data of interest, that is, the RF signal power in dBm for each of the 256 frequency bins. There may be only a single instance of this field in the message, or there may be multiple instances. If there is more than one such field, each field corresponds to a single snapshot in a time-series of snapshots of the RF spectrum. The number of instances is given by the sm1InfoHdr_t.transactionCnt sub-field. |

In the second standard header, the msgType is 46 to identify the message as an informational message, and the sessType is 10 (SM_L1_SESS_SAPF) to identify that data results from a session that is a spectrum analyzer power vs. frequency test.

The field below is the standard information header for spectrum analyzer power vs. frequency data.

| Sub-Field Name | Description and Notes |
|---|---|
| transactionSeq | Sequence for this message. This starts at 1 for the first message. For each subsequent message, it is incremented by the value of transactionCnt in the previous message. |
| transactionCnt | Number of sapfList entries in message (sapfList). In other words, this is the number of sequential "snapshots" of the RF spectrum in the message. |

This field sm1SapfMsgHdr_t below describes the frequency spectrum that is being monitored. While this message provides the center frequency and the width of the bins, it may not provide the total bandwidth being measured. This can be calculated (low end=frqCenterkHz−128*binSize, high end=frqCenterkHz+128*binSize. The radio receiver being used to monitor the bandwidth need not actually span the full bandwidth. As a result, some of the frequency bins at either end of the spectrum will typically show zero (0) RF power.

| Sub-Field Name | Description and Notes |
|---|---|
| frqCenterkHz | Center Frequency of the power vs. frequency lists in kHz. |
| binSizekHz | Size of bins in kHz. |

For a single snapshot of the RF spectrum at a moment in time, the sapfListEntries field explained below contains the information of primary interest, namely, the power level in dBm for each of the frequency bins.

| Sub-Field Name | Description and Notes |
|---|---|
| timestampSecs timestampmicrosecs | Timestamp seconds, and fractional portion of timestamp in μseconds. The time is counted from the beginning of the test, not from some absolute time (i.e., not like in the UNIX operating system). |
| powerValuesdBm | Bins (−128 to 127) dBm power values. The value reflects the energy that the radio receiver "sees" in the portion of the frequency spectrum corresponding to this bin. |

The frequency range corresponding to bin "N", where N goes from 0 to 255, is given by:

LowFrequency[$N$]=sm1SapfMsgHdr_t.frqCenterkHz+ ($N$−128)*sm1SapfMsgHdr_t.binSizekHz HighFrequency[$N$]=sm1SapfMsgHdr_ t.frqCenterkHz+($N$−127)*sm1SapfMsgHdr_ t.binSizekHz Spectrum Analyzer Statistics Data The spectrum analyzer statistics data/messages provide a statistical analysis of the data in the frequency spectrum.

A single message is built from a specified number of FFT cycles, where a single FFT cycle represents an, e.g., 256 frequency bin output of the FFT. For example, 40,000 successive FFTs of the RF spectrum, taken over a total time of 1/10 of a second, are used to construct the statistics for a single message.

Figure 19:
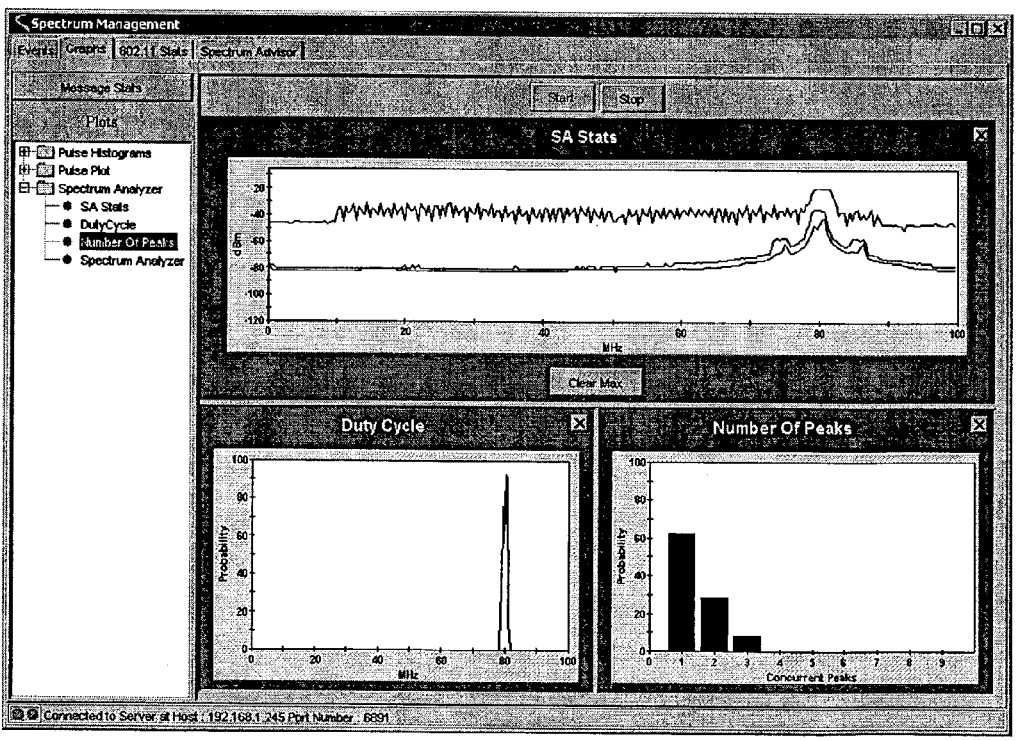

FIG. 19 shows the kind of information that can be conveyed in the spectrum analyzer statistics data. The bottom line shows the average power over the sampling period (i.e., over the 40,000 FFTs, or 1/10 second). The top line represents the "absolute maximum power" over all spectrum analyzer statistics messages received so far.

An example of the overall structure of the spectrum analyzer statistics data is:

| Field Name | Description and Notes |
|---|---|
| sm1StdHdr_t | msgType = 46 (SM_MSG_L1_INFO) sessType = 11 (SM_L1_SESS_SASTATS) |
| sm1InfoHdr_t | No special fields |
| sm1SaStatsMsgHdr_t | This field contains general parameters about the statistical sampling process. See format below. |
| statsBins | 256 Spectrum Analysis Stats Bins. See discussion. |
| activeBins | 10 bins for active peaks. See discussion. |
| quality | A number from 0 to 100 indicating the quality of the entire band. 0 is the worst, 100 is the best. Values 0–33 indicate "POOR", 34–66 indicates "GOOD" and 67–100 indicates EXCELLENT. |

This message header sm1SaStatsMsgHdr_t field contains parameters which describe the sampling process, examples of which are below.

| Sub-Field Name | Description and Notes |
|---|---|
| bwkHz | The bandwidth (narrow/wide) for the statistical analysis of the RF spectrum in kHz. Narrowband is approximately 20 MHz, and wideband is approximately 100 MHz. |
| cycleCnt | The number of FFT cycles accumulated into the statistics. This is user configurable, but is typically in the range of 20,000 to 40,000. |

-continued

| Sub-Field Name | Description and Notes |
|---|---|
| startTimeSecs startTimeUsecs | Start timestamp in seconds, and start timestamp, fractional portion, in μseconds, for the current message, indicating when measurements for the current set of statistics began. Measured from when the test started running. |
| endTimeSecs endTimeUsecs | End timestamp in seconds, and end timestamp, fractional portion, in μseconds, for the current message, indicating when measurements for the current set of statistics finished. Measured from when the test started running. |
| centerFreqkHz | Center Frequency in kHz. User configurable. |
| pwrThreshDbm | dBm of the current power threshold used for duty cycle and active bins information. This represents the minimum power the RF spectrum must have to be counted in the duty cycle and active bin statistics (these statistics are discussed further below). |
| noiseFloorDbm | dBm value of the current noise floor. |

There are, for example, 256 consecutive statsBins, each with four sub-fields as shown in the table below. Each statsBin, with its four subfields, contains the statistical data for a particular bandwidth. To calculate the width of each frequency bin, the following formula may be used:

binWidth=sm1SaStatsMsgHdr_t. bwkhz/256

The lower and upper bandwidth for each bin is giving by the following formulas:

LowBandwidth[$N$]=sm1SaStatsMsgHdr_t. centerFreqkHz+(($N$–128)*binWidth)

HighBandwidth[$N$]=sm1SaStatsMsgHdr_t. centerFreqkHz+(($N$–127)*binWidth)

| Sub-Field Name | Description and Notes |
|---|---|
| avgDbm[0] | Average dBm power level (–128 to 127 dBm) for this frequency bin. |
| maxDbm[0] | Maximum dBm power level (–128 to 127 dBm) for this frequency bin. |
| dutyPercent[0] | The percentage of time, multiplied by 2, that the power level for this bin remained above a (user-defined) threshold. |
| avgDbm[1] | Average dBm power level (–128 to 127 dBm) for this frequency bin. |
| maxDbm[1] | Max dBm power level (–128 to 127 dBm) for this frequency bin. |
| dutyPercent[1] | The percentage of time, multiplied by 2, that the power level for this bin remained above a (user-defined) threshold. |
| avgDbm[N] | Average dBm power level (–128 to 127 dBm) |
| maxDbm[N] | Max dBm power level (–128 to 127 dBm) |
| dutyPercent[N] | Percentage × 2 that power remained above threshold. |
| avgDbm[255] | Average dBm power level (–128 to 127 dBm) |
| maxDbm[255] | Max dBm power level (–128 to 127 dBm) |
| dutyPercent[255] | Percentage × 2 that power remained above threshold. |

There are ten consecutive activeBins which record "peak" activity. The bins may be viewed as being indexed consecutively, from 0 to 9. For each bin, the value in the bin should be interpreted as follows. In the Nth bin, if the value in the bin is X, then for (X/2) % of the time, there were N peaks in the RF spectrum during the sampling period, except for the special case below for the 10th bin, called bin 9.

| Sub-Field Name | Description and Notes |
|---|---|
| activeBins[0] | If the value in this bin is X, then (X/2)% of the time, there were no peaks (0 peaks) in the RF spectrum. |
| activeBins[1] | If the value in this bin is X, then (X/2)% of the time, there was 1 peak in the RF spectrum. |
| activeBins[2] | If the value in this bin is X, then (X/2)% of the time, there were 2 peaks in the RF spectrum. |
| activeBins[8] | If the value in this bin is X, then (X/2)% of the time, there were 8 peaks in the RF spectrum. |
| activeBins[9] | If the value in this bin is X, then (X/2)% of the time, there were 9 or more peaks in the RF spectrum. |

As described above in conjunction with the SAGE 400, peaks are spikes, or very brief energy bursts in the RF spectrum. If a burst persists for a certain period of time (e.g., approximately 2.5 μsec), the SAGE 400 will detect the peak, and the peak will be included in the statistics described in this subsection. Such brief peaks are generally not included in pulse data or pulse statistics. Also as described above, if a series of consecutive peaks are seen over a continuous time period, all at the same frequency, this series—once it reaches some minimum time threshold—it will be counted as a pulse.

The exact minimum duration of a pulse, for testing purposes, is configurable by the application program, but a typical time may be 100 μsec. Since the SAGE 400 can detect RF events as brief as 2.5 μsec, a typical pulse would need to persist through at least 40 FFTs before being acknowledged as being a pulse.

Pulse Event Data

A signal pulse is a sustained emission of RF energy in a specific bandwidth starting at a specific time. The SAGE 400 detects pulses in the radio frequency band that satisfy certain configurable characteristics (e.g., ranges) for bandwidth, center frequency, duration and time between pulses (also referred to as "pulse gap"). When the SAGE 400 detects a pulse that has these characteristics, it outputs pulse event data for the pulse including:

Start Time—Measured from when the SAGE first begins detecting pulses.

Duration—The lifetime of the pulse.

Center Frequency—The center frequency of the pulse.

Bandwidth—How wide the pulse is.

Power—Average power in dBm.

The overall structure of a pulse event (PEVT) data/message is shown in the table below.

| Field Name | Description and Notes |
|---|---|
| sm1StdHdr_t | msgType = 46 (SM_MSG_L1_INFO) sessType = 12 (SM_L1_SESS_PEVT) |
| sm1InfoHdr_t | transactionCnt = number of PEVTs in message; each PEVT contains data on one pulse. |
| classPevts | sm1Pevts: an array of 'transactionCnt' PEVTs of the form 'sm1Pevt_t' shown below. Each field contains data on one pulse |

This information header field is the standard information header for pulse event messages.

| Sub-Field Name | Description and Notes |
| --- | --- |
| transactionSeq | Sequence for this message. This begins with 1 for the first message. For each successive message, it is incremented by the transactionCnt in the previous message. (In other words, it is incremented by the number of pulses reported on in the previous message.) |
| transactionCnt | Number of PEVTs in this message (Pevts). Each PEVT field corresponds to one pulse. |

There may be one or many pulse events in the message. Each instance of the classPevts field below, describes the properties of one pulse.

| Sub-Field Name | Description and Notes |
| --- | --- |
| sdId | This indicates which of 4 internal pulse detectors are being used by SAGE to detect this pulse. |
| termCodeFlags | This byte contains a series of flags which indicate how the pulse was terminated. |
| dBm | Pulse power in dBm. |
| frqCenterkHz | Center Frequency of the pulse in kHz. The value shown will typically range from 0 to 100,000 kHz. To obtain the actual center frequency, add this value to the low end of the frequency spectrum being tested. Example: If the frequency spectrum being tested ranges from 2,350,000 kHz to 2,450,000 kHz, and the frqCenterkHz value is 40,000 kHz, then the actual center frequency of the pulse is approximately 2,390,000 kHz. Note: Actual resolution is ±200 to 500 kHz. |
| bandwidthkHz | Bandwidth of the pulse in kHz. Note: Actual resolution is ±200 to 500 kHz. |
| durationUs | Pulse Duration in μseconds |
| timeOnSecs timeOnUsecs | Pulse Time On, seconds portion; and Pulse Time On, fractional portion in μseconds. The time the pulse began is measured from when the test started running, not from someone absolute, fixed date. |

Pulse Histogram Data

While it is possible to access information about individual pulses, it may also be useful to work with the statistical information about pulses detected and occurring in the frequency band over time. That information is provided by pulse histogram data. The pulse histograms track distributions of: duration of the pulses (the percentage of pulses with short, medium, and long durations); gaps in time between the pulses (the percentage of pulses with short time gaps between them, medium time gaps, and long time gaps); bandwidth of pulses; frequency of pulses; and power of pulses.

Figure 20:
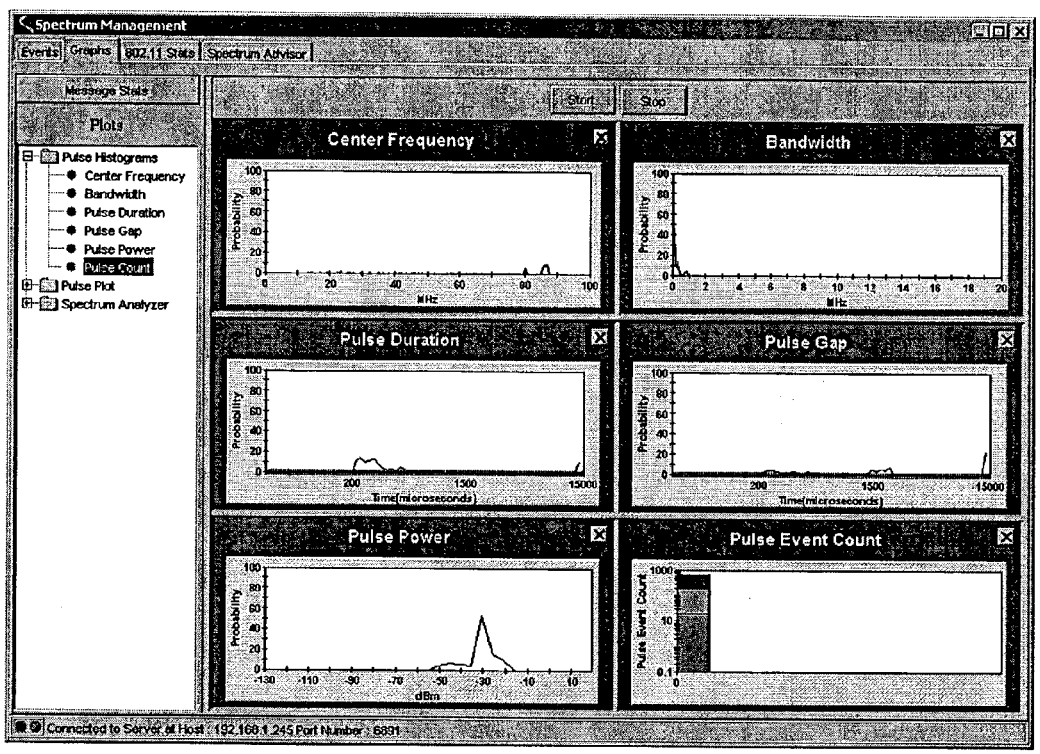

FIG. 20 illustrates graphical displays for exemplary pulse histograms.

The overall structure of the pulse histogram data is shown in the following table.

| Field Name | Description and Notes |
| --- | --- |
| sm1StdHdr_t | msgType = 46 (SM_MSG_L1_INFO) sessType = 13 (SM_L1_SESS_CLASS) |
| sm1InfoHdr_t | no special fields |
| sm1PhistMsgHdr_t | Provides detailed information about the sampling process. |
| pulseDurationHistogram | Pulse Duration Histogram |
| pulseGapHistogram | Pulse Gap Histogram |
| pulseBandwidthHistogram | Pulse Bandwidth Histogram |
| centerFreqHistogram | Center Frequency Histogram |
| powerHistogram | Power Histogram |

This PhistMsgHdr field describes the frequency spectrum which is being monitored, and some other parameters of the overall sampling process.

| Sub-Field Name | Description and Notes |
| --- | --- |
| classMsgType | SM1_CLASS_PHIST_MSG == 1, (Pulse Histogram Msg) |
| numSampleIntervals | Number of sample intervals. If a dedicated radio receiver is continually listening for pulses, this value will be 1 (indicating a single sampling interval). If the radio device is doubling as a transmitter, then it cannot listen all the time; this parameter will indicate the number of times the radio device was actually able to listen for pulses. |
| avgSampleDurationMs | Average sample time size in msec. If a dedicated radio device is continually listening for pulses, this value will be the same as the amount of time the SAGE 400 has been instructed to listen for pulses before sending statistical data. If the listening device cannot listen all the time, then multiply: TALT = avgSampleDurationMs* numSampleIntervals to obtain the total actual listening time (TALT). To obtain the fraction of listening time, divide the TALT by the amount of time the CLP has been instructed to listen for pulses before sending statistical data. [The total listening time can also be calculated from the fields below: endTimeSecs + endTimeUsecs − (startTimeSecs + startTimeUsecs)] |
| histBwkHz | Histogram bandwidth in kHz |
| histCenterFreqkHz | Histogram Radio Center frequency in kHz |
| startTimeSecs startTimeUsecs | Start timestamp seconds, and start timestamp, fractional portion in microseconds. This is measured from when the pulse histogram operation was initiated, not from some absolute starting time (i.e., not like in the UNIX operating system). |
| endTimeSecs endTimeUsecs | End timestamp seconds, and end timestamp, fractional portion in microseconds. Again, this is measured from when the pulse histogram operation was initiated. |
| numPulseEvents | Number of pulse events recorded for this histogram. |

The pulse duration histogram fields contain a series of bytes. Each of the data bytes, or bins—in sequence—indicates the percentage (multiplied by two) of pulses that fall into a given range of durations. The table below categorizes data into smallBins, mediumBins, and largeBins and are only examples of how to track pulse duration.

The first bin (bin 0) contains the percentage (×2) of pulses that were between 0 μsec and 9 μsec. The second bin (bin 1) contains the percentage, multiplied by 2, of pulses that were between 10 μsec and 19 μsec in duration. Each of these "bins" is 10 μsec wide. This continues up to the 20th bin (bin 19), whose value is the percentage, multiplied times 2, of pulses that were between 190 and 199 μsec in length.

The next twenty-six bins are similar, except they are wider; specifically, they are 50 μsec wide. Bin 20 has a value which indicates the percentage (×2) of pulses that were between 200 μsec and 249 μsec in length. Again, there are twenty-six bins which are 50 μsec wide. Bin number 45 has a value which indicates the percentage (times 2) of pulses that were between 1450 μsec and 1499 μsec in length.

The final set of 27 bins each indicate the percentage (×2) of pulses that are wider still, specifically 500 μsec wide. Bin number 46 includes pulses whose duration was between 1500 μsec and 1999 μsec in length. Bin 72 includes pulses whose duration was between 14499 and 14999 μsec.

Pulse Duration Histogram Bins

| Sub-Field Name | Description and Notes |
| --- | --- |
| smallBins | Each bin contains the percentage (×2) of pulses that fell within a 10 μsec range. The range starts with 0 μsec to 9 μsec, and increases by 10 μsec for each consecutive byte. The final bin (bin number 19) covers pulses with widths between 190 to 199 μsec. |
| mediumBins | Each bin contains the percentage (×2) of pulses that fell within a 50 μsec range. The range starts with 200 μsec to 249 μsec, and increases by 50 μsec for each consecutive bin. The final bin—which is the 26th bin of the mediumBins, the 46th bin overall, and is numbered as bin 45—covers pulses with widths between 1450 to 1499 μsec. |
| largeBins | Each bin contains the percentage (×2) of pulses that fell within a 500 μsec range. The range starts with 1500 μsec to 1999 μsec, and increases by 5000 μsec for each consecutive bin. The 73rd bin (which is numbered as bin 72) covers pulses with widths between 14499 to 14999 μsec. |

The pulse gap histogram indicates the percentage (multiplied by two) of gaps between pulses, where the duration of the gap falls within a given time range. The bins do not reflect when the gaps occurred; they reflect how long the gaps were. Gaps are measured between the start of one pulse and the start of the next. This is because the start of a pulse tends to be sharply delineated, while a pulse may trail off more gradually. For example, assume there were a total of twenty gaps between pulses. Of these twenty, only two gaps had a duration between 10 μsec and 19 μsec. The first gap, which lasted 12 μsec, occurred at time 15.324 seconds. The second gap, which lasted 15 μsec, occurred at time 200.758 seconds. Both gaps are recorded in the second bin (numbered as bin 1). Since the two gaps reflect 10% of all recorded gaps, the value in the second bin (bin 1) will be 2×10%=20 (since all percentages are multiplied by two).

Pulse Gap Histogram Bins

| Sub-Field Name | Description and Notes |
| --- | --- |
| smallBins | Each consecutive bin contains the percentage (×2) of gaps between pulses, where the length of the gap fell within a 10 μsec range. The range starts with gaps that are 0 μsec to 9 μsec long, and increases by 10 μsec for each consecutive byte. The 20th and final bin (bin number 19) covers gaps whose duration was between 190 to 199 μsec. |
| mediumBins | Each bin contains the percentage (×2) of gaps whose duration fell within a 50 μsec range. The range starts with 200 μsec to 249 μsec (so all gaps whose duration is within this range are included in this first bin, number 20), and increases by 50 μsec for each consecutive bin. The final bin—which is the 26th bin of the mediumBins, the 46th bin overall, and is numbered as bin 45—covers gaps whose duration was between 1450 to 1499 μsec. |
| largeBins | Each bin contains the percentage (×2) of gaps whose duration fell within a 500 μsec range. Gaps whose duration was between 2500 μsec to 2999 μsec are reflected in the first bin; each consecutive bin increases the duration by 5000 μsec. The final bin—which is the 27th bin of the largeBins, the 73rd bin overall, numbered as bin 72—covers gaps with widths between 14499 to 14999 μsec. |

For the pulse bandwidth histogram, each data bin reflects a progressively wider bandwidth. For example, if the first bin represents pulses from 0 to 9.999 kHz in width, then the second bin represents pulses from 10 kHz to 19.999 kHz, the third bin pulses from 20 kHz to 29.999 kHz in width, etc. The value stored in the bin is the percentage (×2) of the pulses that had a bandwidth somewhere within the indicated range. For example, assume the size of each bin is 80 kHz. Suppose also that the SAGE 400 detected 1000 pulses and there are 256 frequency bins. The pulses had a bandwidth between 0 and 20,480 kHz. As another example, assume the SAGE 400 detects 65 pulses, each of which had a bandwidth somewhere between 400 and 480 kHz. Then, 6.5% of the pulses fall within the sixth bandwidth range, so the 6th bin (bin number 5) will have a value of 2×6.5%=13.

The bandwidth bins may have exactly the same width. For example, if the first bin is 80 kHz wide (and includes data for pulses with bandwidths from 0 to 79.999 kHz), then all successive bins will be 80 kHz wide. The second bin includes pulses from 80 kHz to 159.999 kHz; and the 256th bin—still 80 kHz wide—includes pulses with bandwidths from 20,400 kHz to 20,479.999 kHz.

Pulse Bandwidth Histogram Bins

| Sub-Field Name | Description and Notes |
| --- | --- |
| binSizekHz | Size of bin in kHz. |
| numBinsUsed | N, for example 256. |
| freqBins | The percentage (×2) of pulses which have a bandwidth corresponding to the bandwidth of this byte. The first byte (byte 0) represents pulse bandwidths from 0 to binSizekHz. The second byte (byte 1) represents pulse bandwidths from binSizekHz to 2 × binSizekHz. (So byte 1 contains the % * 2 of pulses whose bandwidth fell within this range.) In general, the $N^{th}$ bin represents pulses with bandwidths between (N − 1) * binSizekHz, and N * binSizekHz. Again, the value of the byte represents the % * 2 of pulses whose bandwidths fell within this range. |

For the pulse center frequency histogram, each data bin reflects a range of frequencies. The value stored in the bin is the percentage, multiplied times two, of the pulses whose center frequency fell within the indicated range of frequencies.

All frequency bins may be exactly the same width. However, in general, the lowest bin (byte number 0) does not start with the frequency 0 Hz. Recall that the pulse histogram message header (PhistMsgHdr_t) has a sub-field histCenterFreqkHz, which is measure in kHz. This field defines the center frequency for the pulse center frequency histogram.

The following formulae give the actual frequency range covered by each bin of this histogram, indicating both the low frequency and the high frequency of the range. The number N is the bin number, where bin numbers are counted from freqBins 0 to freqBins 255:

Low Frequ. (bin $N$)=histCenterFreqkHz−(128 *binSizekHz)+($N$*binSizekHz)

High Frequ. (bin $N$)=histCenterFreqkHz−(128*binSizekHz)+(($N$+1)*binSizekHz))

Suppose the size of each bin, in kHz, is 100 kHz, and that the bandwidth is 2.4 GHz. Frequencies are actually being monitored in the range from 2,387,200 kHz to 2,412,800 kHz. Suppose also that SAGE 400 detected 1000 pulses, and 80 pulses with center frequencies in the range from 2,387,600 kHz to 2,387,699 kHz. Then 8% of the pulses fall within the fifth bandwidth range, so bin 4 will have a value of 2×8%=16.

The field structure for the pulse center frequency histogram is indicated in the table below.

Pulse Center Frequency Histogram Bins

| Sub-Field Name | Description and Notes |
|---|---|
| binSizekHz | Size of bin in kHz, |
| numBinsUsed | N, for example 256. |
| freqBins | The percentage (×2) of pulses that have a central frequency corresponding to this byte. |

For the pulse power histogram, each bin reflects a certain power range, measured in dBm. The value of each bin reflects the percentage (×2) of those pulses whose power level fell within the indicated range.

Pulse Power Histogram Bins

| Sub-Field Name | Description and Notes |
|---|---|
| powerBins | Each bin indicates the % (×2) of those pulses which fell within the bin's designated power range. The range of each bin is 5 dBm, and the lower power of the lowest bin is −130 dBm. Therefore: bin[0] = −130 to −126 dBm bin[1] = −125 to −121 dBm bin[2] = −120 to −116 dBm ... bin[N] = −130 + (N * 5) to −126 + (N * 5) ... bin[29] = +15 to +19 dBm |

Snapshot Data

Snapshot data, unlike other data provided by the NSI, is not based on data analysis by the SAGE or software. Rather, this data provide raw data from the ADC which precedes the SAGE and that converts the received signal analog signal to digital data.

The raw ADC data may be expressed in n-bit I/Q format, where 'n' is indicated by 'bitsPerSample'. The snapshot samples can be used for location measurements, or for detailed pulse classification (such as identifying the exact model of a device). The size of the sample data contained in 'snapshotSamples' is typically 8 K bytes. The overall structure of the message is shown in the following table.

| Field Name | Description and Notes |
|---|---|
| sm1StdHdr_t | msgType = 46 (SM_MSG_L1_INFO) sessType = 17 (SM_L1_SESS_SNAP) |
| sm1InfoHdr_t | transactionCnt = 1 |
| smSnapshotMsg_t | Snapshot message body. K is 24 + 'snapshotSamplesLen' |

An example of a snapshot message smSnapshotMsg_t field is defined below.

| Sub-Field Name | Description and Notes |
|---|---|
| snapshotStartSecs | TARGET snapshot time in seconds |
| snapshotStartNanosecs | TARGET snapshot time in nanoseconds. |
| numberOfSamples | Number of IQ Snapshot Samples |
| bitsPerSample | Number of bits in a sample |
| radioGainDb | Radio gain in dB: −127 to 128 dB This is the radio gain used at the start of the sample interval. It may be used to convert the raw IQ samples into corresponding dBm power levels. |
| pulseDetectorId | Pulse Detector ID. Value of 0xFF indicates that a Pulse Detector was NOT used to trigger sampling. |
| reserved | Reserved for future expansion |
| snapshotSamplesLen | Number of bytes (N) in the 'snapshotSamples' field below. |
| snapshotSamples | Sample data. The size of this snapshotSamples is typically 8 k Bytes. Size N is the value in 'snapshotSamplesLen'. |

Spectrum Event Data (e.g., Monitoring Activity of Signals)

The msgType for spectrum event data is 46 and the sessType is 14 (SM_L1_SESS_EVENT). A format for the smEventMsg_t spectrum event message field is described in the table below.

| Sub-Field Name | Description and Notes |
|---|---|
| EventType | Character string. Up to 16 characters, null terminated. Some typical examples of event types are: "Information", "Identification", "Interferer", "Error". |
| EventDateTime | Number of seconds past an arbitrary date, e.g., Jan. 1, 1970 when smEventMsg was received. This field is essentially a placeholder; the value must be filled in by the receiving application. 0 is sent by the target. Displayed as hh:mm:ss mm/dd/yyyy. |
| EventTimestampSecs | TARGET event timestamp in seconds. Times are measured from when the monitoring began of the environment, not from some absolute calendar time. |
| EventTimestampUsecs | TARGET fractional portion of timestamp in microseconds. Times are measured from when the monitoring began of the environment, not from some absolute calendar time |
| EventId | Specific ID numbers are assigned to specific types of events. For example, a microwave oven startup may be '1', a Bluetooth device may be '2', a cordless phone may be '3', etc. For "Interferer" event messages, the following format applies: |

| Low Address Byte | | High Address Byte | |
|---|---|---|---|
| 16 High Bits— Reserved | | 15 Bits— Device ID | 1-Bit: On/Off |

The Device ID must be combined with the On/Off bit to obtain the actual numeric value of the field.

-continued

| Sub-Field Name | Description and Notes |
| --- | --- |
| | For example, if the Device ID for a Bluetooth ™ device is '2', the fifteen-bit pattern is '0000 0000 0000 010'. But with the On/Off bit appended to the right, the bit pattern becomes:<br>'0000 0000 0000 0101' = Decimal 5 (device on), or<br>'0000 0000 0000 0100' = Decimal 4 (device off). |
| EventSourceId | Identifies the target source. This parameter is only significant when more than one source (for example, more than one AP) is feeding data to the requesting software or system. |
| AlertLevel | Warning Levels for Messages<br>Value  Severity  Suggested Display Colors<br>1  Severe  Red<br>2  High  Orange<br>3  Elevated  Yellow<br>4  Guarded  Blue<br>5  Low  Green |
| EventMsg | This is a brief character string message, null terminated, which identifies the event that caused the message. For example, it may say "Microwave oven has started", or "Cordless phone". The content of the message is essentially redundant with the EventId (above), except that it provides text instead of a numeric identifier. |
| EventDescription | The event description will typically contain more detailed information, and will often include advisory and/or recommendation information as to how to resolve interference or other situation caused by the event source. |
| EventDetail | The event detail will generally include pertinent technical parameters, such as power levels or frequency bandwidth associated with the event. Newline characters delimit individual lines. |

Examples of the manner in which spectrum event messages may be displayed are shown in FIGS. 22–24, and described hereinafter.

Software and systems communicate requests to the NSI for data from the services on the other side of the NSI using the session control messages referred to above. An example of the format of the session control messages is as follows. There is a standard header followed by information elements. An information element is a data structure with several parts, as described in the following table:

| Field Name | Description |
| --- | --- |
| infoElementLen | Number of bytes in this information element, including this length field. |
| infoElementType | Information element type number. This type is used to distinguish the information element. The types are UNIQUE across ALL messages. Ex: An 'infoElementType' of '1' indicates "Reject Reason", and has a particular meaning independent of the 'sm1StdHdr_t.msgType' field. |
| infoElementBody | This contains the significant data of the information element, and may have one or more sub-fields. The information element body. The format of the data is determined by the infoElementType field. |

Typical information elements provide data such as the SAGE configuration data, radio configuration data, and service specific data (e.g., pulse data, spectrum data, etc.). Examples of NSI information elements are provided in the table below:

| Information Element Name | infoElementType (decimal) | Description |
| --- | --- | --- |
| IE_RETURN_CODE | 1 | Activity completion status return code information |
| IE_SESSION_CFG | 2 | Session priority and startup configuration |
| IE_SAGE_CFG | 3 | Common SAGE Config effecting multiple services |
| IE_RADIO_CFG | 4 | Common radio configuration |
| IE_COPY_CFG | 5 | Request copy of any data for that service, with optional notification of configuration updates. |
| IE_SAPF_CFG | 6 | Spectrum Analyzer Power vs. Frequency configuration |
| IE_PD_CFG | 7 | Pulse Detector Configuration |
| IE_SA_STATS_CFG | 8 | Spectrum Analyzer Stats configuration |
| IE_PHIST_CFG | 9 | Configuration of PHIST service |
| IE_PEVT_CFG | 10 | Configuration of PEVT service |
| IE_SNAP_CFG | 12 | Snapshot Buffer configuration |
| IE_VENDOR_CFG | 13 | Vendor specific configuration information. |
| IE_FLOW_CTRL | 15 | INFO Message Flow Control |
| IE_VERSION | 16 | Version of NSI being used. |

There is an advantage to using information elements in NSI session control messages. The format of session control messages can be modified or expanded over time, as technology is further developed, while requiring no revisions to existing software or systems that use the NSI. In other words, enhancements to the messages do not break legacy code.

In traditional software design, the network management software would be coded with the expectation of specific data structures for each of the session control messages. Any time the session control messages were changed or enhanced, changes would be required in the code for the network management software, and the code would need to be recompiled.

With session control messages, however, this is no longer necessary. Session control messages are processed as follows.

1. The requesting software or system reads the message header, and determines what kind of message it is receiving.

2. Software developers know what kinds of information elements will follow the header field based on a specification document. Design decisions are made to determine what kinds of actions the software or system will take in response to those information elements.

3. In the code itself, after reading the header field, the software loops through information elements which follow. Only for information elements of interest—which can by flagged by the infoElementType field in each information element—the software takes appropriate action.

Additional information elements may be added to some of the session control messages. However, during the "looping" process the requesting software ignores any information elements which are not of interest to it, so the additional information elements in the control messages do not require any changes in the software code. Of course, it may be desirable to upgrade a software program to take advantage of additional types of information; but again, until that new software is in place, existing software continues to function.

This benefit works in both directions. For example, in sending messages to the NSI, the software program can send an information element which fine-tunes the behavior of the SAGE. Typically, however, SAGE's default operating modes are satisfactory, and there is no need to make changes. Rather than having to send an information element containing redundant, default configuration data for SAGE, this information element can simply be omitted.

A handshaking type protocol may be used to setup, initiate and terminate a session between the application and the NSI. There are numerous techniques known in the art to provide this function. For example, all tests are started by sending a sm1StdHdr_t field. Additional, optional information elements may follow. The NSI responds with messages indicating that the test has started successfully; that it was rejected; or that the test is pending (the test is queued behind other requests for the same service). The four possible session control reply messages are Started, Pending, Rejected, and Stop.

All Start Messages may have the following structure:

1. A required sm1StdHdr_t field with a msgType value of SESS_START_REQ (40), and a value for sessType to indicate the test to be performed. This field may come first. For example, to start a pulse event test, the sessType value of 12 is used, to start a pulse histogram test, a sessType value of 13 is used, to start a spectrum analyzer power vs. frequency test, a sessType value of is used, etc.

2. An optional common session configuration information element. This configures parameters which are of interest for all the possible tests, described below.

3. For the Pulse Event test only, an optional information element to configure the pulse detectors.

4. Optional information elements to configure the SAGE and the radio.

5. An optional, vendor-specific information element, typically (but not necessarily) related to further configurations to the radio.

6. An optional session-type specific information element, with configuration information for the particular test (PEVT, PHIST, SAPF, etc.).

The general/common session configuration element IE_Session_CFG is optional when starting tests, i.e., with SESS_START_REQ. If it is not sent, the default values are used.

| Sub-Field Name | Description |
|---|---|
| infoElementLen | Len = 20 |
| infoElementType | IE_SESSION_CFG = 2 |
| infoElementBody | |
| pendingTimeoutMs | Number of milliseconds before "START" times out. A value of '0' (default) indicates that the START request should NOT be queued (that is, no SESS_PENDING_RSP, or session pending response, is allowed). |
| configStopFlags | This field has an Offset of 8/36; it has a size of 4 bytes. Sometimes it is desired that the service which is now being started should later stop if certain other services are reconfigured; the reconfiguration(s) which stops the current service is indicated by these flags:<br>0x00000000: Do not stop for any reconfig<br>0x00000001: SAGE Config<br>0x00000002: Radio Config<br>0x00000004: SAPF Config |

-continued

| Sub-Field Name | Description |
|---|---|
| | 0x00000008: SA_STATS Config<br>0x00000010: SNAP Config<br>(Note that there are four pulse detectors (PDs), numbered 0 through 3.)<br>0x00000020: PD 0 Config<br>0x00000040: PD 1 Config<br>0x00000080: PD 2 Config<br>0x00000100: PD 3 Config<br>0x00000200: PHIST Config<br>0x00000400: PEVT Config<br>0x00000800: 80211_STATS Config<br>0x00001000: Vendor Config<br>0xFFFFFFFF: Use Default Value (depends on service type, see sub-table below)<br>1. These 'configStopFlags' allow cross-service interdependence. It may seem odd to abort an Spectrum Analyzer vs. Power Frequency (SAPF) session when, say, a PD 0 (pulse detector 0) is reconfigured. However there may be cases where the use of the outputs of these sessions are interrelated, particularly for event classification software.<br>2. If a session attempts to reconfigure a service to the same values that it already has, the service is NOT stopped and the reconfiguration is considered "successful".<br>3. Flags can be combined. For example, 0x00000003 flags both SAGE and Radio Config<br>4. The default value depends on the service type:<br><br>Service  configStopFlags<br><br>ALL SERVICES SAGE, Radio, Vendor<br>EXCEPT 802.11 STATS Configs<br>Spectrum Analyzer SAPF Config<br>(SAPF)<br>Spectrum Analyzer Stats SA_STATS Config<br>(SA_STATS)<br>Pulse Event (PEVT) PD 0, PD 1, PD 2, PD 3, PEVT Configs<br>Pulse Histogram (PHIST) PD 0, PD 1, PD 2, PD 3, PHIST Configs<br>802.11 Stat 802.11 Stats, Radio,<br>(80211_STATS) Vendor Configs<br>Snapshot Buffer (SNAP) SNAP Config |
| sessionDurationMs | Duration of session in ms. 0 (the default) indicates no limit to the duration. |
| sessionPriority | 1 = highest, 254 = lowest, 255 (0xFF) requests the default session priority. |

The radio is configured to a starting bandwidth (either 2.4 GHz or one of the 5 GHz bands, for example) before the NSI can begin any testing. Similarly, before many pulse test services can be run, at least one (if not more) of SAGE's four pulse detectors need to be configured at least once. These services include Pulse Events, Pulse Histograms, Snapshot Data, and Spectrum Analyzer Power vs. Frequency (but only if this test is to be triggered by pulse events). Once the pulse detectors are configured, they can be left in their initial configuration for subsequent tests, although the application program can reconfigure them.

The radio configuration element IE_Radio_CFG is described in the table below. It is used to fine-tune the performance of the radio. If the information element is not sent as part of the message, the radio is configured to the default values.

| Sub-Field Name | Description |
| --- | --- |
| infoElementLen | Len = 8 |
| infoElementType | IE_RADIO_CFG = 4 |
| infoElementBody | |
| cfreqkHz | Center Frequency in kHz. Ex: 2400000 for 2.4 GHz There is no default value for this parameter. The radio must be configured to a starting center frequency by the user before 802.11 communications can begin (and of course, before the NSI can begin any testing), using either this information element or the vendor-specific information element. |
| radioBwkHz | Radio bandwidth in kHz. Examples: 83000 (83 MHz wideband radio) [default value] 23000 (23 MHz narrow band radio) |

The SAGE configuration information element IE_SAGE_CFG is optional. It fine-tunes the performance of the SAGE 400. If the information element is not sent as part of the message, the SAGE 400 is configured to the default values. An example of the SAGE configuration element is set forth below.

| Sub-Field Name | Description |
| --- | --- |
| infoElementType | IE_SAGE_CFG = 3 |
| infoElementBody | |
| 1pfParm | Low Pass Filter Parameter: |
| | Parameter Value    Low Pass Filter Value |
| | 0    1 |
| | 1    1/2 |
| | 2    1/4 |
| | 3    1/8 |
| | 4    1/16 |
| | 5    1/32 |
| | 6    1/64 |
| | 7    1/128 |
| | 0xFF    use default |
| sageCfgFlags | Flags indicate if custom radioGain, AGC (automatic gain control) config, and/or narrow-band SAGE mode are requested: 0x01: radioGainControl indicated below (in the radioGainControl field) is used. 0x02: agcControl indicated below (in the agcControl field) is used. 0x04: narrow band (20 MHz) SAGE Mode (rather than wideband, or 100 MHz, which is the default) Flags correspond to bit settings for this byte, so 0x01 is the right-most bit; 0x02 is the second bit from the right; 0x04 is the third bit from the right. Any combination of flags may be set. If the corresponding flag is '0' then the default value for these fields are used. |
| radioGainControl | This value is used if the matching bit is set in the sageCfgFlags. |
| agcControl | This value is used if the matching bit is set in the sageCfgFlags. "agc" stands for automatic gain control. |

The IE_VENDOR_CFG information element contains vendor specific configuration information. Typically this is a configuration that is specific to the particular radio in use.

| Sub-Field Name | Description |
| --- | --- |
| infoElementType | IE_VENDOR_CFG = 13 |
| vendorInfo | Vendor specific information. Format defined by Vendor. |

The NSI provides a pulse detector configuration element (IE_PD_CFG) which is used to configure the pulse detectors. This element must be used the first time the pulse detectors are configured. It is also used if and when the pulse detectors are reconfigured (which may be infrequent). The optional pulse events test configuration element (IE_PEVT_CFG) are shown in the table below. If this configuration element is not sent, the default values are used for the test.

| Sub-Field Name | Description |
| --- | --- |
| infoElementType | IE_PEVT_CFG = 10 |
| maximumNumPevts | Maximum number of Pulse Events in a given PEVT message (Default = 30) |
| pdUsed | These bit flags select which Pulse Detector(s) to use: 0x01: PD 0 used    0x02: PD 1 used 0x04: PD 2 used    0x08: PD 3 used Flags can be combined to indicate more than one pulse detector. For example, 0x0D (binary 0000 1101) indicates the use of pulse detectors 0, 2, and 3. A value of 0xF (binary 0000 1111) indicates to use all detectors (default value). |

Configuring the pulse detectors involves selecting which pulse detector(s) to use for a test. It also involves providing parameters which indicate the kind of signal pulse (for example, ranges for signal power, pulse duration, pulse center frequency, etc.) will, in fact, be interpreted as being a pulse. There are a variety of options when dealing with pulse detectors:

Use the existing pulse detector configuration for the service.

Allocate a currently unused detector.

Reconfigure an existing pulse detector.

Release a pulse detector so that other sessions may use it.

Whether configuring a pulse detector before using it for the first time, or reconfiguring the detector, the header field will first be sent with a particular msgType. This will be followed by the pulse detector configuration element, IE_PD_CFG, described in the table below. (Other information elements may be included in the message as well.) Pulse detectors are selected using PD_ID sub-field values from 0 to 3. These do not correspond to physical pulse detectors; rather, they are a logical reference to a pulse detector that is used by that transport connection supporting the sessions.

| Field Name | Description |
| --- | --- |
| infoElementType | IE_PD_CFG = 7 |
| pdID | Session Pulse Detector ID. Values of 0 to 3, for example. |
| configActionType | Configuration Action Type: 1: Allocate and configure the pulse detector for use by this session. 2: Reconfigure the existing pulse detector 3: Release the pulse detector for others to use. (If value is '3' then the remaining fields are ignored). |
| configProfile | Configuration Profile: 0: Use the profile fields below. In other words, use '0' for this field in order to completely determine the Pulse Detector configuration, using the remaining parameters in this information element. Any allowed non-zero value (currently 1 for short pulses, and 2 for long pulses): Selects one of several pre-defined configurations, suitable for detecting pulses from different kinds of sources. In this non-zero case, the remaining fields below are ignored. |

-continued

| Field Name | Description |
|---|---|
| bwMinkHz | Minimum pulse bandwidth in kHz. |
| bwMaxkHz | Maximum pulse bandwidth in kHz. |
| bwHoldkHz | Bandwidth hold value in kHz. |
| bwThreshDbm | dBm threshold value used to define a pulse. |
| cfreqMinkHz | Minimum value of pulse center frequency. Value is number of kHz from the start of the radio band. |
| cfreqMaxkHz | Maximum value of pulse center frequency in kHz. |
| cfreqHoldkHz | Center Frequency Hold value in kHz. |
| durMinUsecs | Minimum Pulse Duration in µseconds. |
| durMaxUsecs | Maximum Pulse Duration in µseconds. |
| durMaxTermFlag | Action to be performed on Duration Max:<br>0: Terminate Pulse with TERMCODE 0 (max duration pulse)<br>1: Discard Pulse (pulse is ignored) |
| pwrMinDbm | signed dBm value indicating the minimum pulse power. |
| pwrMaxDbm | signed dBm value indicating the maximum pulse power. |
| pwrHoldDbm | unsigned power hold value. |

The field bwThreshDbm takes a signed dBm value that helps determine which RF signals will be counted as pulses. A pulse is defined by a series of time-contiguous, and bandwidth continuous "peaks", or brief spikes, which determine the overall bandwidth of the pulse (thus the reference to "bandwidth threshold"). A "peak floor" is established to determine which spikes of radio energy qualify as a valid "peak". Energy spikes below this "peak floor" do not qualify, whereas those above the "peak floor" do qualify. The bwThreshDbm parameter determines the "peak floor" based on whether 'bwThreshDbm' is positive or negative:

If bwThreshDbm is negative (ex: −65 dBm), then the peak floor is the same as the value of bwThreshDbm.

If bwThreshDbm is positive (ex: 24 dBm), then the peak floor is determined dynamically based on the current noise floor:

peak floor dBm=noise floor dBm+bwThreshDbm.

The noise floor based mechanism (bwThreshDbm is positive) is used almost exclusively because it responds well to changes in the radio spectrum environment.

There may be pre-defined pulse detection configurations, shown in the table below, to detect certain types of signal pulses.

| IE_PD_CFG configProfile Field Value | Profile Name | Profile Description/Notes |
|---|---|---|
| 1 | ShortPulse 1 | Captures short pulse frequency hoppers, including Bluetooth headsets and many cordless phones. |
| 2 | LongPulse 1 | Captures long pulses output by microwave ovens and television transmissions (infant monitors, surveillance cameras, X-10 cameras, etc.). |

This following short pulse profile is suitable for detecting short pulse frequency hoppers, such as Bluetooth™ headsets and many cordless phones.

| IE_PD_CFG field name | Profile field value | Notes |
|---|---|---|
| bwMinkHz | 300 | Pulse BW from 300 kHz to 4 MHz, with 4.5 MHz hold |
| bwMaxkHz | 4000 | |
| bwHoldkHz | 4500 | |
| bwThreshDbm | 24 | Pulse defined 24 dBm above noise floor. |
| cfreqMinkHz | 6000 | 6 MHz to 94 MHz center frequency, with 2 MHz hold. |
| cfreqMaxkHz | 94000 | |
| cfreqHoldkHz | 2000 | |
| durMinUsecs | 250 | Pulse durations from 250 to 2000 µs. |
| durMaxUsecs | 2000 | |
| durMaxTermFlag | 1 | Discard the pulse if it is equal to, or longer than, the maximum duration of 2000 µs. |
| pwrMinDbm | −85 | Pulse power from −85 to 0 dBm, with 15 dB hold. |
| pwrMaxDbm | 0 | |
| pwrHoldDbm | 15 | |

The following long pulse profile is suitable for detecting long pulses output by Microwave Ovens and television transmissions (infant monitors, surveillance cameras, X-10 cameras, etc.).

| IE_PD_CFG field name | Profile field value | Notes |
|---|---|---|
| bwMinkHz | 300 | Pulse BW from 300 kHz to 20 MHz, with 8 MHz hold |
| bwMaxkHz | 20000 | |
| bwHoldkHz | 8000 | |
| bwThreshDbm | 24 | Pulse defined 24 dBm above noise floor. |
| cfreqMinkHz | 6000 | 6 MHz to 94 MHz center frequency, with 8 MHz hold. |
| cfreqMaxkHz | 94000 | |
| cfreqHoldkHz | 8000 | |
| durMinUsecs | 2800 | Pulse durations from 2800 to 8000 µs |
| durMaxUsecs | 8000 | |
| durMaxTermFlag | 0 | Do not discard long pulses |
| pwrMinDbm | −70 | Pulse power from −70 to 0 dBm, with 20 dB hold. |
| pwrMaxDbm | 0 | |
| pwrHoldDbm | 20 | |

Before running a pulse histogram test for the first time, the pulse detectors need to be configured. This is done by first running a pulse event test, described above. A session control message is sent containing a header field with a sessType value of '13'. That is followed by the optional information elements, as shown in the table below detailing the optional pulse histogram test configuration element (IE_PHIST_CFG). If it is not sent, the default values (shown in the table) are used.

| Sub-Field Name | Description |
|---|---|
| infoElementType | IE_PHIST_CFG = 9 |
| forwardTimeoutMs | Number of milliseconds between each Pulse Histogram message update. The default is 1000 (which yields 1 Pulse Histogram message each second). |
| pdUsed | These bit flags select which Pulse Detector(s) to use:<br>0x01: PD 0 used    0x02: PD 1 used<br>0x04: PD 2 used    0x08: PD 3 used<br>Flags can be combined to indicate more than one pulse detector. For example, 0x0D (binary 0000 1101) indicates the use of pulse detectors 0, 2, and 3. A value of 0xF (binary 0000 1111) indicates to use all detectors (default value). |

The spectrum analyzer power vs. frequency test is started by sending a session control message containing a header field with a sessType value of '10'; that is followed by the optional information elements, as shown below.

| Sub-Field Name | Description |
|---|---|
| infoElementType | IE_SAPF_CFG = 6 |
| usecsBetweenSamples | This value indicates the number of μseconds between spectrum analyzer power vs. frequency samples. The default value of 100,000 translates to 10 samples per second. |
| transitionalPdUsed | Indicates of which PD to use for Transitional Mode.<br>0x00: PD0 used    0x01: PD1 used<br>0x02: PD2 used    0x03: PD3 used<br>0xFF: Transitional mode NOT USED (default value)<br>If 'transitionalPdUsed' is not equal to 0xFF, then the SAPF sample collection is turned on and off via the specified Pulse Detector. When the Pulse Detector is ON (a pulse is in progress), SAPF samples are collected. When the Pulse Detector transits to OFF, the samples are stopped. The time between samples sent to the user is still determined by 'usecsBetweenSamples'. |

The spectrum analyzer statistics test is started by send a session control message containing a header field with a sessType value of '11'. That is followed by the optional information elements, as described below.

| Sub-Field Name | Description |
|---|---|
| infoElementType | IE_SA_STATS_CFG = 8 |
| usecsBetweenSamples | Indicates the number of μseconds between spectrum analyzer stats updates. A default value of 100,000 translates to 10 samples per second. |
| pwrThreshDbm | dBm power threshold value used by "duty cycle" and "peak count" stats info. The default value is 24 dBm. (The "duty cycle" statistics indicate how often the signal power is above the threshold value. The "peak count" statistics will only count peaks at or above the threshold.) |

The field pwrThreshDbm takes a signed dBm value that helps determine the minimum power level for the "duty cycle" and the "peak count." The pwrThreshDbm parameter determines the "floor", or minimum energy level for these measurements, based on whether pwrThreshDbm is positive or negative:

If pwrThreshDbm is negative (e.g.,: −65 dBm), then the floor is the same as the value of pwrThreshDbm.

If pwrThreshDbm is positive (e.g.,: 24 dBm), then the floor is determined dynamically based on the current noise floor: power floor dBm=noise floor dBm+pwrThreshDbm. A noise floor based mechanism (pwrThreshDbm is positive) is used almost exclusively because it responds well to changes in the radio spectrum environment.

The spectrum event data test is started by sending a message containing a header field with a sessType value of '14'.

The snapshot message test is started by sending a message containing a header field with a sessType value of '17', followed by the optional configuration elements. The optional snapshot message configuration element (IE_SNAP_CFG) follows. If it is not sent, default values are used for the test.

| Sub-Field Name | Description |
|---|---|
| infoElementLen | Len = 12 |
| infoElementType | IE_SNAP_CFG = 12 |
| numberSamples | Number of samples to capture |
| snapPdUsed | Snapshot Pulse Detector used to trigger the snapshot.<br>0x00: PD 0 used    0x01: PD 1 used<br>0x02: PD 2 used    0x03: PD 3 used<br>0xEF: Snapshot Use DISABLED |

By specifying which pulse detector is used to trigger the snapshot capture, it is possible to control which types of signal pulses are detected to trigger a raw ADC data capture.

The NSI may reply to test start messages to inform the requesting software application of the status of the test, and the ability of the underlying applications to deliver data for the requested tests. It is also possible to stop a test that has been requested. The table below summarizes the session control status messages which may be sent via the NSI.

Figure 17:
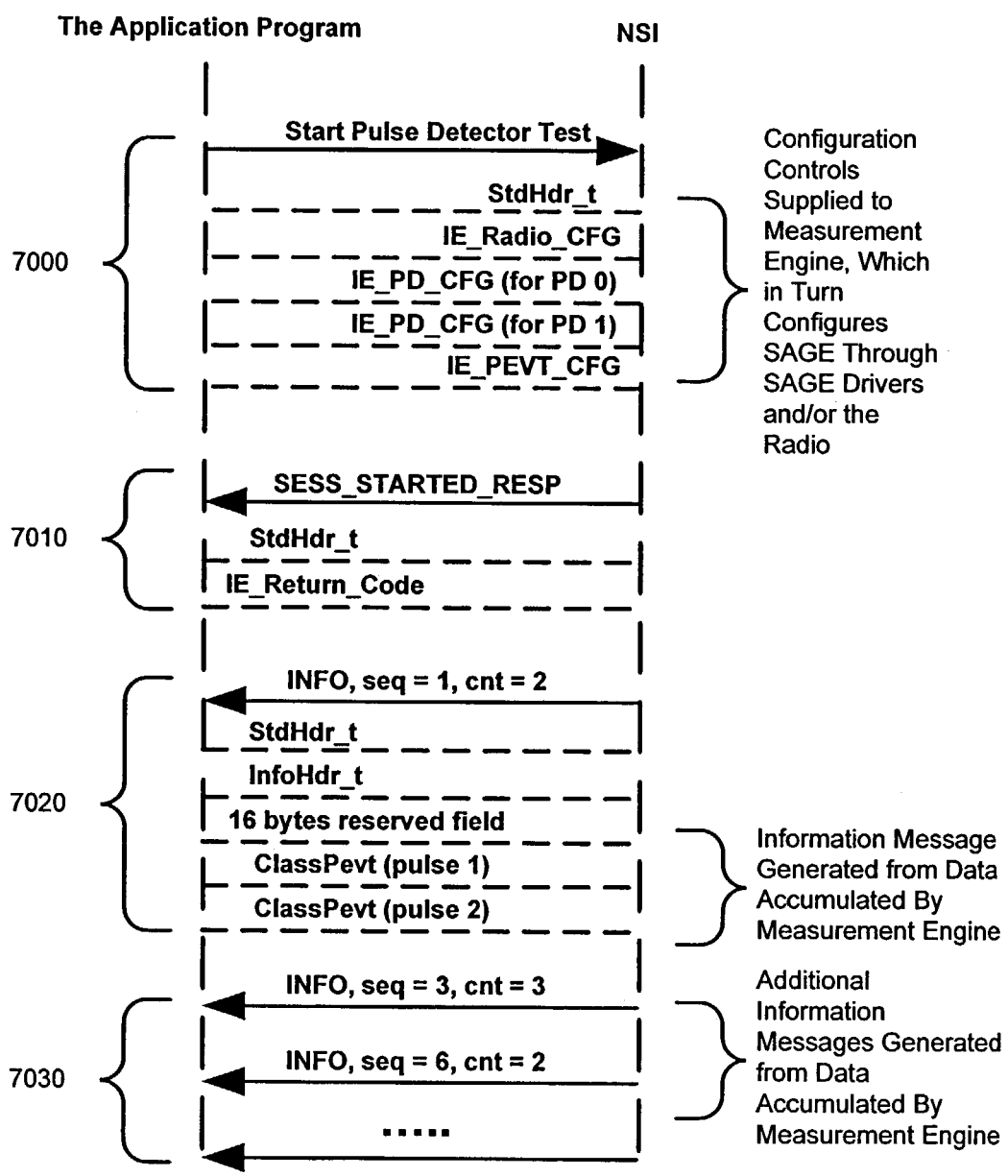
FIG. 17 is a ladder diagram illustrating how messages are generated to access SAGE data through a network spectrum interface (NSI).

An example of how the NSI can be used to configure and obtain data from a SAGE pulse detector is shown in FIG. 17. In the diagram, solid lines are for the unified message and the dotted lines indicate the headers, information elements and information messages sent that make up a single message. Step 7000 represents a software application sending to the NSI a start message. The message includes a message header with a particular msgType value that indicates it is a start message and a sessType value to indicate that it is a pulse event test. If it is the first message request sent, the start message includes either the IE_Radio_CFG element, or the IE_VENDOR_CFG element. Two IE_PD_CFG elements are sent to configure pulse detector 0 to detect short pulses and pulse detector 1 to detector long pulses. A pulse event information element IE_PEVT_CFG is also sent to indicate which of the configured pulse detectors to use. The applicable data from the SAGE is generated and made available to the NSI. In step 7010, the NSI replies with a message confirming that the service was started and the status of the service in process. In step 7020, a series of informational messages are sent with data. Each message includes indicates that it is an informational message and includes one or more of the ClassPevt fields which hold the actual data that described the measured properties of pulses that are detected within the configured parameters. Further information messages are sent as shown at step 7030.

Referring to FIGS. 18–26, output an exemplary graphical user interface (GUI) application useful for interfacing spectrum activity and management information to/from a user. The GUI provides a means to monitor, configure and analyze the various components of the spectrum management system. It interacts with other components of the spectrum management system via the NSI referred to above in conjunction with FIG. 16.

The GUI application may be written in Java® and may use sockets over TCP, for example, to communicate with the spectrum activity information associated with a particular radio communication device. The GUI application software loads a PE.ini file at initialization that contains all the configuration related information like hostname and the port number. Once the communication is established the application will spawn and thread which will wait on the port to detect spectrum activity information messages coming from the source device. As information comes through the socket it is processed and displayed to the various components that are detecting these messages. The message dispatcher dispatches the processed messages to appropriate display panels. All the messages coming through the socket will also be stored in a log file located in a directory specified by the user in the PE.ini against the key PE_LOGS. The GUI application is fed by data from the measurement engine and the classification engine (and optionally the spectrum expert or other applications) referred to above in conjunction with FIG. 16.

The GUI consists of several sub-parts:

Fault Management. Provides a means to detect, receive and provide fault information. The fault information describes the cause of the fault.

Configuration Management. Provides a means to configure the spectrum components. A spectrum advisor provides configuration related information and guides the user through the configuration process.

Performance Management. Monitors traffic of a communication protocol, such as an IEEE 802.11 network, and collects statistical information indicative of spectrum utilization and displays them.

Event Management. Provides a means to monitor various spectrum events and display this information in the form of graphs and histograms.

A graphs panel consists of the graphs or plots on the right of the screen and plot type on the left tree view. When the tree view is opened and any plot type is clicked, the corresponding plot will be added and displayed on the right side. Any plot on the right side of the screen can be removed by clicking on the close icon on the plot. As soon as the "Start" button is hit and data is available on the socket the spectrum analyzer plots will be plotted. If the "Stop" button is pressed the plotting action is disabled and the spectrum analyzer plots will no longer be updated with incoming data. The spectrum activity information is displayed on the spectrum analyzer graphs, pulse histograms and pulse plots.

The spectrum analyzer graph in FIG. 18 contains spectrum analyzer power vs. frequency, described above. The spectrum analyzer stats are shown in FIG. 19 and include the spectrum analyzer stats graph, the duty cycle graph, and number of peaks bar chart. This SA stats graph displays statistical data on the frequency spectrum. It is based on spectrum messages, where a single message is built from a specific number of successive FFT cycles. Typically, 40,000 successive FFTs of the RF spectrum, taken over a total time of $\frac{1}{10}$ of a second, are used to construct the statistics for a single message. A first line shows the average power over the sampling period (i.e., over the 40,000 FFTs, or $\frac{1}{10}$ second). A second line, which can change rapidly from $\frac{1}{10}$ of a second to the next, represents the "maximum power per single sampling period." It shows the maximum power achieved in each of 256 frequency bins, during the $\frac{1}{10}$ second sampling period. A third line represents the "absolute maximum power" over all messages received so far. The Duty Cycle graph shows the percentage of the time that, for a given frequency, the power in the RF spectrum is above a specified threshold.

The Number of Peaks chart shows the percentage of time that there are "N" peaks in the RF spectrum. For example, if the "0" bar is hovering around 50%, then 50% of the time there are no peaks at all. If the "1" bar is hovering at around 20%, then 20% of the time there is just 1 peak in the RF spectrum. If the "2" bar hovers at 5%, then 5% of the time SAGE is detecting 2 peaks in the RF spectrum. (The "9" bar is a special case: If the "9" bar is hovering at, say, 3%, then 3% of the time SAGE is seeing 9 or more peaks in the RF spectrum.

FIG. 20 shows exemplary pulse histogram plots for center frequency, bandwidth, pulse duration, pulse gap, pulse power and pulse count. As soon as the "Start" button and histogram data is available on the socket the histograms will be plotted. If the "Stop" button is pressed the plotting action is disabled and the histograms will no longer be updated with incoming data. The following types of plots are available for viewing:

Center Frequency shows the distribution of the central frequencies of the pulses. The graph spans a bandwidth of 100 MHz. The actual central frequency is determined by combining the central frequency shown on the graph with the overall RF center frequency (2.4 GHz). Also, both ends of the graph are typically flat, since the actual bandwidth captured by the radio is 83 MHz.

Bandwidth shows the distribution of the bandwidths of the pulses.

Pulse Duration shows the distribution of the duration of the pulses. For example, a peak at around 200 µsec indicates that many of the pulses persist for about 200 µsec.

Pulse Gap shows the distribution of the gap times. A peak at about 1500 µsec indicates that many of the pulses are separated in time by gaps that are about 1500 µsec long.

Pulse Power indicates the distribution of the power of the pulses.

Pulse Count indicates, on a logarithmic scale, the number of pulse events counted per sample interval. Colors may be used indicate that the number of pulses poses little risk, some risk, or significant risk, for example, to a particular type of communications occurring in the radio frequency band, such as 802.11 communications.

FIGS. 18–20 are examples of how characteristics (e.g., center frequency, power, duty cycle, etc.) of a signal classified by the classification engine may be displayed to a user.

Figure 21:
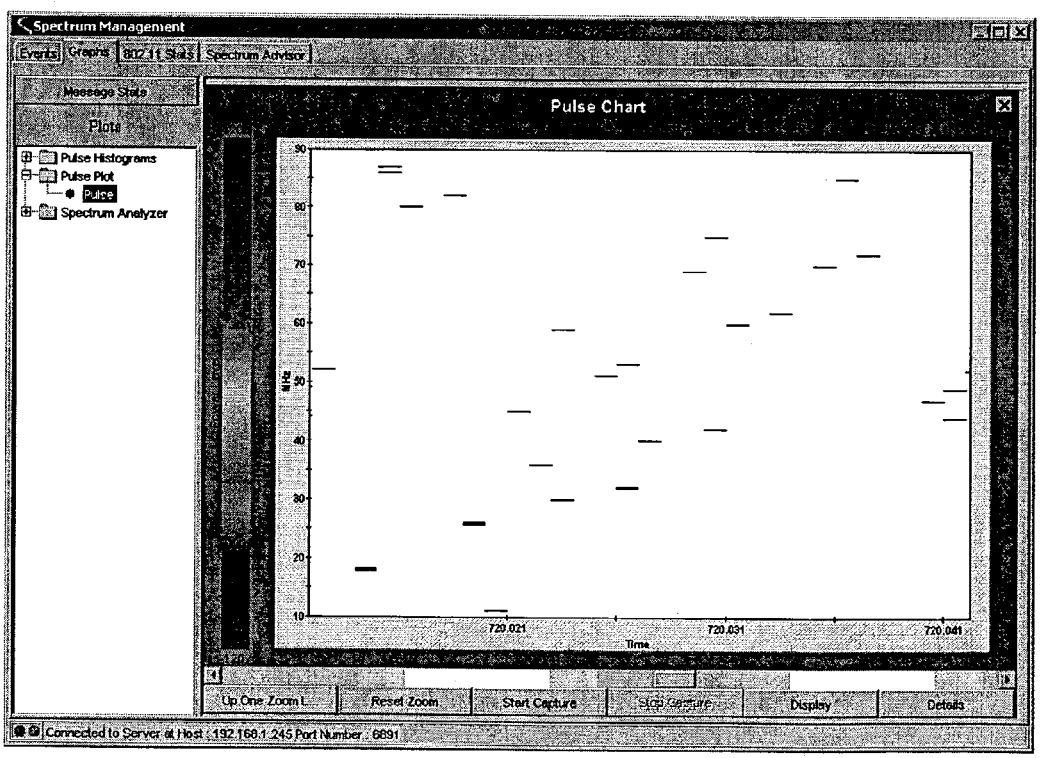

FIG. 21 shows a pulse chart/plot for various pulses detected in the frequency band. When the "Capture" button is selected, the GUI application will capture the pulses and display them on the pulse chart. Each pulse is defined in three dimensions and presents a single dot for each pulse. It is intended to show the time at which each pulse occurred (horizontal axis), the center frequency (vertical axis), and the power (the dot color). A color-coded legend may be used on the left side of the pulse chart. A zooming action can be performed by dragging the mouse on a specified area in the plot below the area to be zoomed, in order to magnify that area.

FIG. 22 shows how an alert may be generated when interference is detected, wherein the alert is displayed in an icon on a GUI bar. A user clicks that icon for more information and gets to the spectrum management console window in FIG. 23. In the spectrum management tab, there may be icons representing signals types that are being detected and classified in the frequency band, as well as textual information identifying those devices. In addition, there may be a sub-window that displays a "capacity rating" for the frequency band, indicating how much capacity in the frequency band is available based on the types of devices and traffic currently in use in the frequency band. The capacity rating may be derived from the "Quality" measurement reported above as a spectrum analyzer statistic, and is a qualitative estimate of the carrying capacity of the entire frequency band.

By clicking on the "Event Log" button on the spectrum management console window in FIG. 23, the event log screen of FIG. 24 is displayed. The events log displays event information in a tabular format for all the RF events that the SAGE, measurement engine and classification engine have detected. Each event has associated with it fields including an event message, event data and time, event time stamp, event ID and event source ID, similar to the fields of the NSI spectrum event message described above:

The Alert Level, ranging from Low to High to Severe, indicates how much interference the event may cause for 802.11 communications.

The Type of event includes, "Interferer" (for example, a signal that may interfere with IEEE 802.11 communications), "Information" and "Error".

A specific Message describing the event.

The Date & Time of the event. This is the date and time is filled in by the application (i.e., the Event Log software), based on the computer's internal clock.

A Time Stamp in seconds and microseconds, indicating the time when the event occurred, counting from when testing first began. This data is provided by the measurement engine (from the SAGE).

The ID indicates the device type, and a table below provides a partial list of IDs.

| 15 Bit Device ID (Bits 4, 3, and 2 shown, with corresponding Decimal Value [taking blank 1-Bit into account]) | 1-Bit: On/Off |
|---|---|
| 2 (001__)—Microwave Oven | 1 = On |
| 4 (010__)—GN Netcom Cordless Phone | 0 = Off |
| 6 (011__)—Bluetooth Headset | |
| 8 (100__)—Infant Monitor | |

For example, a display value of 7 is the same as ([011] [1]), meaning a Bluetooth Headset was turned on. 8 ([100] [0]) means an Infant Monitor was just turned off. An additional field may be provided to indicate (and display) a measure of match confidence of the classification.

The Source ID identifies the target source. This parameter is only significant when more than one source (Access Point or STA) is feeding data to the application program.

Figure 25:
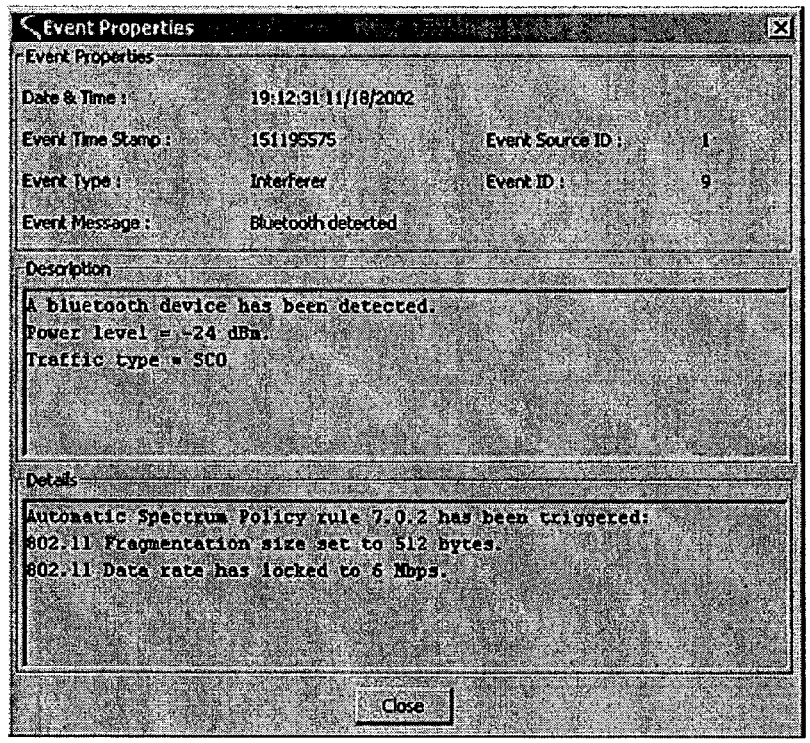
Figure 26:
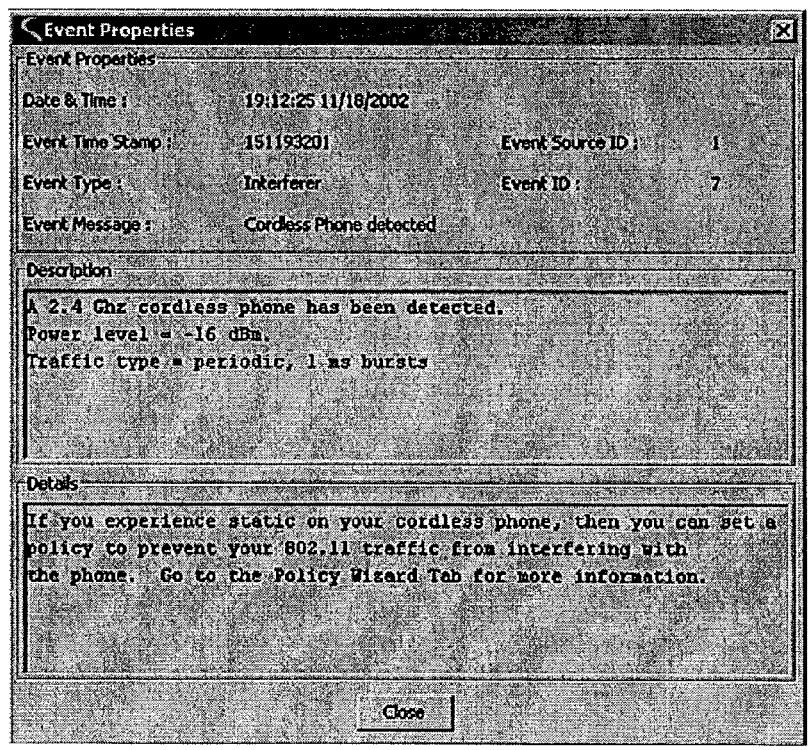

More detailed information is displayed about a particular event by clicking on an event row which will open up a dialog. This dialog contains detailed information about the event in the form of a text area containing a description of the event and a text area containing details of the event. Examples of detailed event dialogs are shown in FIGS. 25 and 26. FIG. 25 illustrates exemplary spectrum event summary information after an action was executed according to a spectrum policy. The detailed event information indicates the action that was automatically taken. By contrast, FIG. 26 shows event information in which an action was not automatically taken, rather a recommendation to the user is made in the detail text box that suggests how a user may avoid interference with another device detected in the frequency band.

In sum, a method is provided for classifying signals occurring in a frequency band, comprising accumulating data pertaining to one or more characteristics of radio frequency energy received in the frequency band over time; comparing the accumulated data against reference data associated with known signals; and classifying one or more signals occurring the frequency band based on the step of comparing. In addition, a system is provided for classifying signals occurring in a frequency band, comprising: at least one spectrum sensor device that receives radio frequency energy in the radio frequency band and outputs data pertaining to one or more characteristics of radio frequency energy; and a processor that accumulates the data output by the spectrum sensor device and compares the accumulated data against reference data to classify the one or more signals in the frequency band.

A processor readable medium is provided that is encoded with instructions that, when executed by a processor, cause the processor to perform steps of: comparing data associated with one or more characteristics of radio frequency energy received in a frequency band against reference data associated with known signals; and classifying one or more signals in the frequency band based on the comparison.

A software system is provided that processes data representing activity in a radio frequency band where signals of multiple types may occur, comprising: a first process for accumulating data associated with activity in the radio frequency band; and a second process that classifies types of signals occurring in the radio frequency band based on data from the first process.

Finally, a device is provided that receives radio frequency energy in a radio frequency band and processes signals representative thereof, comprising: a radio receiver that receives radio frequency energy in a radio frequency band where signals of multiple types may be occurring; a spectrum analyzer that computes power values for radio frequency energy received in at least part of the radio frequency band for a time interval; a signal detector coupled to the spectrum analyzer that detects signal pulses of radio frequency energy that meet one or more characteristics; and a processor coupled to receive output of the spectrum analyzer and the signal detector, wherein the processor is programmed to accumulate data pertaining to signal pulses detected by the signal detector; and compare accumulated data against reference data associated with known signals to classify one or more signals occurring in the frequency band.

The above description is intended by way of example only.

What is claimed is:

1. A method for classifying signals occurring in a frequency band, comprising:
   a. detecting power spectral information of the radio frequency energy;
   b. detecting signal pulses of radio frequency energy in the frequency band from said power spectral information;
   c. accumulating data pertaining to detection of said signal pulses in the frequency band over time, wherein said accumulating comprises accumulating data for one or more characteristics selected from the group consisting of: pulse center frequency, pulse bandwidth, pulse duration, time between pulses and number of different active pulses, and wherein the reference data associated with each of a plurality of known signals comprises one or more characteristics selected from the group consisting of: pulse center frequency, pulse bandwidth and pulse duration;
   d. comparing the accumulated data against reference data associated with known signals; and
   e. classifying one or more signals occurring the frequency band based on the step of comparing.

2. The method of claim 1, wherein the step of accumulating further comprises accumulating data pertaining to power spectral information of the radio frequency energy over time.

3. The method of claim 1, wherein comparing comprises comparing accumulated signal pulse data against reference signal pulse data associated with known signal types.

4. The method of claim 1, wherein comparing comprises determining a degree of match between the accumulated data with the reference data.

5. The method of claim 1, and further comprising assigning for the reference data for each known signal, match criteria between characteristics of the reference data and corresponding characteristics in the accumulated data that must be met in order to declare a match between the accumulated data and the reference data.

6. The method of claim 1, wherein classifying comprises determining a signal type of one or more signals occurring in the frequency band.

7. The method of claim 6, and further comprising generating information describing a signal type for one or more signals occurring in the frequency band.

8. The method of claim 6, wherein classifying comprises determining a signal type for one or more signals occurring in the frequency band selected from the group of signal types consisting of: frequency hopping signal, radar, microwave oven, constant frequency, Bluetooth™ signal, cordless phone, infant monitor transmitter, and video monitor transmitter.

9. The method of claim 1, wherein accumulating data comprises accumulating one or more histograms for the signal pulse, the one or more histograms are selected from the group consisting of: a center frequency histogram that tracks a percentage of time a given center frequency was observed for detected signal pulses, a bandwidth histogram that tracks the percentage of time a given bandwidth was observed for detected signal pulses, a pulse duration histogram that tracks a percentage of time a given duration or durations was observed for detected signal pulses, a time between pulses histogram that tracks a percentage of time that a given time duration or durations was observed between signal pulses and a number of active transmissions histogram that tracks when several different signal pulses simultaneously occur.

10. The method of claim 1, wherein comparing comprises comparing timing characteristics associated with accumulated signal pulse data with pulse timing characteristics associated with a known signal.

11. The method of claim 10, wherein comparing comprises comparing a time period between two or more signal pulses in the accumulated signal data with a corresponding time period for a known signal.

12. The method of claim 11, wherein comparing comprises comparing a time period between a leading edge of a first signal pulse and a leading edge of a subsequent signal pulse in the accumulated signal data with a corresponding time period for a known signal.

13. The method of claim 1, and further comprising obtaining a sample of a signal detected for a time interval, wherein the step of comparing comprises comparing the sample of the signal with corresponding data for known signals.

14. The method of claim 1, wherein detecting comprises iterating through a plurality of different characteristics for time intervals to detect signal pulses in the frequency band that meet one or more of the plurality of different characteristics.

15. The method of claim 1, and further comprising outputting information including one or more of: a center frequency of the signal, if relevant, a measure of match confidence, power of the signal and duty cycle of the signal.

16. The method of claim 1, and further comprising displaying one more characteristics of a signal classified from the accumulated data.

17. The method of claim 1, and further comprising steps of receiving a request from an application program interface to classify one or more signal types occurring in the frequency band; and supplying in response to the request information describing one or more signal types when they are determined to occur.

18. The method of claim 17, wherein receiving a request comprises receiving characteristics of one or more signal types to be analyzed for occurrence in the radio frequency band.

19. A system for classifying signals occurring in a frequency band, comprising:

a. at least one spectrum sensor device that receives radio frequency energy in the radio frequency band, where the spectrum sensor device generates power spectral information of the radio frequency energy and comprises a signal detector that detects signal pulses of radio frequency energy in the frequency band from the power spectral information and outputs data pertaining to one or more characteristics of radio frequency energy including data pertaining to said detected signal pulses; and b. a processor that accumulates the signal pulse data output by the spectrum sensor device comprising one or more characteristics selected from the group of: pulse center frequency, pulse bandwidth, pulse duration histogram and time between pulses, and compares the accumulated signal pulse data with reference data comprising one or more characteristics selected from the group consisting of: pulse center frequency, pulse bandwidth, pulse duration and time between pulses to classify the one or more signals in the frequency band.

20. The system of claim 19, wherein the processor builds one or more histograms for the accumulated signal pulse data.

21. The system of claim 20, wherein the processor builds histograms selected from the group consisting of: a center frequency histogram that tracks a percentage of time a given center frequency was observed for detected signal pulses, a bandwidth histogram that tracks the percentage of time a given bandwidth was observed for detected signal pulses, a pulse duration histogram that tracks a percentage of time a given duration or durations was observed for detected signal pulses, a time between pulses histogram that tracks percentage of time that a given time duration or durations was observed between signal pulses and a number of active transmissions histogram that tracks when several different signal pulses simultaneously occur.

22. The system of claim 19, wherein the processor compares the accumulated signal data against reference data by comparing a pulse timing signature of a known signal against the accumulated signal data.

23. The system of claim 22, wherein the processor compares timing characteristics associated with accumulated signal pulse data with pulse timing characteristics associated with known signals.

24. The system of claim 22, wherein the processor compares a time period between a leading edge of a first signal pulse and a leading edge of a subsequent signal pulse in the accumulated signal data with a corresponding time period for a known signal.

25. The system of claim 19, wherein the processor compares a sample of a signal detected for a time interval with corresponding data for known signals.

26. The system of claim 19, wherein the spectrum sensor device comprises one or more pulse detectors that detect characteristics of signals in the frequency band, and wherein the processor iteratively changes one or more parameters of the one or more pulse detectors to detect signal pulses of different characteristics.

27. The system of claim 19, wherein the spectrum sensor device resides in a card device, and wherein the processor is part of a host device coupled to the card device through an interface.

28. The system of claim 19, wherein the processor outputs information describing a signal type of one or more signals occurring in the frequency band.

29. The system of claim 28, wherein the processor outputs information describing a signal type selected from the group of signal types consisting of: frequency hopping signal, radar, microwave oven, constant frequency, Bluetooth™ signal, cordless phone, infant monitor transmitter, and video monitor transmitter.

30. The system of claim 28, wherein the processor outputs information for a signal that is classified including one or more of: a center frequency of the signal, if relevant, a measure of match confidence, power of the signal and duty cycle of the signal.

31. The system of claim 19, wherein the processor generates data to display one or more characteristics of a signal classified from the accumulated data.

32. The system of claim 19, wherein the processor receives a request from an application program interface to classify one or more signal types occurring in the frequency band; and supplies in response to the request information describing one or more signal types when they are determined to occur.

33. The system of claim 19, wherein the processor receives characteristics of one or more signal types to be analyzed for occurrence in the radio frequency band.

34. A processor readable medium encoded with instructions that, when executed by a processor, cause the processor to perform steps of:
  a. comparing data associated with signal pulses detected in the frequency band including one or more characteristics selected from the group consisting of: pulse center frequency, pulse bandwidth, pulse duration, time between pulses and number of different active transmissions against reference data associated with each of a plurality of known signal types comprising one or more characteristics selected from the group consisting of: pulse center frequency, pulse bandwidth, and pulse duration and time between pulses; and
  b. classifying one or more signals in the frequency band based on the comparison.

35. The processor readable medium of claim 34, wherein the instructions encoded on the medium to perform said comparing comprising instructions for comparing histograms for the one or more signal pulse characteristics associated with the radio frequency energy with histograms for corresponding one or more characteristics of reference data associated with known signal types.

36. The processor readable medium of claim 35, and further comprising instructions encoded on the medium for outputting information describing a signal type for a classified signal.

37. The processor readable medium of claim 36, and further comprising instructions encoded on the medium for outputting information including one or more of: a center frequency of the signal, if relevant, a measure of match confidence, power of the signal and duty cycle of the signal.

38. The processor readable medium of claim 36, wherein the instructions encoded on the medium for outputting a signal type comprise instructions for outputting a signal type selected from the group of signal types consisting of: frequency hopping signal, radar, microwave oven, constant frequency, Bluetooth™ signal, cordless phone, infant monitor transmitter, and video monitor transmitter.

39. The processor readable medium of claim 34, wherein the instructions encoded on the medium for comparing comprise instructions for comparing timing characteristics associated with accumulated signal pulse data with pulse timing characteristics associated with a known signal.

40. The processor readable medium of claim 39, wherein the instructions encoded on the medium for comparing comprise instructions for comparing a time period between two or more signal pulses in the accumulated signal data with a corresponding time period for a known signal.

41. The processor readable medium of claim 40, wherein the instructions encoded on the medium for comparing comprise instructions for comparing a time period between a leading edge of a first signal pulse and a leading edge of a subsequent signal pulse in the accumulated signal data with a corresponding time period for a known signal.

42. The processor readable medium of claim 34, and further comprising instructions encoded on the medium to generate data for displaying information describing the classified signal.

43. The processor readable medium of claim 34, and further comprising instructions encoded on the medium for receiving a request from an application program interface to classify one or more signal types occurring in the frequency band; and supplying in response to the request information describing one or more signal types when they are determined to occur.

44. The processor readable medium of claim 43, wherein the instructions encoded on the medium for receiving a request further comprise instructions for receiving characteristics of one or more signal types to be analyzed for occurrence in the radio frequency band.

45. A device that receives radio frequency energy in a radio frequency band and processes signals representative thereof, comprising:
  a. a radio receiver that receives radio frequency energy in a radio frequency band where signals of multiple types may be occurring;
  b. a spectrum analyzer that computes power values for radio frequency energy received in at least part of the radio frequency band for a time interval;
  c. a signal detector coupled to the spectrum analyzer that detects signal pulses of radio frequency energy that meet one or more characteristics; and
  d. a processor coupled to receive output of the spectrum analyzer and the signal detector, wherein the processor is programmed to:
    i. accumulate data for each signal pulse detected by the signal detector consisting of: pulse center frequency, pulse bandwidth, pulse duration, time between pulses and number of different active pulses; and
    ii. compare accumulated data against reference data associated with known signals to classify one or more signals occurring in the frequency band.

46. The device of claim 45, wherein the processor generates controls for configuring signal pulse characteristics used by the signal detector to detect signal pulses from the radio frequency energy.

* * * * *